(12) United States Patent
Neef et al.

(10) Patent No.: US 11,857,903 B2
(45) Date of Patent: Jan. 2, 2024

(54) COVER FOR A FILTER SYSTEM, SEAL FOR A COVER, AND FILTER SYSTEM COMPRISING A COVER

(71) Applicant: MANN+HUMMEL GmbH, Ludwigsburg (DE)

(72) Inventors: Pascal Neef, Trossingen (DE); Torsten Fritzsching, Vaihingen (DE); Philipp Hettkamp, Steinheim (DE); Mario Rieger, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 600 days.

(21) Appl. No.: 16/950,710

(22) Filed: Nov. 17, 2020

(65) Prior Publication Data
US 2021/0138380 A1 May 13, 2021

Related U.S. Application Data

(63) Continuation of application No. PCT/EP2019/062304, filed on May 14, 2019.

(30) Foreign Application Priority Data

| May 18, 2018 | (DE) | 102018004041.1 |
| Aug. 15, 2018 | (DE) | 102018006538.4 |
| Aug. 21, 2018 | (DE) | 102018120340.3 |

(51) Int. Cl.
*B01D 46/00* (2022.01)
*F02M 35/02* (2006.01)
*F02M 35/024* (2006.01)

(52) U.S. Cl.
CPC ..... *B01D 46/0004* (2013.01); *B01D 46/0005* (2013.01); *F02M 35/0201* (2013.01);
(Continued)

(58) Field of Classification Search
None
See application file for complete search history.

(56) References Cited

U.S. PATENT DOCUMENTS

| 4,861,359 A | 8/1989 | Tettman |
| 10,245,541 B2 | 4/2019 | Kaufmann et al. |

(Continued)

FOREIGN PATENT DOCUMENTS

| GB | 2109268 A | 6/1983 |
| WO | 2009149706 A2 | 12/2009 |

(Continued)

*Primary Examiner* — Jason M Greene

(57) ABSTRACT

A cover for a filter system for filtering a fluid has a fluid channel arranged at an inner side of the cover. The cover has a rim and at least one opening arranged in the rim to allow the fluid to pass through, wherein the opening is connected in fluid communication with the fluid channel. The fluid channel is connected in fluid communication with the interior of a filter element of the filter system. A seal for the cover has a first sealing ring and a second sealing connected to each other by flanks. The filter system has a housing with a housing part that is closable by the cover. A filter element is exchangeably arranged in the housing, and the fluid channel of the cover is connected in fluid communication to the interior of the filter element.

11 Claims, 45 Drawing Sheets

(52) U.S. Cl.
CPC ... *F02M 35/02416* (2013.01); *B01D 2265/06* (2013.01); *B01D 2271/027* (2013.01); *B01D 2279/60* (2013.01)

(56) References Cited

U.S. PATENT DOCUMENTS

| | | |
|---|---|---|
| 10,363,506 B2 | 7/2019 | Stark et al. |
| 2007/0144348 A1 | 6/2007 | Gieseke et al. |
| 2010/0024371 A1 | 2/2010 | Rieger |
| 2011/0185689 A1 | 8/2011 | Raether et al. |
| 2015/0176544 A1* | 6/2015 | Kaufmann ......... B01D 46/0005 55/425 |
| 2016/0131086 A1 | 5/2016 | Thalmann et al. |
| 2016/0160816 A1 | 6/2016 | Venkatraman et al. |
| 2016/0348617 A1 | 12/2016 | Navaliger et al. |
| 2018/0214804 A1 | 8/2018 | Dishman |
| 2019/0308125 A1* | 10/2019 | Neef ................. B01D 46/0005 |

FOREIGN PATENT DOCUMENTS

| | | | |
|---|---|---|---|
| WO | WO 2009/149706 A2 * | 12/2009 | ............. B01D 29/15 |
| WO | WO 2018/073198 A1 * | 4/2018 | ............. B01D 46/24 |

* cited by examiner

COVER FOR A FILTER SYSTEM, SEAL FOR A COVER, AND FILTER SYSTEM COMPRISING A COVER

CROSS-REFERENCE TO RELATED APPLICATIONS

This application is a continuation application of international application No. PCT/EP2019/062304 having an international filing date of 14 May 2019 and designating the United States, the international application claiming a priority date of 18 May 2018 based on prior filed German patent application No. 10 2018 004 041.1, further claiming a priority date of 15 Aug. 2018 based on prior filed German patent application No. 10 2018 006 538.4, and further claiming a priority date of 21 Aug. 2018 based on prior filed German patent application No. 10 2018 120 340.3, the entire contents of the aforesaid international application and the aforesaid German patent applications being incorporated herein by reference.

BACKGROUND OF THE INVENTION

The invention concerns a cover for a filter system, a seal for a cover, and filter system with a cover.

The intake air of internal combustion engines is usually purified prior to entering a combustion chamber of the internal combustion engine by removing contaminants by means of an air filter. Air filter elements used for this purpose can comprise a star-shaped folded filter medium which surrounds a longitudinal axis in an annular shape. For internal combustion engines of commercial vehicles, for example, heavy trucks, such a filter element can have a length of more than 300 mm, in particular of more than 500 mm. The filter elements must be attached securely in their filter housing. Since the filter media in operation become clogged with particles filtered out of the air, a regular exchange of the filter elements is required.

WO 2011/045220 A2 discloses a filter insert comprising a filter element with a frame circumferentially extending along the lateral surfaces of the filter element, wherein the frame carries an axial seal. The seal is in contact with a sealing surface of a filter housing. The frame comprises at two oppositely positioned lateral surfaces of the filter insert a first and second contact surface for clamping the filter element by means of a first and a second clamping element. The filter insert can be inserted through a lateral mounting opening into the filter housing. The clamping elements can be embodied as clamping blades at a cover for closing the mounting opening.

SUMMARY OF THE INVENTION

It is an object of the invention to provide a cover for a filter system with a filter element that enables a simple exchange of a filter element.

A further object of the invention is providing a filter system with such a cover.

The aforementioned object is solved according to one aspect of the invention by a cover for a filter system with a filter element arrangeable in a housing for filtering an in particular gaseous fluid, which filter element comprises a longitudinal axis and a filter bellows arranged about the longitudinal axis and enclosing an interior, and which filter element comprises at least one open end disk, wherein a fluid channel is arranged at an inner side of the cover.

A further object is solved according to an aspect of the invention by a seal for a cover which comprises two sealing rings that are connected by flanks.

A further object according to one aspect of the invention is solved by a filter system for filtering a fluid with an exchangeable filter element receivable in its housing, wherein the housing comprises a cover and a housing part closable by the cover, wherein the cover comprises a fluid channel at an inner side of the cover which is connected in fluid communication with an interior of the filter element.

Beneficial embodiments and advantages of the invention result from the additional claims, the description, and the drawing.

According to a first aspect of the invention, a cover is proposed for a filter system with a filter element arrangeable in a housing for filtering an in particular gaseous fluid, which filter element comprises a longitudinal axis and a filter bellows arranged about the longitudinal axis and enclosing an interior, and which filter element comprises at least one open end disk with an opening to the interior, wherein a fluid channel is arranged at an inner side of the cover.

Advantageously, fluid can be guided through the cover from a fluid inlet to a fluid outlet. In particular, inlet and outlet can be arranged in the same housing part. This is advantageous in case of a tight installation space, for example, in commercial vehicles. Beneficially, the cover can be mounted at a clean side of the filter system. The filter system is preferably an air filter system that is used in commercial vehicles.

According to a beneficial embodiment of the cover, at a rim of the cover at least one opening for passage of the fluid can be arranged and the opening can be connected in fluid communication with the fluid channel. In the mounted state, in particular in the intended operating state, the fluid, for example, clean fluid, can be beneficially guided out of the interior of the filter element through the cover to one or a plurality of clean fluid consumers. For example, clean fluid can enter through the opening into the fluid channel and exit through the opening at the rim. In particular, the opening can be divided into two so that a plurality of consumers can be supplied with clean fluid.

According to a beneficial embodiment of the cover, at a rim region of the inner side of the cover at least one circumferentially extending sealing groove and/or at least one circumferentially extending sealing surface for receiving at least one seal can be provided.

In particular, according to a first embodiment, a first circumferentially extending sealing groove can surround a second circumferentially extending sealing groove, and the first sealing groove can be provided for receiving a seal for sealing between cover and a housing part of the housing between clean side and exterior region. The second sealing groove can be provided for receiving a seal for sealing between cover and housing part between clean side and raw side, wherein an opening in the rim of the cover can be arranged between the sealing grooves. The two sealing grooves form two sealing planes which are inclined relative to each other so that a separate sealing of the opening at the cover is not required.

According to an embodiment of the cover as an alternative thereto, at a rim region of the inner side of the cover a circumferentially extending sealing surface can be provided for receiving a seal which is arranged in the mounted state between cover and a housing part and between the opening in the cover and the housing part. Advantageously, the cover can seal a plurality of regions of the housing with different sealing functions. Advantageously, a one-piece seal can be used for different sealing regions of the cover. Mounting of the seal is simplified.

According to a beneficial embodiment of the cover, at the inner side of the cover a receptacle formed at one side can be arranged that surrounds at least in section the fluid channel and that can be provided for supporting a complementary bead of the filter element. Advantageously, the receptacle of the cover and the bead at the open end disk can be substantially embodied in a U-shape. The fluid region is therefore not completely surrounded by the receptacle and the bead. Due to the open region, fluid can flow through the cover, for example, out of the cover. Beneficially, the filter element can be axially compressed by the receptacle. Fluid can flow through the region of the cover at which no receptacle must be provided because the corresponding region of the end disk has no bead. The cover can provide due to the receptacle a securing means against tilting of the filter element which simplifies mounting and demounting even for the loaded filter element.

According to a beneficial embodiment of the cover, at an inner rim of the receptacle a rib can be arranged that is provided to project in the mounted state into the interior of the filter element. Advantageously, water that emerges when filtering can be returned into the filter element and discharged via the housing of the filter system.

According to a beneficial embodiment of the cover, at the inner side of the cover a circumferentially extending collar can be provided that provides a circumferentially extending sealing surface for a radial seal at the filter element which seals clean side relative to raw side of the filter system. Advantageously, the sealing action between clean side and raw side is simplified.

According to a further aspect of the invention, a seal comprising two sealing rings connected by flanks is proposed for a cover.

Beneficially, a one-piece seal can be used which seals different regions of the filter system. The seal installation is simplified.

According to a beneficial embodiment of the seal, one of the sealing rings can be angled relative to the other one. In this way, three-dimensionally displaced sealing regions can be sealed.

According to a further aspect of the invention, a filter system for filtering a fluid is proposed with an exchangeable filter element receivable in its housing, wherein the housing comprises a cover and a housing part closable by the cover, wherein the cover comprises at an inner side of the cover a fluid channel which is connected in fluid communication with an interior of the filter element.

In this way, outlet and inlet can be arranged tightly adjacent to each other at a single housing part and the fluid can experience through the cover a directional reversal beneficial therefor. Advantageously, the cover can be mounted at a clean side of the filter element which, in case of limited installation space in particular in commercial vehicles, can be very beneficial.

According to a beneficial embodiment of the filter system, the housing part can comprise a circumferential collar with a sealing surface for a first sealing ring and a sealing surface for a second sealing ring of a seal at an opening at a socket in the housing part. The sealing action can be realized with a one-piece seal.

BRIEF DESCRIPTION OF THE DRAWINGS

Further advantages result from the following drawing description. In the drawings, embodiments of the invention are illustrated. The drawings, description, and the claims contain numerous features in combination. A person of skill in the art will consider the features expediently also individually and combine them to expedient further combinations.

DESCRIPTION OF PREFERRED EMBODIMENTS

Figure 1:
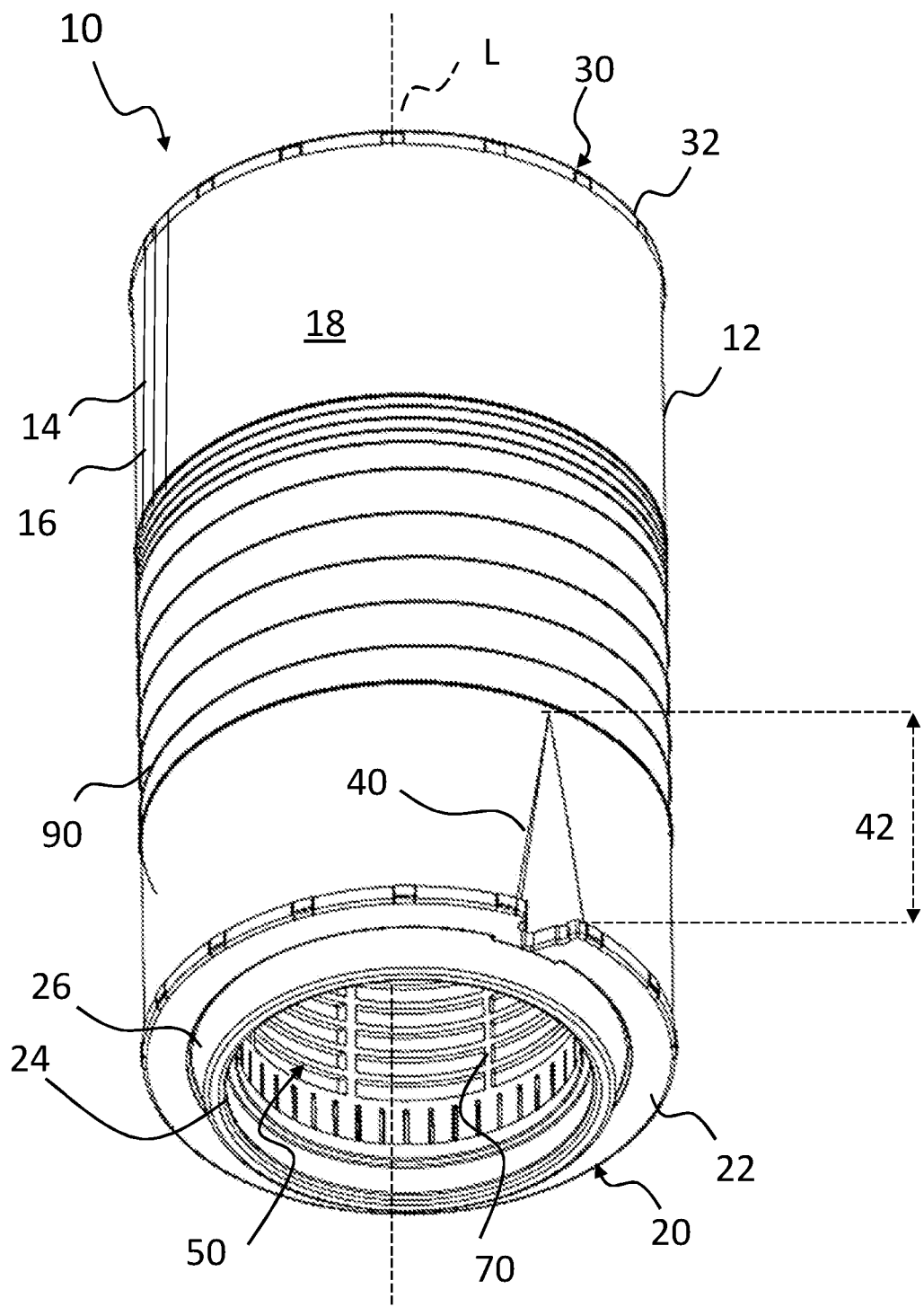
FIG. 1 shows a beneficial filter element with spread-apart folds at one end of the filter element.

In the Figures, same or same type components are identified with same reference characters. The Figures show only examples and are not to be understood as limiting.

FIGS. 1 to 28 show filter elements 10 with a filter bellows 12 that in an appropriately adapted form is suitable as a filter element 10 according to the invention. In particular, the filter bellows 12 comprises one or a plurality of notches 40, 44.

FIGS. 1 to 13 illustrate a first filter element 10 (FIGS. 1-6) and a filter housing 102 as well as a filter system 100 (FIGS. 7 to 13).

Figure 2:
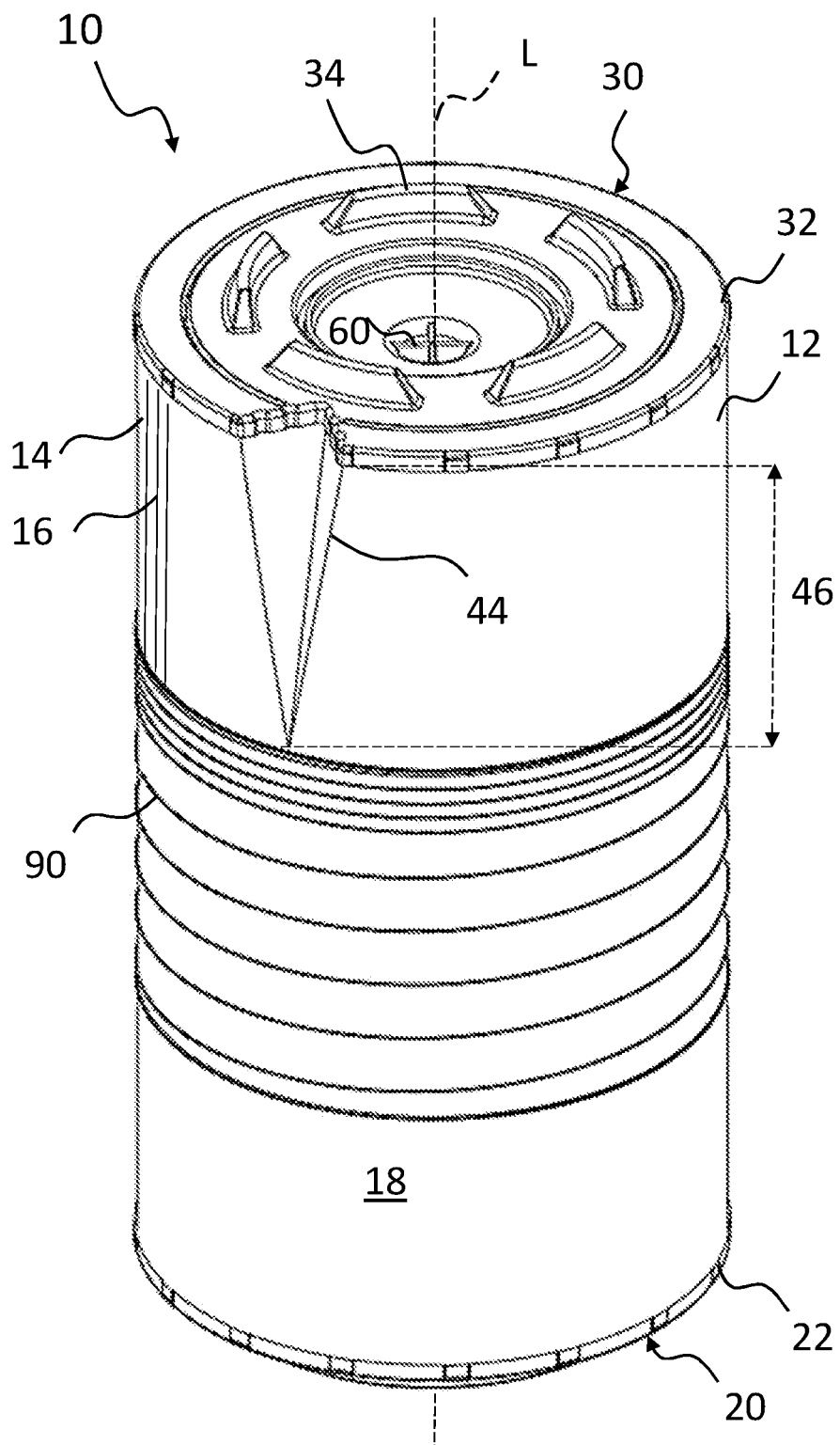
FIG. 2 shows the filter element according to FIG. 1 with spread-apart folds at the opposite end of the filter element.

As can be seen in FIGS. 1 and 2, the filter element 10 comprises a filter bellows 12 which extends along a longitudinal axis L and surrounds an interior 50.

The filter bellows 12 is formed, for example, of a folded filter material that is formed to filter bellows 12, closed all around, and arranged on a support tube 70. The support tube 70 can comprise an inwardly pointing rib.

In FIGS. 1 and 2, the folds 14 are indicated only in an exemplary fashion and extend across the entire length of the filter bellows 12. The longitudinal edges 16 of the folds 14 are positioned on an outer circumferential surface 18 of the filter bellows 12. The filter bellows 12 is formed in this example as a round element.

At a first end face end 20 and a second end face end 30, oppositely positioned thereto, of the filter element 10, end disks 22, 32 are arranged which seal the filter bellows 12 at its end edges. The end disks 22, 32 can be formed in a conventional manner, for example, of foamed polyurethane.

At the first end 20, an end disk 22 is arranged which is open toward the interior 50. At the oppositely positioned second end 30, a closed end disk 32 is arranged. The closed end disk 32 comprises outwardly projecting circular segment-type spacer knobs 34 that surround at a constant radius a pin 60 extending into the interior 50. The spacer knobs 34 can serve for supporting the filter element 10 in a housing.

The open end disk 22 comprises an outwardly extending ring 26 which surrounds the opening 24 in the end disk 22. The ring 26 can serve as a seal. Preferably, end disk 22 and ring 26 are formed together as one piece. In particular, the end disk can be formed together with the ring 26 of polyurethane.

The flow direction of the fluid to be filtered is oriented through the filter bellows 12. When its clean side is provided in the interior, the fluid flows from the exterior of the filter bellows 12 into the interior 50 and from there through the opening 24 out of the filter element 10. Optionally, the flow direction can also be provided in reverse.

The filter bellows 12 comprises at both its ends 20, 30 a notch 40, 44, respectively, whose axial length 42, 46 in the direction of the longitudinal axis L is shorter than the length extension of the filter bellows 12 in the direction of the longitudinal axis L. The notches 40, 44 are locally limited and do not extend across the entire length of the folded bellows 12. Preferably, the notches 40, 44 have the greatest fold edge distance at the respective end disks 22, 32 and taper with increasing distance away from the end disk 22, 32.

The notches 40, 44 widen the distance between two neighboring folds wherein the folds 14 as a whole extend across the entire length of the folded bellows 12.

Preferably, the notches 40, 44 are arranged displaced at the circumference, for example, displaced by 180° at diametrically opposed sides of the folded bellows 12. The notches can also be displaced relative to each other at angles that are different from 180°.

Between the notches 40, 44, fixation elements 90 can be provided which ensure that in this region the spacing between the folds 14 remains constant. Optionally, conventional fixation elements 90 such as thread coils, glue beads, beads of hot melt, embossments ("pleatlock") transverse to the longitudinal edges 16 of the folds 14, and the like can be provided.

The notches 40, 44 can be produced in various ways. They can be introduced into the filter bellows 12 after the optional fixation elements 90 have already been applied. The notches 40, 44 can be introduced during manufacture of the end disks 22, 32 into the filter bellows 12 or by insertion parts or spreading elements at the support tube and the like. The two notches 40, 44 at the filter bellows can be formed in the same manner or with different methods.

It can be optionally provided that only one notch 40 or 44 is present at the filter element 10.

Figure 4:
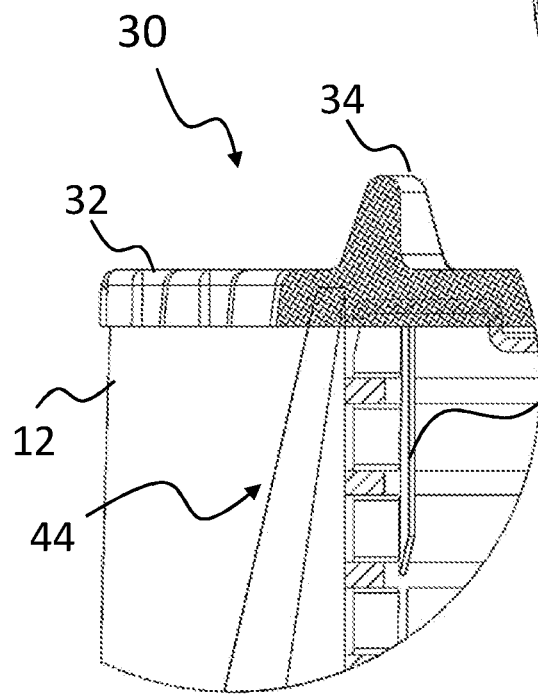
FIG. 4 shows a detail of the filter element according to FIG. 1 at its closed end disk.
Figure 3:
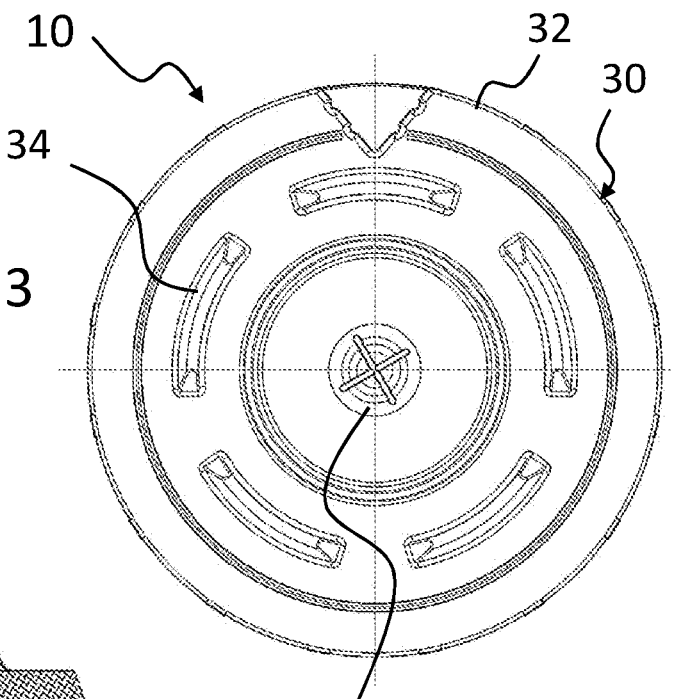
FIG. 3 shows a plan view onto a closed end disk of the filter element according to FIG. 1.
Figure 5:
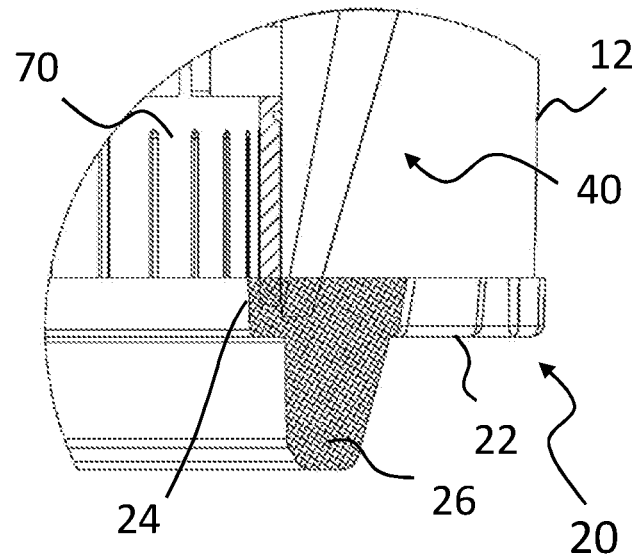
FIG. 5 shows a detail of the filter element according to FIG. 1 at its open end disk.
Figure 6:
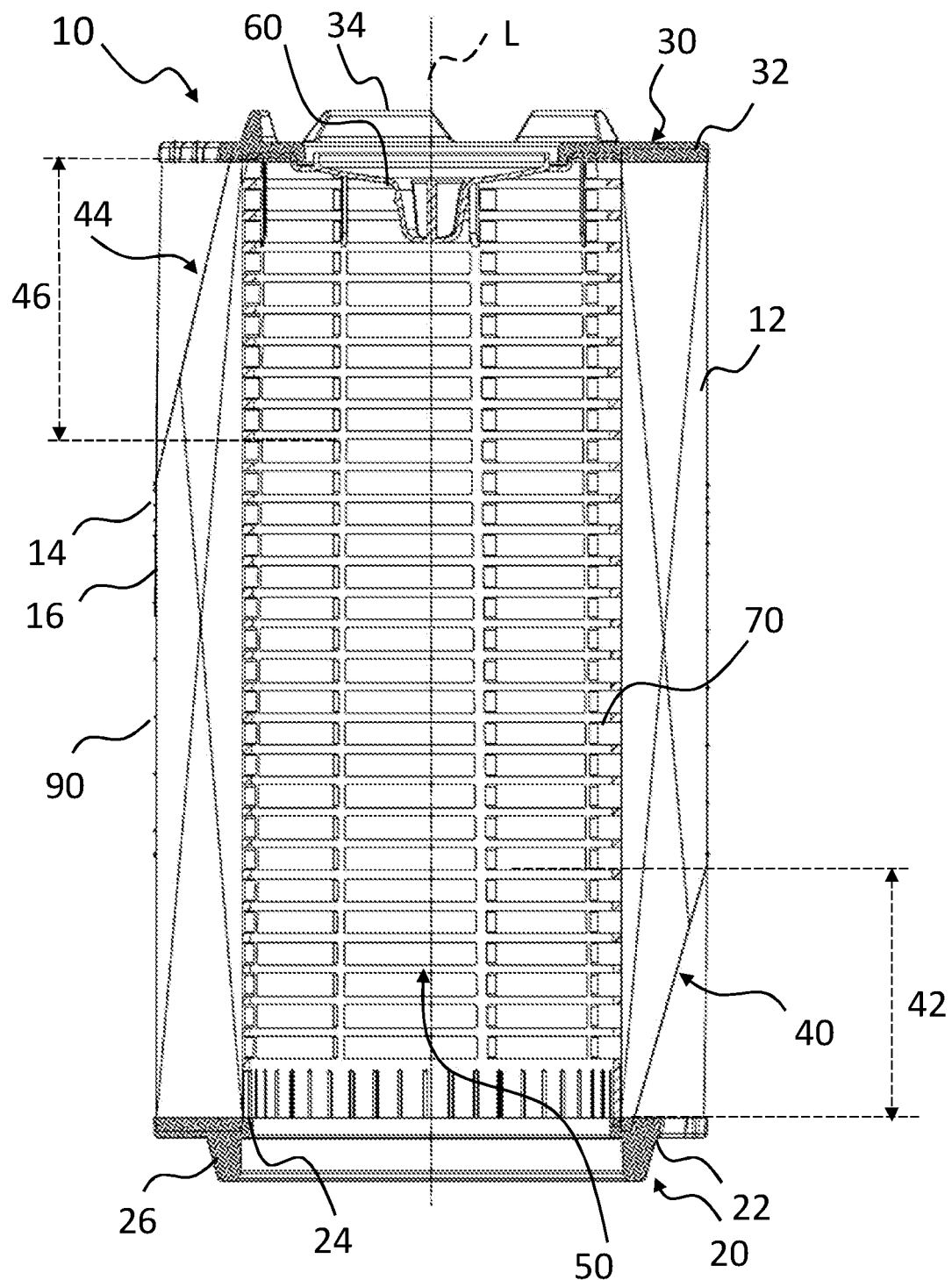
FIG. 6 shows a longitudinal section of the filter element according to FIG. 1.

As can be seen in FIGS. 3 to 6, the notches 40, 44 extend from a notch in the end disk 22, 32. FIG. 3 shows a plan view of the closed end disk 32 of the filter element 10 according to FIG. 1; FIG. 4 a detail of the filter element 10 at its closed end disk 32; and FIG. 5 a detail of the filter element 10 at its open end disk 22. FIG. 6 shows a longitudinal section of the filter element 10 according to FIG. 1.

When mounting the filter element 10, the notch can advantageously effect frictional locking against a counter element in a housing 102 and reduce the risk of tilting of the filter element 10 during installation in the housing 102.

The notches 40, 44 are kept in shape by the material of the end disk 22, 32.

In this context, it is possible that the end disk 22, 32 comprises within the notch a minimal protrusion relative to the folds that are spread apart by the respective notch 40, 44. This enables a compression of the notches 40, 44 upon installation into a housing part that comprises a respective corresponding counter contour relative to the notches 40, 44.

Optionally, only one or none of the end disks 22, 32 can be provided with a notch when in the region of the filter bellows 12 adjoining the end disks 22, 32 notches 40, 44 are provided. This enables the use of the rim of the notch-free end disk for radial sealing.

The closed end disk 32 comprises in this embodiment an inwardly curved surface having at its center a pin 60 projecting into the interior 50.

The notches 40, 44 enable an installation of the filter element 10 in a correct position in a housing. In cooperation with the pin 60, it can be achieved that a stable positioning of the filter element 10 is achieved. This is particularly advantageous when the filter element 10 is installed into a recumbent housing. The notches 40, 44 and the pin 60 prevent a tilting of the filter element 10.

Figure 7:
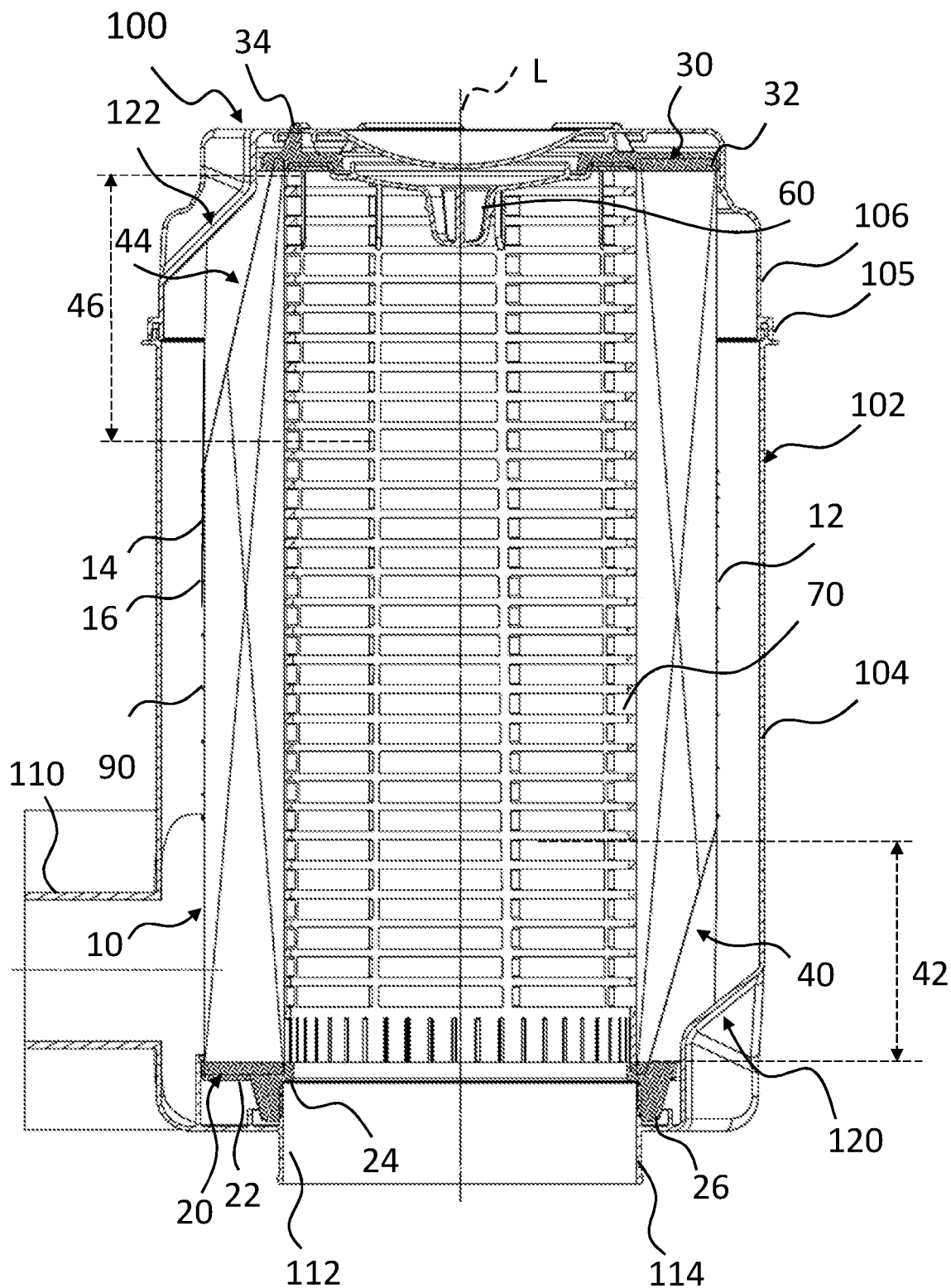
FIG. 7 shows a longitudinal section of a filter system with housing in which a filter element according to FIG. 1 is inserted.
Figure 8:
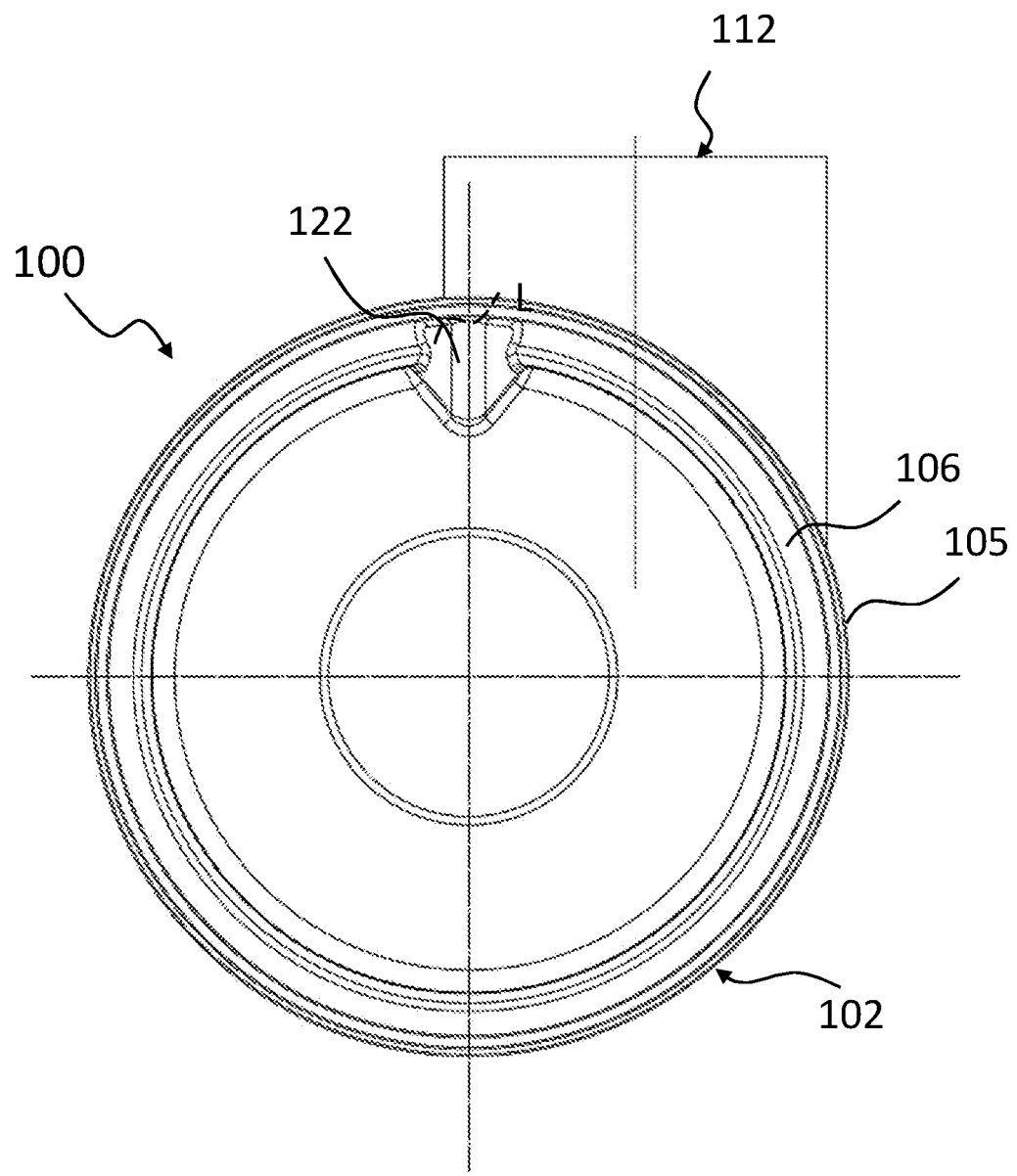
FIG. 8 shows a plan view of the filter element according to FIG. 7.
Figure 9:
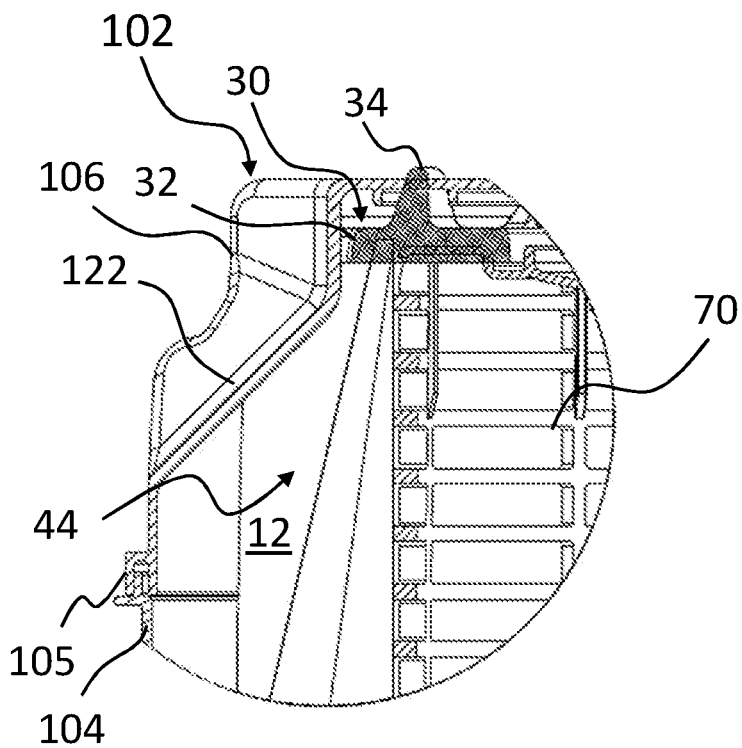
FIG. 9 shows a detail of the filter system according to FIG. 7 at its closed end disk.
Figure 10:
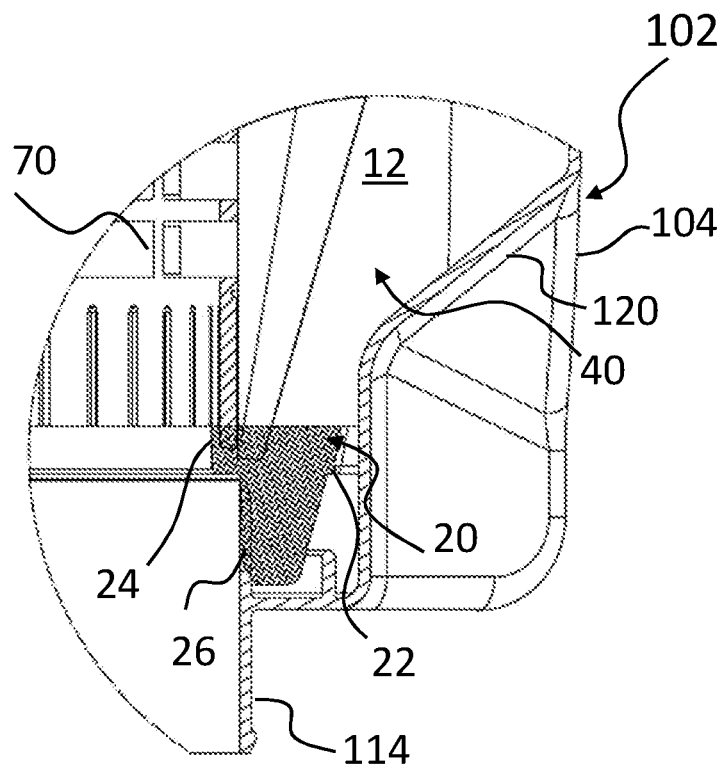
FIG. 10 shows a detail of the filter system according to FIG. 7 at its open end disk.
Figure 11:
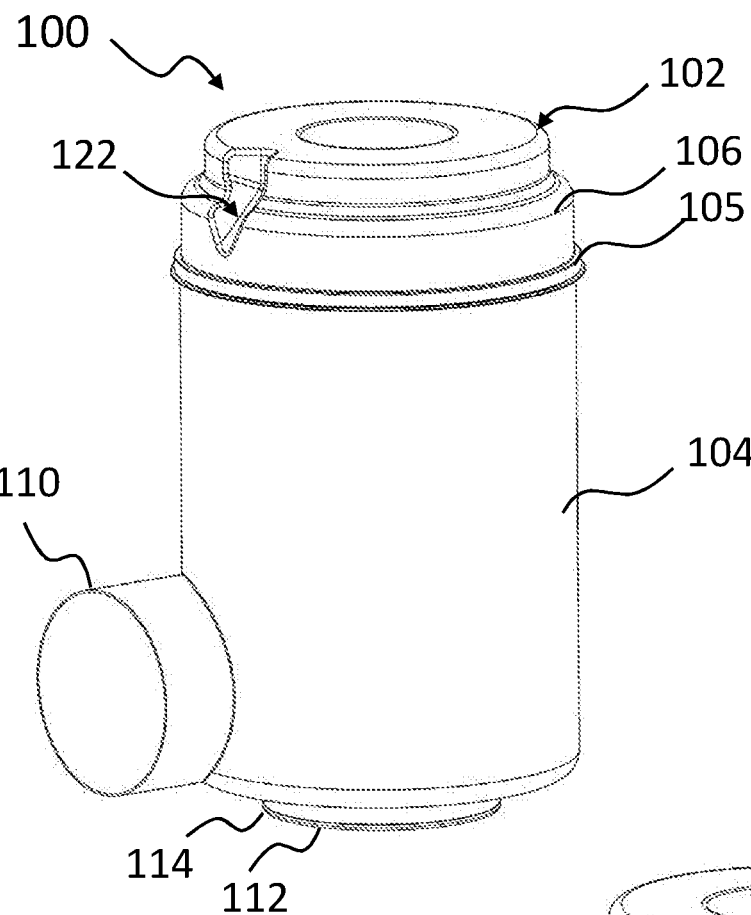
FIG. 11 shows an isometric view of the filter system according to FIG. 7 from a first side.
Figure 12:
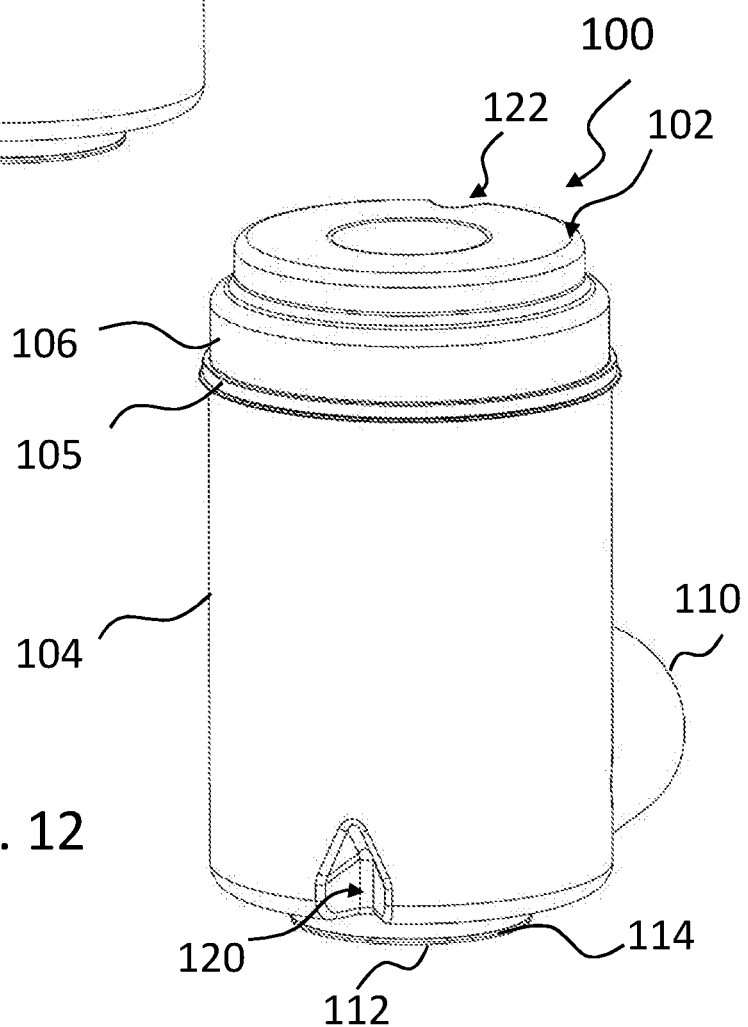
FIG. 12 shows an isometric view of the filter system according to FIG. 7 from a second side opposite the first side.
Figure 13:
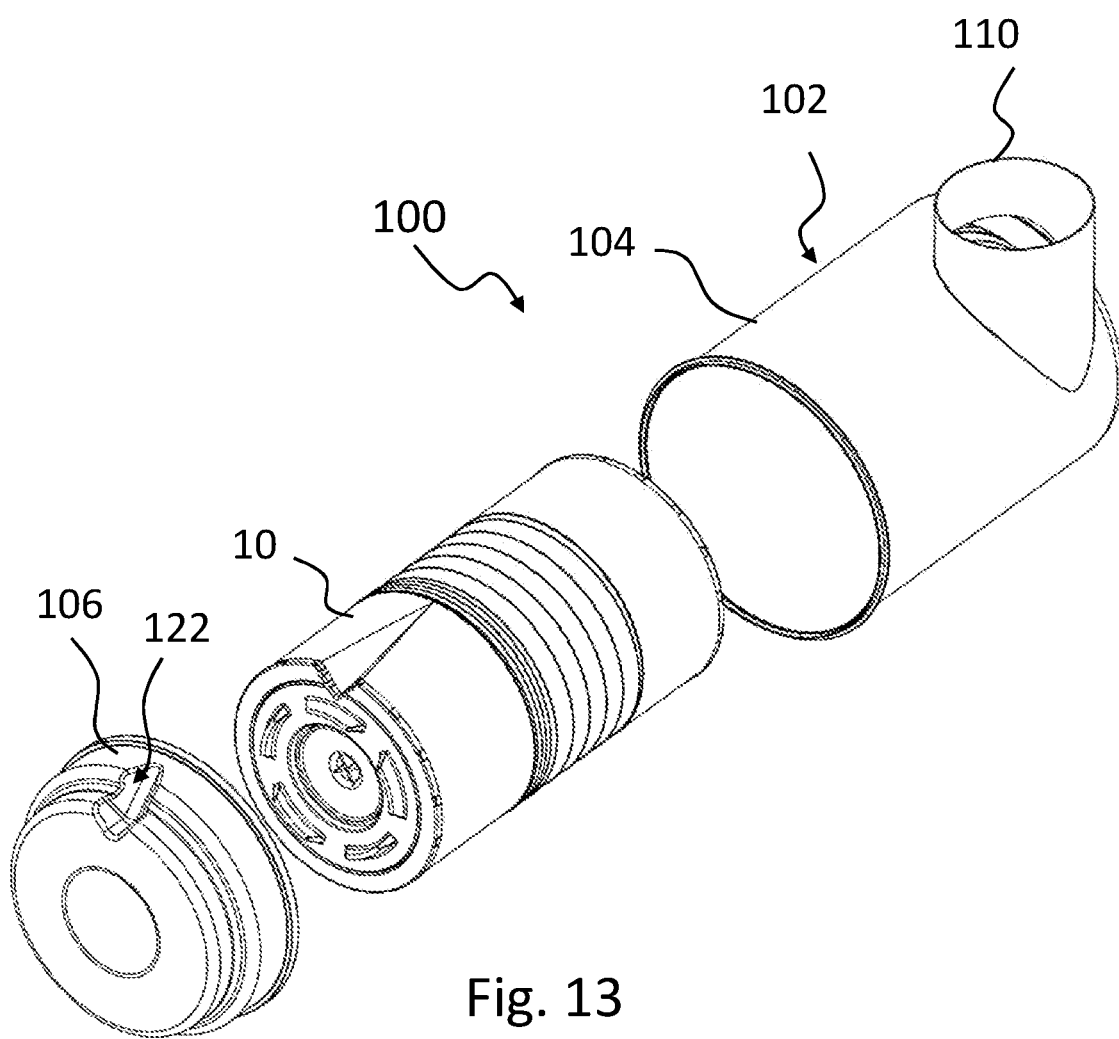
FIG. 13 shows an exploded illustration of the filter system according to FIG. 7.

The filter system 100 with housing 102 is illustrated in FIGS. 7 to 13. In this context, FIG. 7 shows a longitudinal section of the filter system 100 with housing 102 into which a filter element 10 according to FIG. 1 is inserted. FIG. 8 shows a plan view of the filter system 100, and FIGS. 9 and 10 show details of the first filter system 100 at the closed end disk 32 and at the open end disk 22 of the filter system 10. FIG. 11 shows an isometric view of the filter system 100 from a first side, and FIG. 12 shows an isometric view of the filter system 100 from a second side oppositely positioned to the first side. FIG. 13 shows an exploded illustration of the filter system 100.

The housing 102 is comprised of a first housing part 104, for example, a housing pot, and of the second housing part 106, for example, a cover. The two housing parts 104, 106 are connected to each other, in particular detachably, at a connection 105. The second housing part 106 comprises at its end face an inwardly curved surface which corresponds with the curved end face of the closed end disk 32 of the filter element 10.

The housing 102 comprises a respective corresponding notch 120, 122 matching the notches 40, 44 of the filter element 10 at its first open end disk 22 and at its second closed end disk 32. This can be seen in the plan view of the housing 102 in FIG. 8. The notch 122 is provided in the housing 102 corresponding to the notch 44 at the end 30 with the closed end disk 32.

The housing 102 comprises a first fluid connector 110, for example, an air inlet, and a second fluid connector 112, for example, an air outlet. The first fluid connector 110 is arranged tangentially to the first housing part 104 of the housing 102 so that the fluid can enter the housing 102, for example, tangentially. The second fluid connector 112 is embodied as a central socket 114 at the first housing part 104 and extends in longitudinal direction L away from the filter element 10.

As shown in FIG. 9, the spacer knobs 34 of the closed end disk 32 are resting against the inner side of the second housing part 106 and enable in axial direction a safe clamping of the filter element 10 when the housing 102 is closed. This enables an improvement of the stability in case of vibrations in operation of the filter element 10. The notch 122 engages in this context at least partially the notch 44 of the filter element 10.

The open end disk 22 of the filter element 10 surrounds with the ring 26 a rim of the socket 114 projecting into the interior 50 and seals radially inwardly against the rim, as illustrated in FIG. 10. The notch 120 engages in this context at least partially the notch 40 of the filter element 10.

In FIGS. 11 and 12, the side views of the filter system 100 can be seen which make visible the diametrically opposed position of the notches 120, 122 in the first and second housing part 104, 106.

The exploded illustration in FIG. 13 shows the components housing pot 104, filter element 10, and housing cover 106 of the filter system 100. The filter element 10 can be inserted into the housing 102 with positional orientation due to the notches 40, 44 and the notches 120, 122 in the housing 102.

FIGS. 14 to 20 show a further embodiment with a first manufacturing possibility of one or a plurality of notches 40 in a filter element 10. In this variant, the notch 40 in the filter bellows 12 of the filter element 10 is produced by an insertion part 250 that comprises a notch structure 252 which engages the filter bellows 12 between two folds and spreads them apart. The insertion ring 250 can be placed, for example, when producing the foamed, for example, open end disks 22, into a casting mold and can be connected with the end disk 22 and the filter bellows 12 in this way.

The further elements of the filter system 10 correspond to those of the preceding embodiment of FIGS. 1 to 13, reference being had to it for avoiding unnecessary repetitions.

Figure 14:
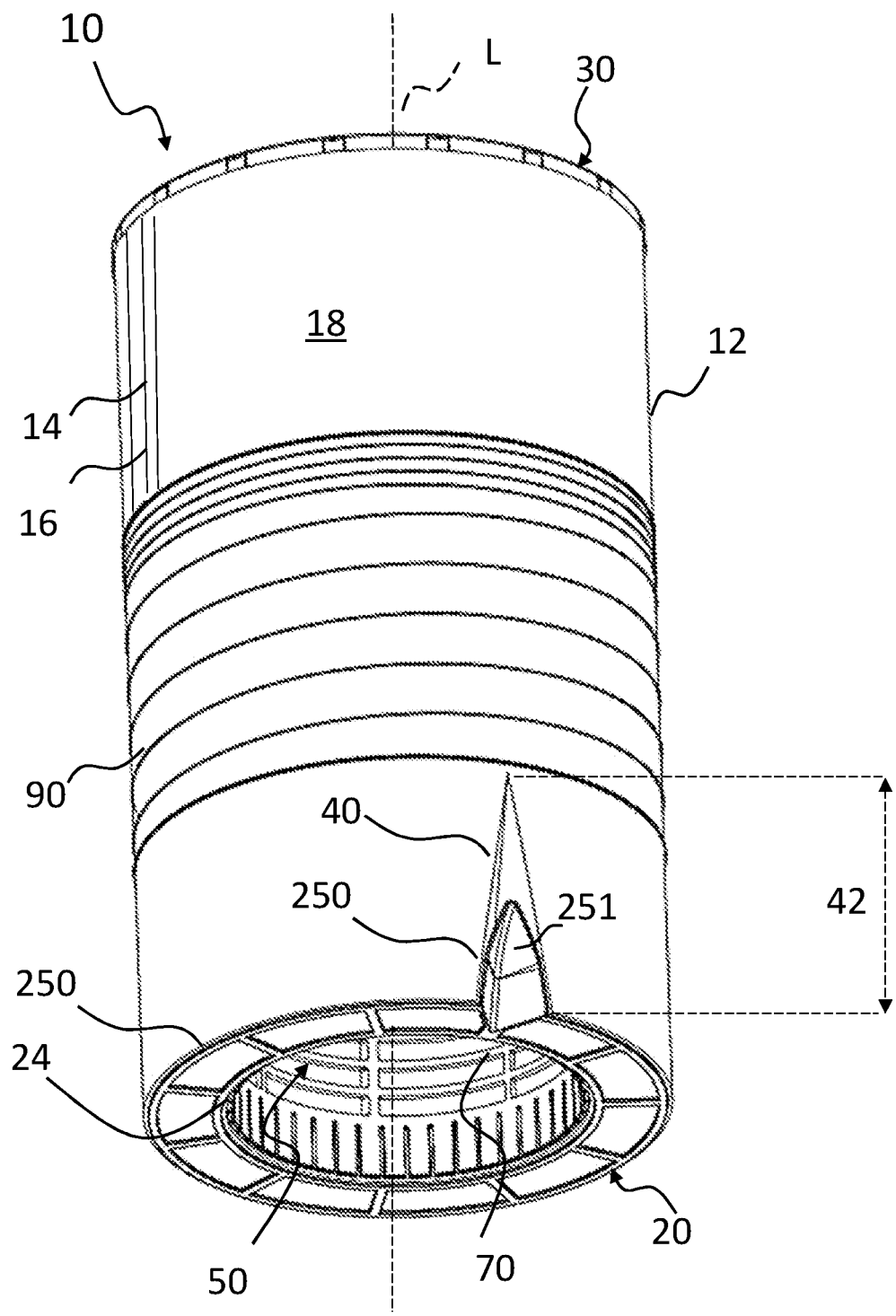
FIG. 14 shows a further beneficial filter element with a ring for local widening of distances between folds of the folded bellows prior to application of the end disk.
Figure 15:
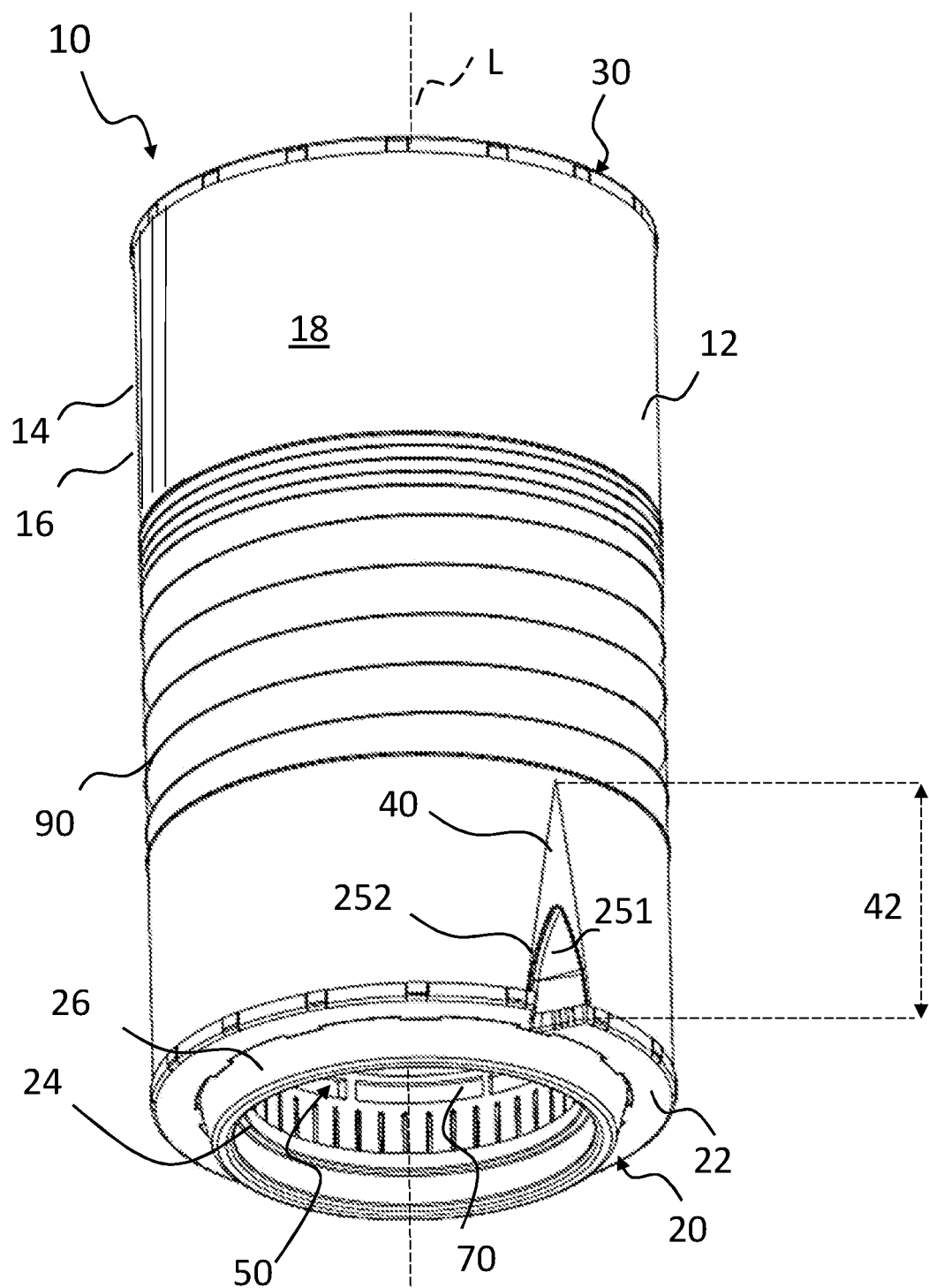
FIG. 15 shows the filter element according to FIG. 14 with foamed end disk.
Figure 16:
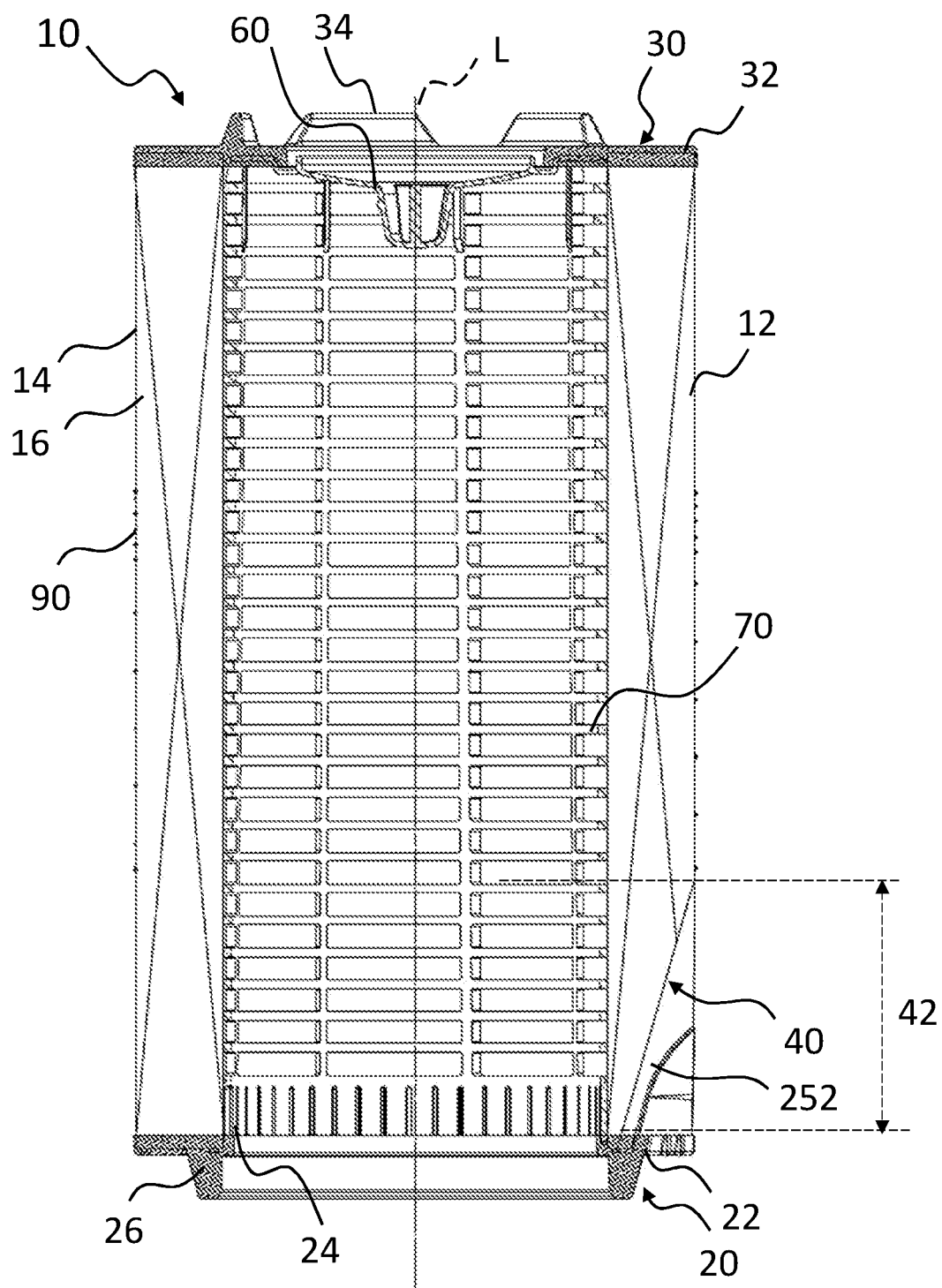
FIG. 16 shows a longitudinal section of the filter element according to FIG. 14.
Figure 17:
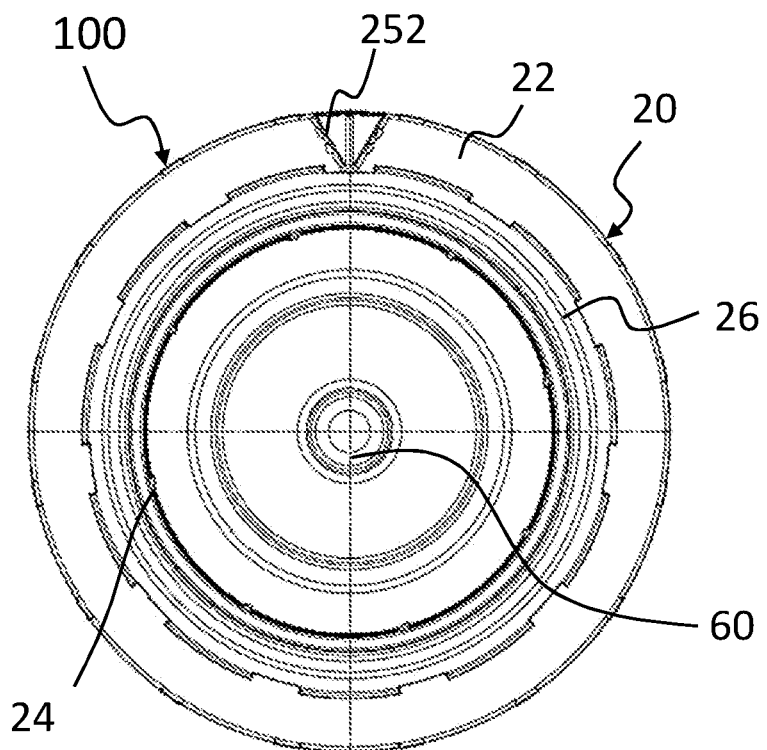
FIG. 17 shows a plan view of the filter element according to FIG. 14.
Figure 18:
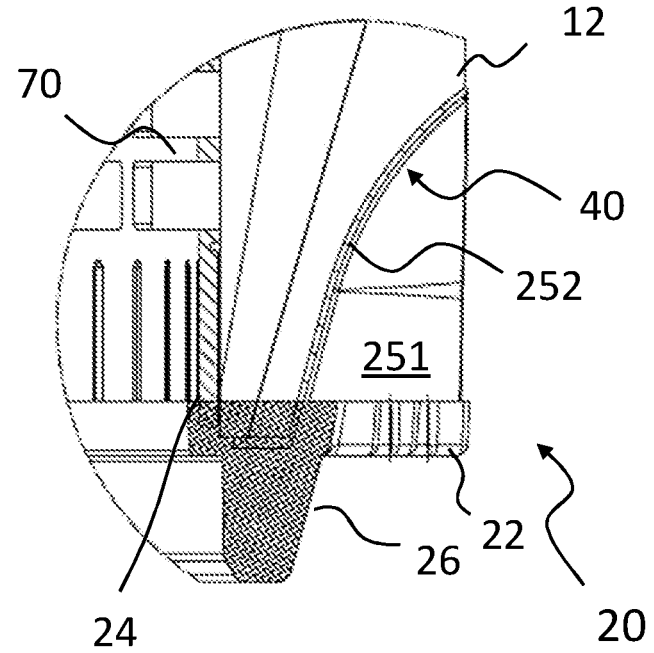
FIG. 18 shows a detail of the filter element according to FIG. 14 at an end disk.

FIG. 14 shows the filter element 10 according to a further example with a ring 250 for local widening of a distance between folds 14 of the folded bellows 12 prior to applying the end disk 22. FIG. 15 shows the filter element 10 with foamed end disk 22 and embedded insertion ring 250. FIG. 16 shows a longitudinal section through the filter element 10 with the insertion ring 250 in the open end disk 22. FIG. 17 shows a plan view of the open end disk 22 of the filter element 10, and FIG. 18 shows a detail of the filter element 10 in the connecting region end disk 22, filter bellows 12, and insertion ring 250.

Figure 19:
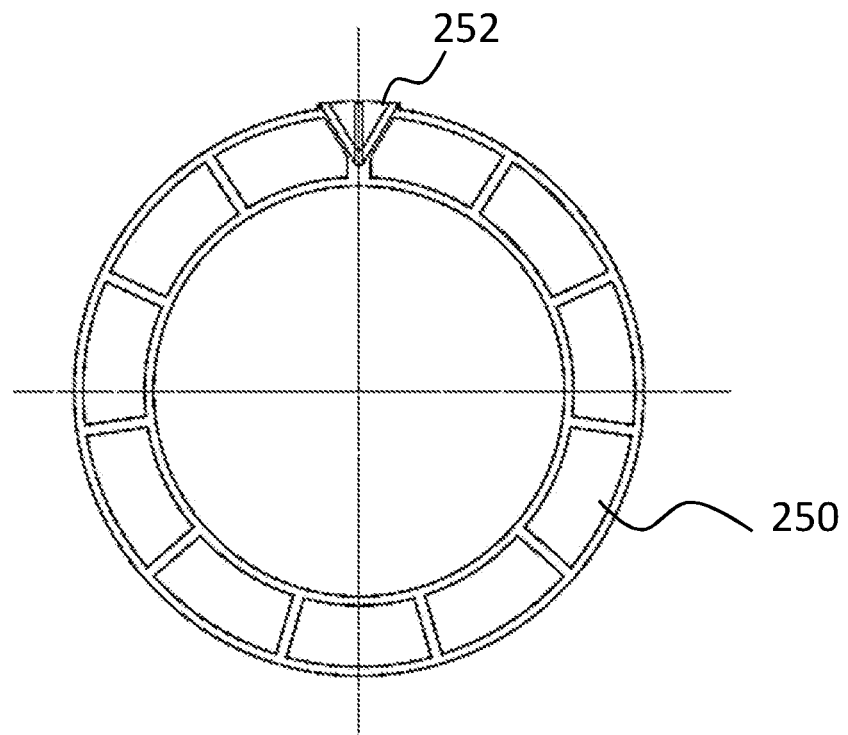
FIG. 19 shows a plan view of a ring for a filter element according to FIG. 14.
Figure 20:
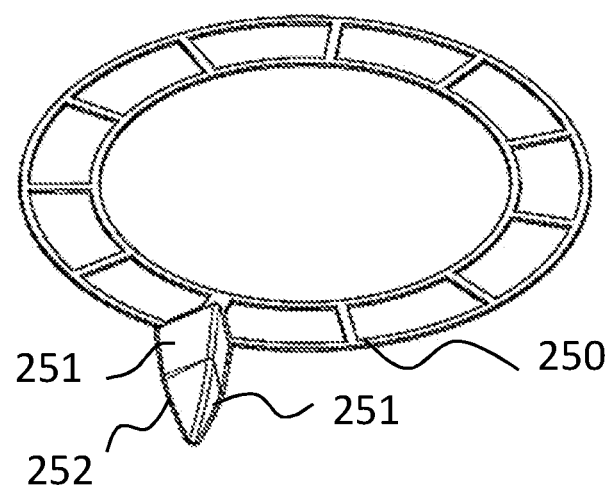
FIG. 20 shows an isometric view of the ring according to FIG. 19.

FIGS. 19 and 20 show different views of the insertion ring 250. The notch structure 252 is projecting in axial direction away from the annular surface of the insertion ring 250. In radial direction, the notch structure 252 practically has no protrusion relative to the annular surface. In this way, the notch structure 252 can engage between two folds 14 and push them apart.

The notch structure 252 is approximately wedge-shaped and comprises two curved wings 251 that are connected to each other and extend symmetrically away from their contact surface outwardly. The cross section through the connected wings 251 is approximately V-shaped and is approximately wedge-shaped wherein the two wings 251 of the notch structure 252 meet each other at the middle of the wedge shape.

The front edge of the notch structure 252 is straight and extends parallel to the longitudinal edges 16 of the folds 14 and is aligned with the longitudinal edges 16 of the folds 14. The rear side of the notch structure 252 is rounded due to a rounded shape of the wings 251 and tapers to a point in outward direction. Due to the rounded connecting seam and surface of the wings 251, the folds 14 in the filter bellows 12 can be spread apart in a gentle manner.

The filter bellows 12 is arranged on a support tube 70. The support tube 70 can comprise an inwardly pointing rib.

FIGS. 21 to 28 show a further variant for manufacturing at least one notch 44 in the folded bellows 12 of a filter element 10, in which a notch structure 72 is provided at the support tube 70 of the filter element 10. The support tube 70 can comprise an inwardly pointing rib.

Figure 21:
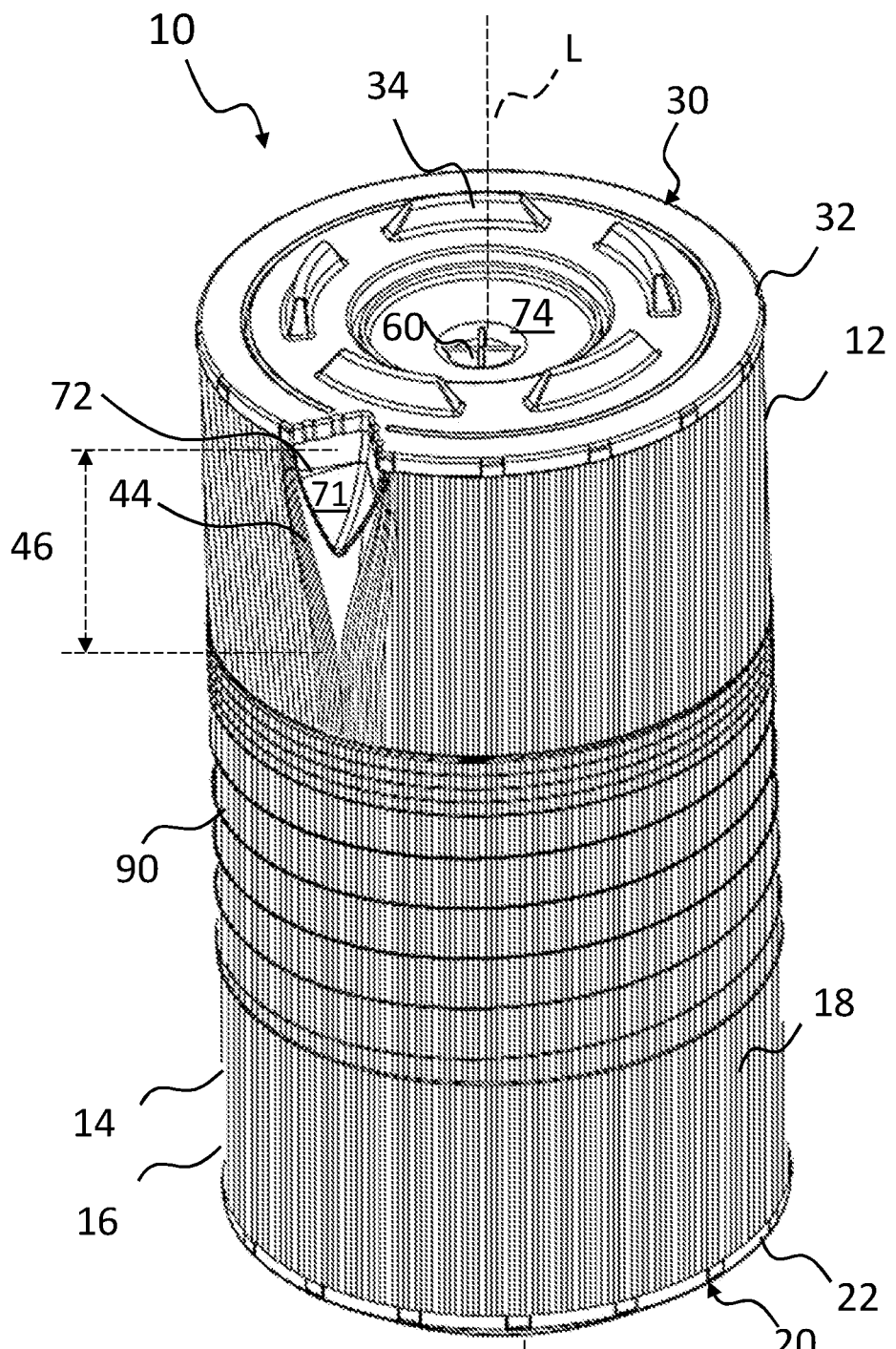
FIG. 21 shows a further beneficial filter element with a support tube for local widening of distances between folds of the folded bellows.
Figure 22:
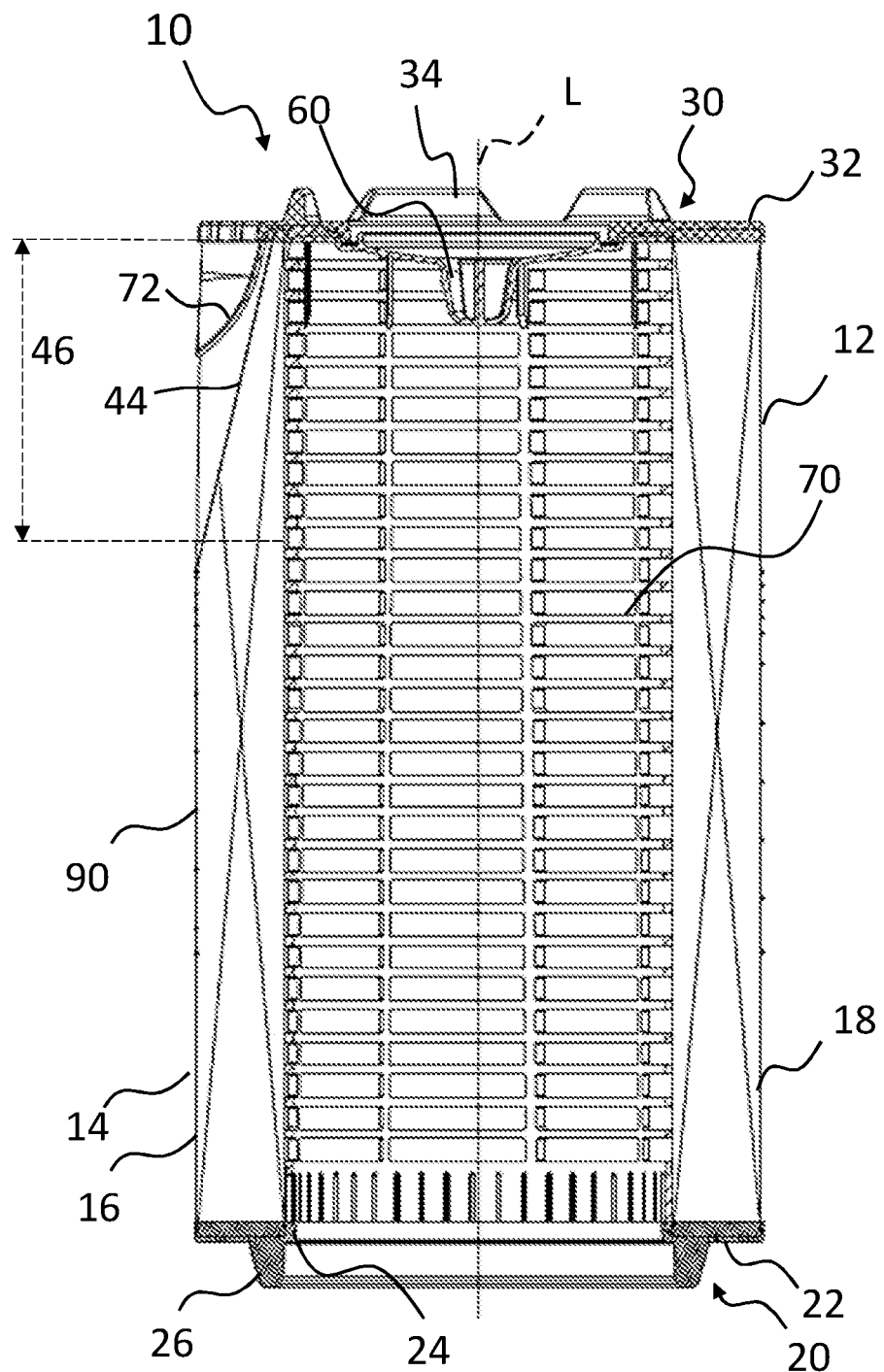
FIG. 22 shows a longitudinal section of the filter element according to FIG. 21.
Figure 23:
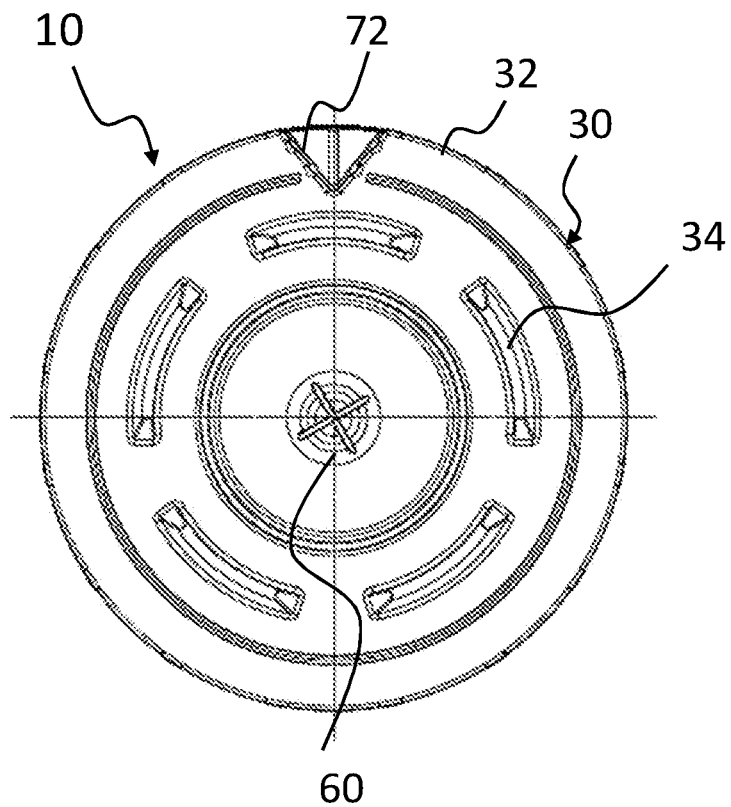
FIG. 23 shows a plan view of the filter element according to FIG. 21.
Figure 24:
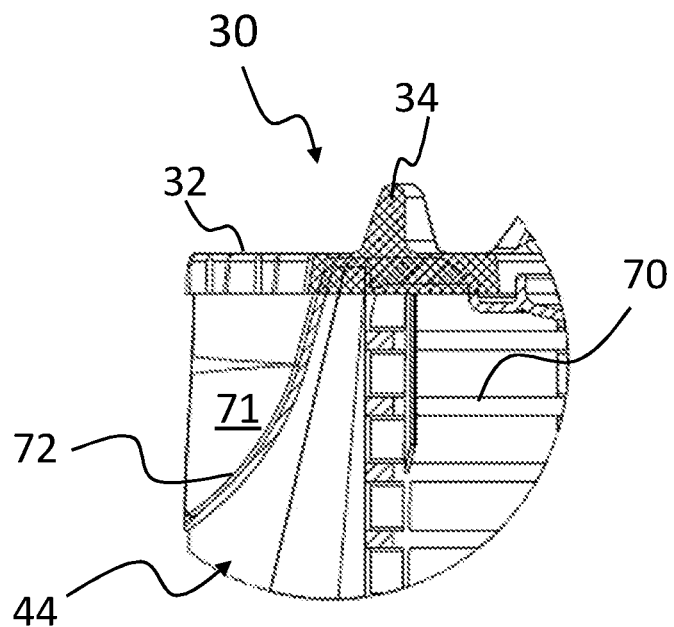
FIG. 24 shows a detail of the filter element according to FIG. 21 at an end disk.
Figure 25:
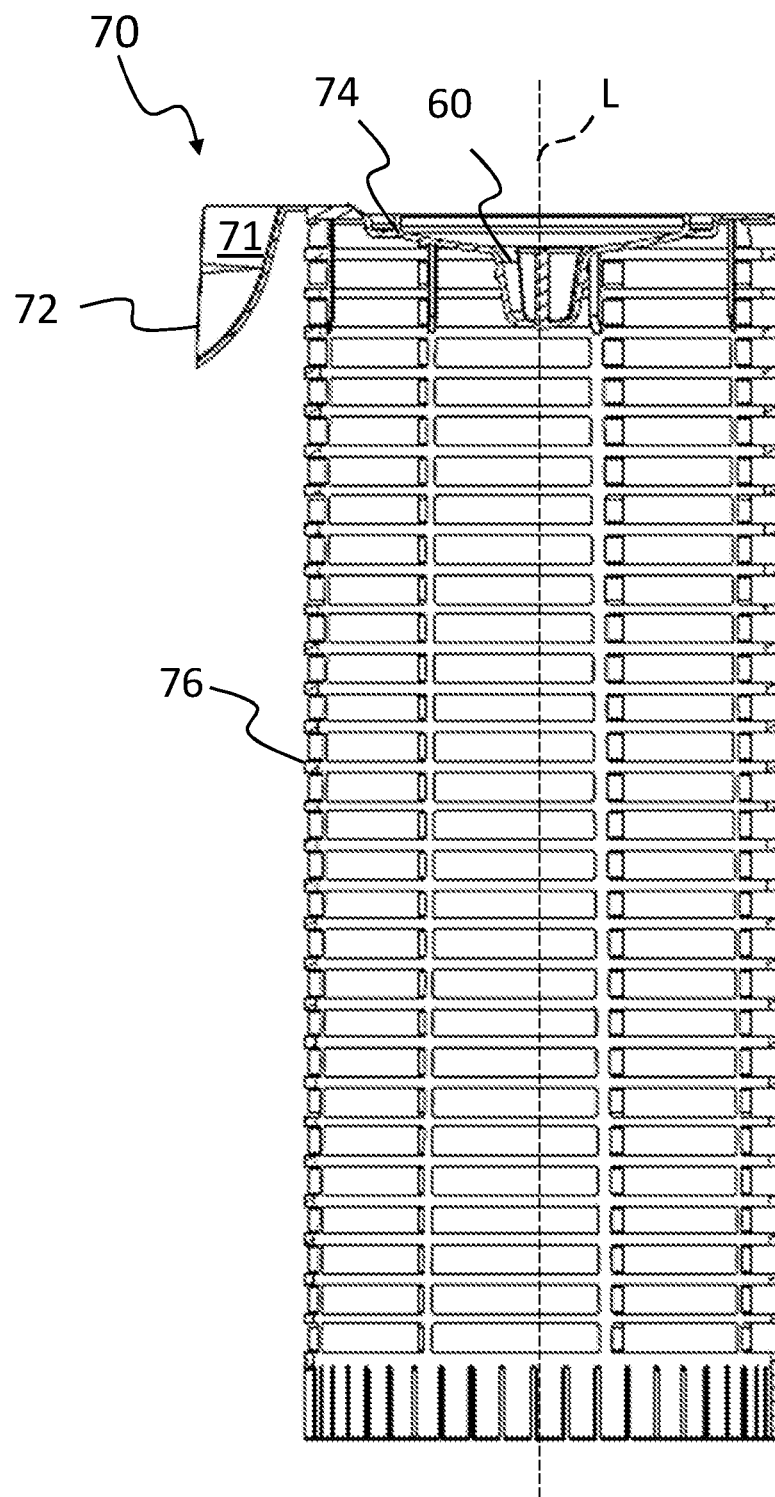
FIG. 25 shows a longitudinal section of the support tube for the filter element according to FIG. 21.
Figure 26:
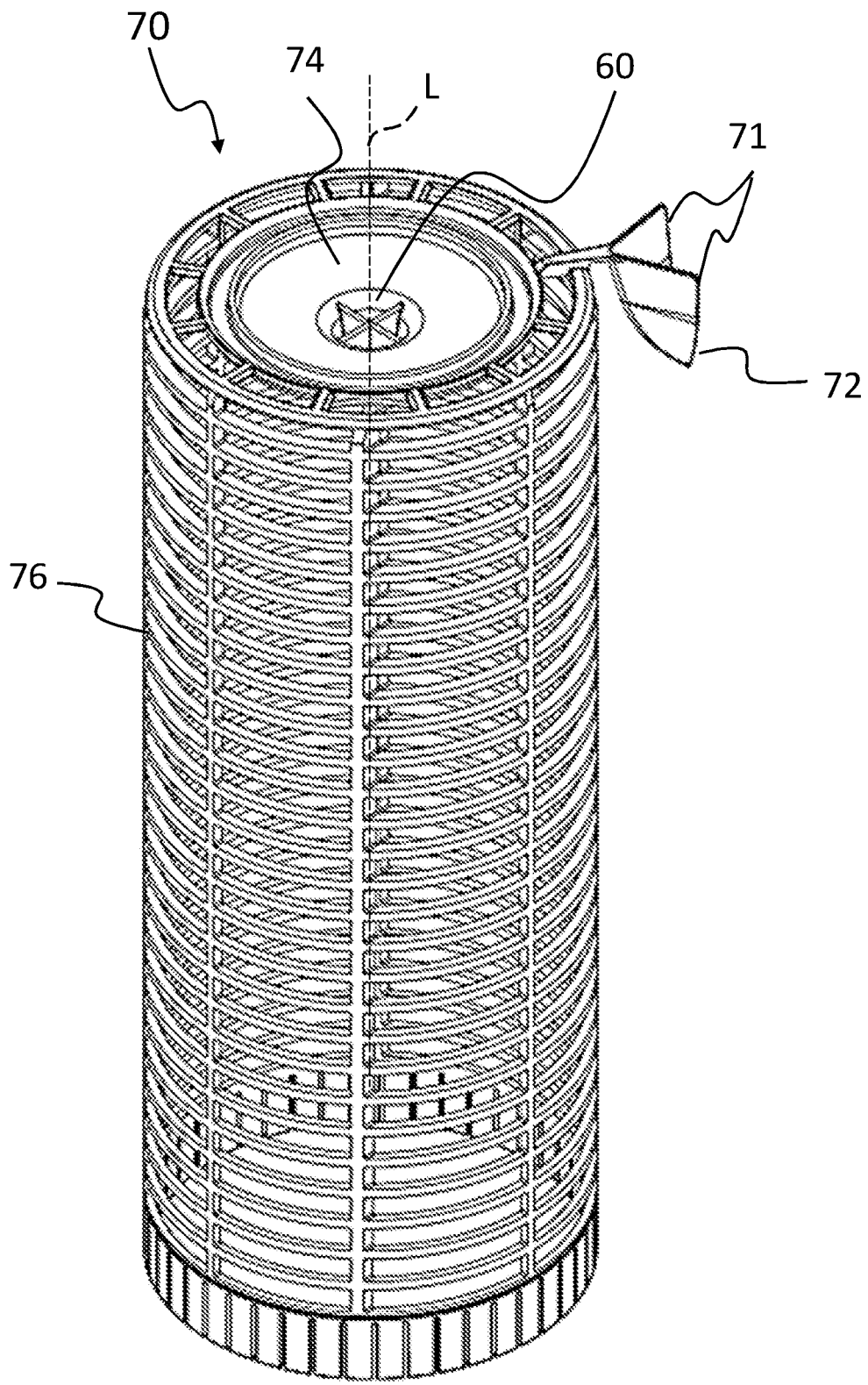
FIG. 26 shows an isometric view of the support tube according to FIG. 25.
Figure 27:
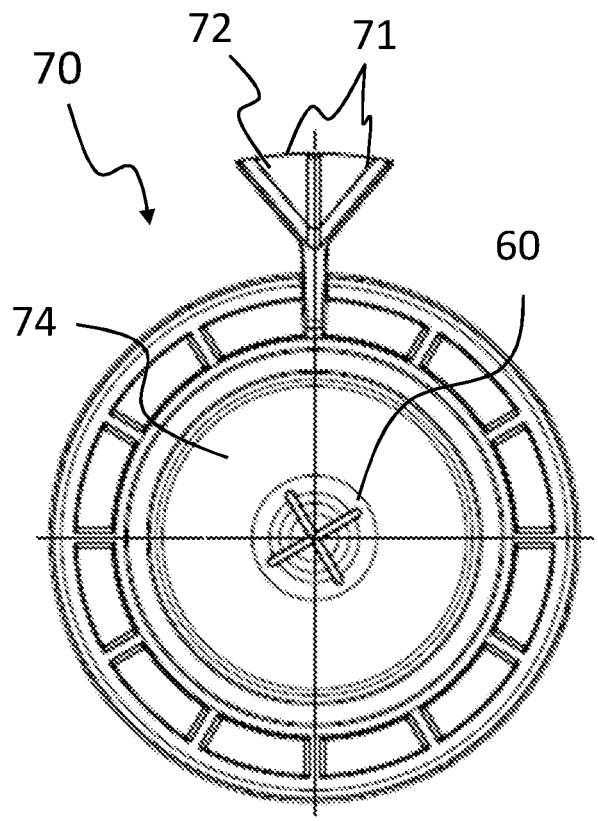
FIG. 27 shows a plan view of the support tube according to FIG. 25.
Figure 28:
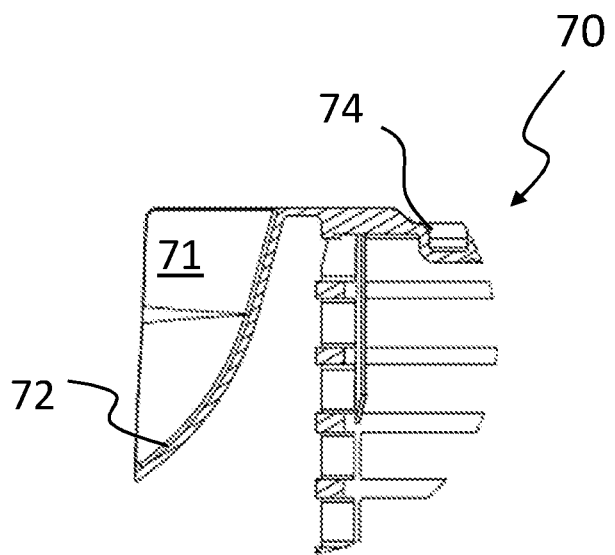
FIG. 28 shows a detail of the support tube according to FIG. 25.

FIG. 21 shows the filter element 10 with the support tube 70 that is embodied for locally widening distances between folds 14 of the folded bellows 12. FIG. 22 shows a longitudinal section, and FIG. 23 a plan view of the filter element 10. FIG. 24 shows a detail of the filter element 10 at its closed end disk 32. FIG. 25 shows a longitudinal section, and FIG. 26 an isometric view of the support tube 70. FIG. 27 shows a plan view of the support tube 70, and FIG. 28 a detail of the support tube 70.

The further elements of the filter element 10 correspond to those of the embodiment of FIGS. 1 to 13, reference being had to it for avoiding unnecessary repetitions.

As can be seen in FIGS. 21 and 22, the notch 44 in the filter bellows 12 at the closed end disk 32 of the filter element 10 is caused by a notch structure 72 of the support tube 70. Generally, the support tube 70 is closed at its closed end by a disk 74. In this example, the notch structure 72 is arranged at the closed end of the support tube 70.

The notch structure 72 of the support tube 70 engages between two folds 14 and widens their distance relative to each other in radial direction outwardly. In the end disk 32, a notch is formed in the region of the notch structure 72.

The notch structure 72 is projecting in radial direction corresponding to the thickness of the filter bellows 12 away from the support tube 70 and projects in axial direction into the filter bellows 12. The notch structure 72 is approximately wedge-shaped and comprises two curved wings 71 that are connected to each other and extend symmetrically away from their contact surface in outward direction.

The cross section through the connected wings 71 is approximately V-shaped wherein the two wings 71 of the notch structure 72 meet each other at the middle of the wedge shape. The wings 71 are somewhat rounded so that the folds 14 in the filter bellows 12 can be spread apart in a gentle manner.

The front edge of the notch structure 72 is straight and extends parallel to the longitudinal edges 16 of the folds 14 and is aligned with the longitudinal edges 16 of the folds 14. The rear side of the notch structure 72 is rounded due to the rounded shape of the wings 71 and tapers to a point in outward direction. In this manner, the notch structure 72 can engage between two folds 14 of the filter bellows 12 and push them apart. Due to the rounded connecting seam and surface of the wings 71, the folds 14 in the filter element 12 can be spread apart in a gentle manner.

Filter bellows 12 with support tube 70 and notch structure 72 are intimately connected to each other during casting of the end disk 32.

FIGS. 29 to 33 show a filter element 10 according to a further embodiment of the invention with a variant of an open end disk 22.

Figure 29:
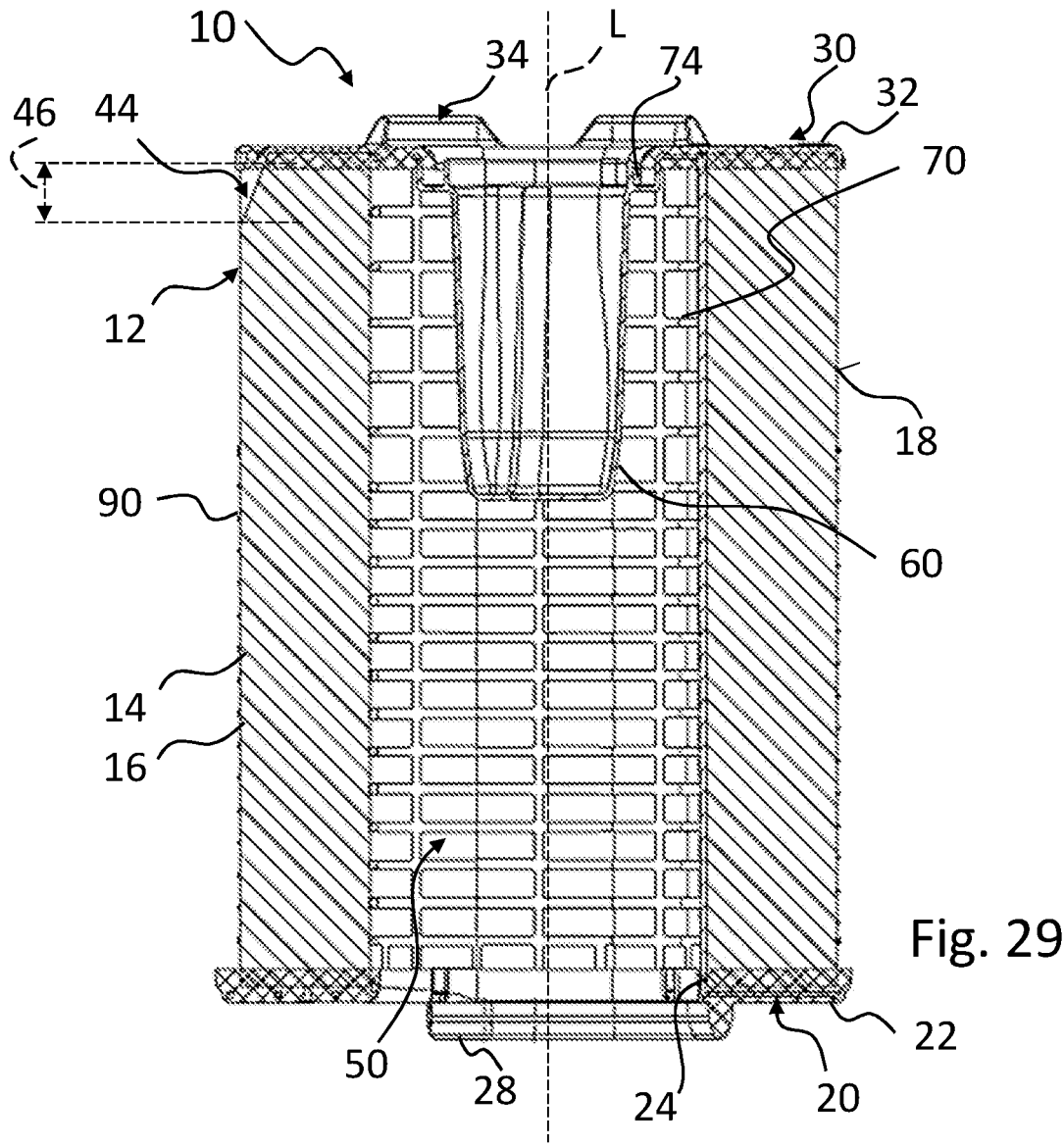
FIG. 29 shows a longitudinal section of a filter element according to an embodiment of the invention.
Figure 30:
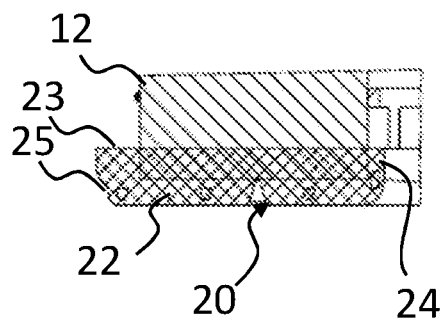
FIG. 30 shows a detail of the filter element according to FIG. 29 at its open end disk.
Figure 31:
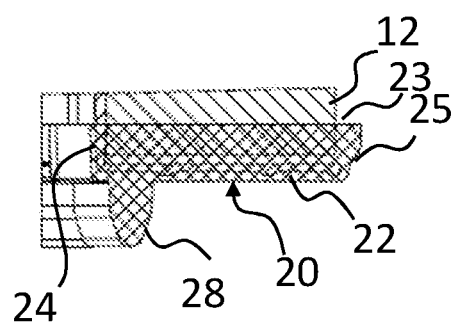
FIG. 31 shows a further detail of the filter element according to FIG. 29 at its open end disk.
Figure 32:
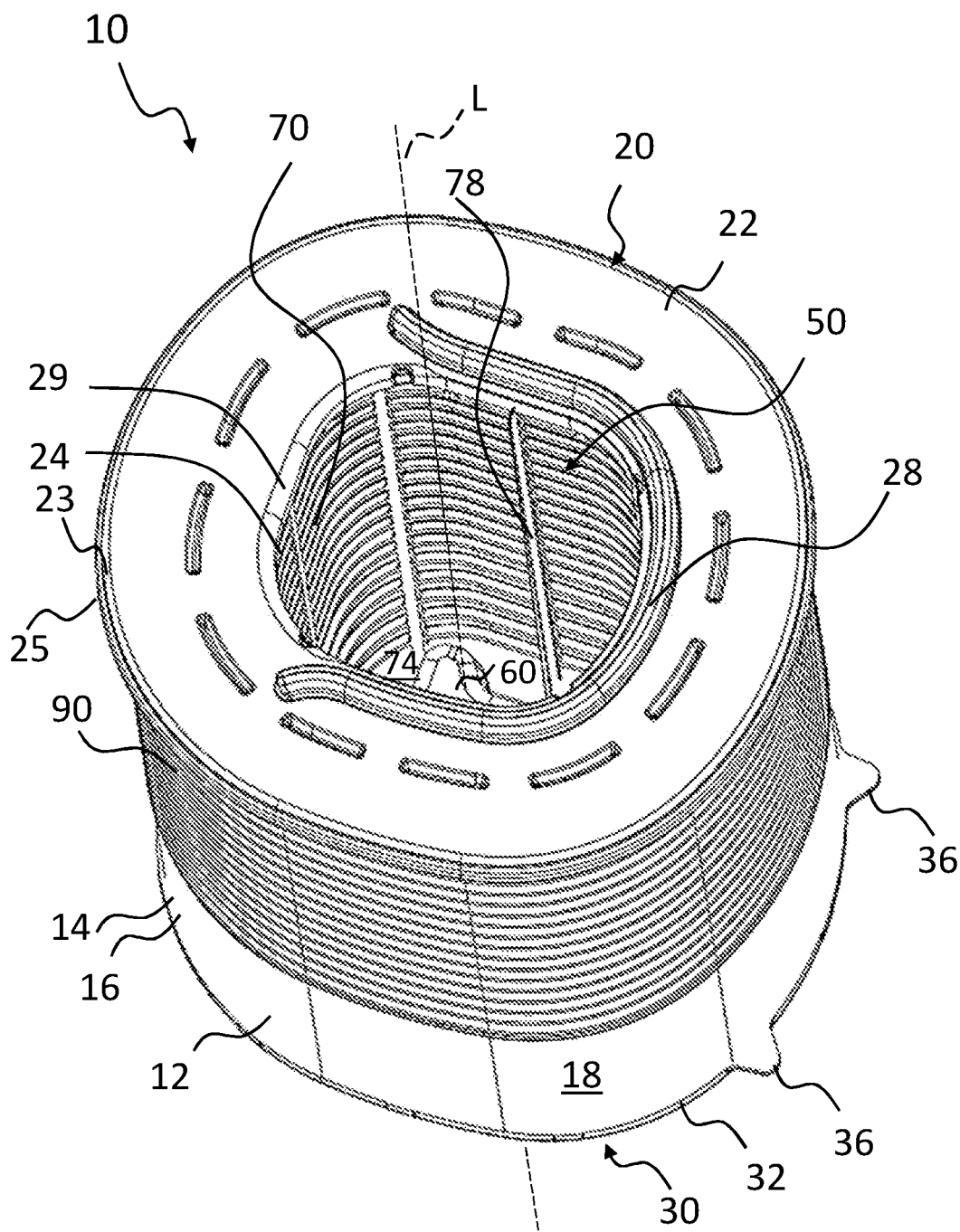
FIG. 32 shows a perspective view of the filter element of FIG. 29 viewed from its open end disk.
Figure 33:
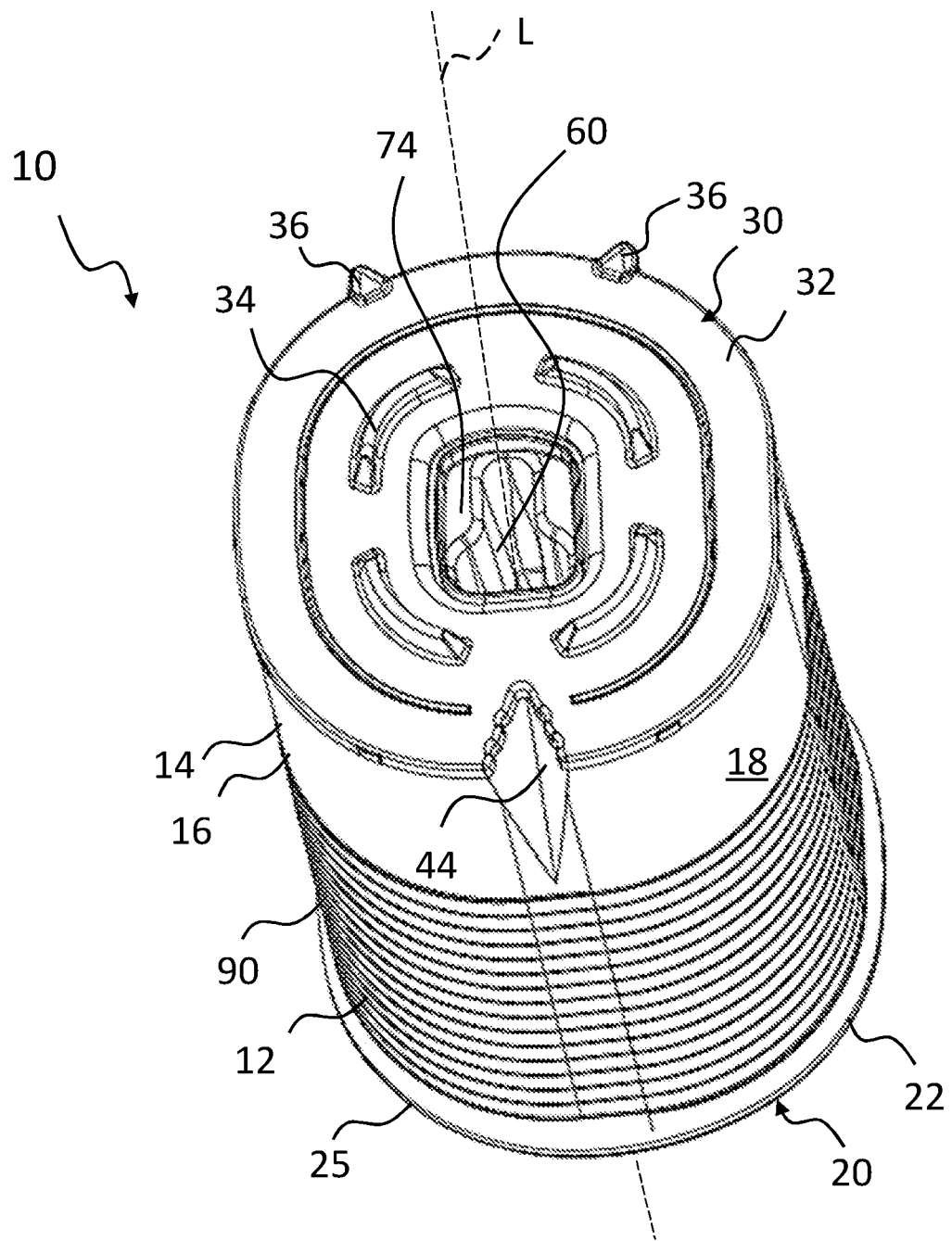
FIG. 33 shows a perspective view of the filter element according to FIG. 29 viewed from its closed end disk.

FIG. 29 shows a longitudinal section through the filter element 10, FIG. 30 shows a detail of the filter element 10 at the open end disk 22. FIG. 31 shows a further detail of the filter element 10 at the open end disk 22. FIG. 32 shows a perspective view of the filter element 10 viewed from its open end disk 22. FIG. 33 shows an isometric view of the filter element 10 viewed from its closed end disk 32.

The filter element 10 comprises a filter bellows 12 which extends along a longitudinal axis L and surrounds an interior 50. The filter bellows 12 is formed, for example, of a folded filter material that is arranged, closed all around, about the support tube 70.

The folds 14 of the filter bellows 12 extend across the entire length of the filter bellows 12. The longitudinal edges 16 of the folds 14 are positioned on an outer circumferential surface 18 of the filter bellows 12. The filter bellows 12 comprises in this example a cross section with two oppositely positioned circular arc-shaped sections that are connected to each other by straight regions.

At a first end face end 20 and a second end face end 30, oppositely positioned thereto along the longitudinal axis L, of the filter element 10, end disks 22, 32 are arranged which seal the filter bellows 12 at its end edges. The end disks 22, 32 can be formed as is conventional, for example, of foamed polyurethane.

At the first end 20, an end disk 22 that is open toward the interior 50 is arranged. At the oppositely positioned second end 30, closed end disk 32 is arranged. The closed end disk 32 comprises outwardly projecting circular segment-type spacer knobs 34 that surround a pin 60 extending into the interior 50. The spacer knobs 34 can serve for supporting the filter element 10 in the housing 102. The spacer knobs 34 are preferably formed as one piece together with the end disk 32.

The open end disk 22 comprises an outwardly facing bead 28 which surrounds in sections the opening 24 in the end disk 22. The bead 28 is preferably formed as one piece together with the end disk 22. The bead 28 has an approximately U-shaped form and extends approximately U-shaped about the opening 24 of the end disk 22 so that a portion of the opening 24 is surrounded by the bead 28 and a part is without bead. The bead 28 surrounds approximately three fourths of the circumference of the central opening 24.

In this context, the bead-free region of the opening 24 of the end disk 22 preferably has an edge 29 which is particularly strongly rounded. Through the bead-free region of the opening 24, fluid can exit into a clean channel.

The bead 28 can serve for supporting the filter element 10 in a housing. This is advantageous in particular in case of a housing in which the filter element 10 is installed in a recumbent position, i.e., with the longitudinal axis L oriented at a slant or horizontally.

For manufacturing technological reasons, embossments of spacers 218 of a casting mold 210 (FIG. 36), in which the first end disk 22 with the clean air seal 25 was cast onto the filter bellows 12, are formed in the first end disk 22. The first end disk 22 and the circumferential clean air seal 25 are comprised here of polyurethane.

Figure 35:
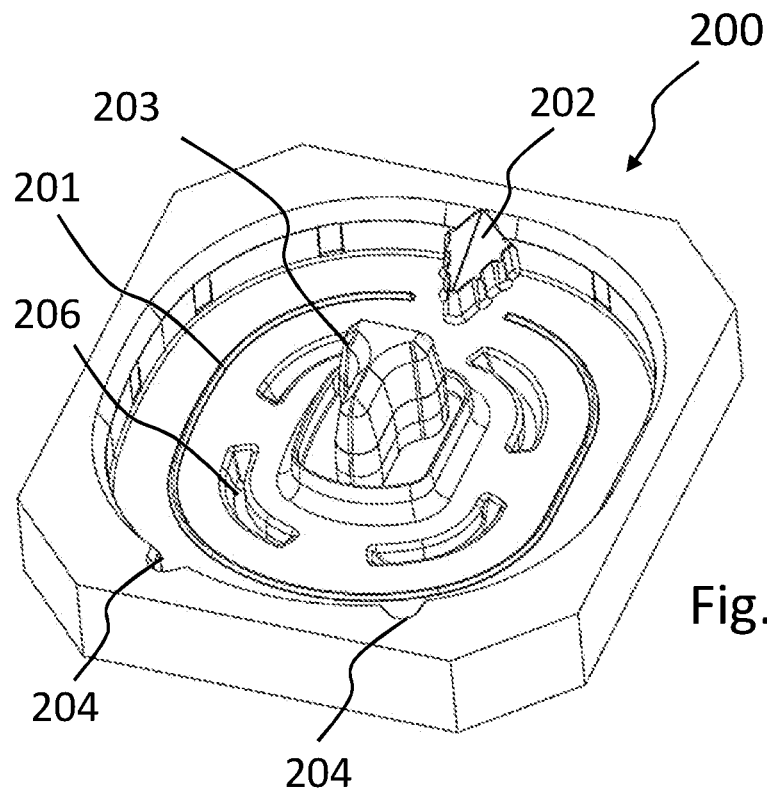
FIG. 35 shows a casting bowl for foaming a closed end disk for a filter element according to FIG. 29.

The second end disk 32 has for manufacturing technological reasons like the first end disk 22 an embossment, not identified in detail, which is caused by a spacer of a casting mold 200 (FIG. 35). The embossment of the second end disk 32 is formed substantially continuously circumferentially and interrupted only in the region of the notch 44.

The flow direction of the fluid to be filtered is oriented through the filter bellows 12. When its clean side is provided in the interior, the flow flows from the exterior of the filter bellows 12 into the interior 50 and from there through the opening 24 out of the filter element 10. Optionally, the flow direction can also be provided in reverse.

The filter bellows 12 comprises at its second end 30 a notch 44 whose axial length 46 in the direction of the longitudinal axis L is shorter than the length extension of the filter bellows 12 in the direction of the longitudinal axis L. The notch 44 is locally limited and does not extend across the entire length of the folded bellows 12. Preferably, the notch 44 has the greatest fold edge distance at the end disk 32 and tapers with increasing spacing away from the end disk 32.

The notch 44 widens only the distance between two neighboring folds 14 wherein the folds 14 as a whole extend across the entire length of the folded bellows 12.

Between the notch 44 and the oppositely positioned open end disk 22, fixation elements 90 can be provided which ensure that in this region the spacing between the folds 14 remains constant. Optionally, conventional fixation elements 90 such as thread coils, glue beads, beads of hot melt, embossments ("pleatlock") transverse to the longitudinal edges 16 of the folds 14, and the like can be provided.

The notch 44 can be produced in different ways. It can be introduced into the filter bellows 12 after the optional fixation elements 90 have already been applied. The notch 44 can be introduced into the filter bellows 12 when producing the end disk 32.

Optionally, it can be provided that, as in the embodiment illustrated in FIGS. 1 to 13, a notch 40, 44 is provided at both ends 20, 30 of the filter element 10.

The open end disk 22 projects radially with a protrusion 23 past the filter bellows 12 and can be used as a radial seal 25 (FIGS. 30, 31). The protrusion 23 preferably amounts to at least 3 mm, preferably at least 5 mm, particularly preferred at least 6 mm, further preferred at least 8 mm, further preferred at least 10 mm, particularly preferred at least 8 mm and at most 15 mm.

On the side of the end disk 22 at which the bead 28 is arranged, the protrusion 23 of the end disk 22 is smaller than at the diametrically opposed side. Optionally, the end disk 22 can however also be embodied with circumferentially extending constant protrusion 23.

At the closed end disk 32, a hollow, approximately T-shaped pin 60 projects into the interior 50. The pin 60 can be used as a mounting aid when installing the filter element 10 in a housing 102.

At the side of the end disk 32 which is opposite the notch 44, two spaced-apart cams 36 are arranged at the circumference and project in radial direction past the end disk 32. They serve as mounting aid so that, upon insertion of the filter element 10 into its housing, the filter bellows 12 and the end disk 32 stay spaced apart from the housing wall.

The support tube 70 comprises along its length an inwardly projecting rib 78 which can be utilized for positioning the support tube 70 in a casting bowl for the end disks 22, 32.

At the closed end disk 32, a hollow pin 60 projects into the interior 50. The pin 60 can be used as a mounting aid when installing the filter element 10 in a housing 100. This can be seen in particular in FIGS. 39 to 46 in which the filter system 100 is illustrated with the filter element 10 inserted in the housing 102.

Figure 34:
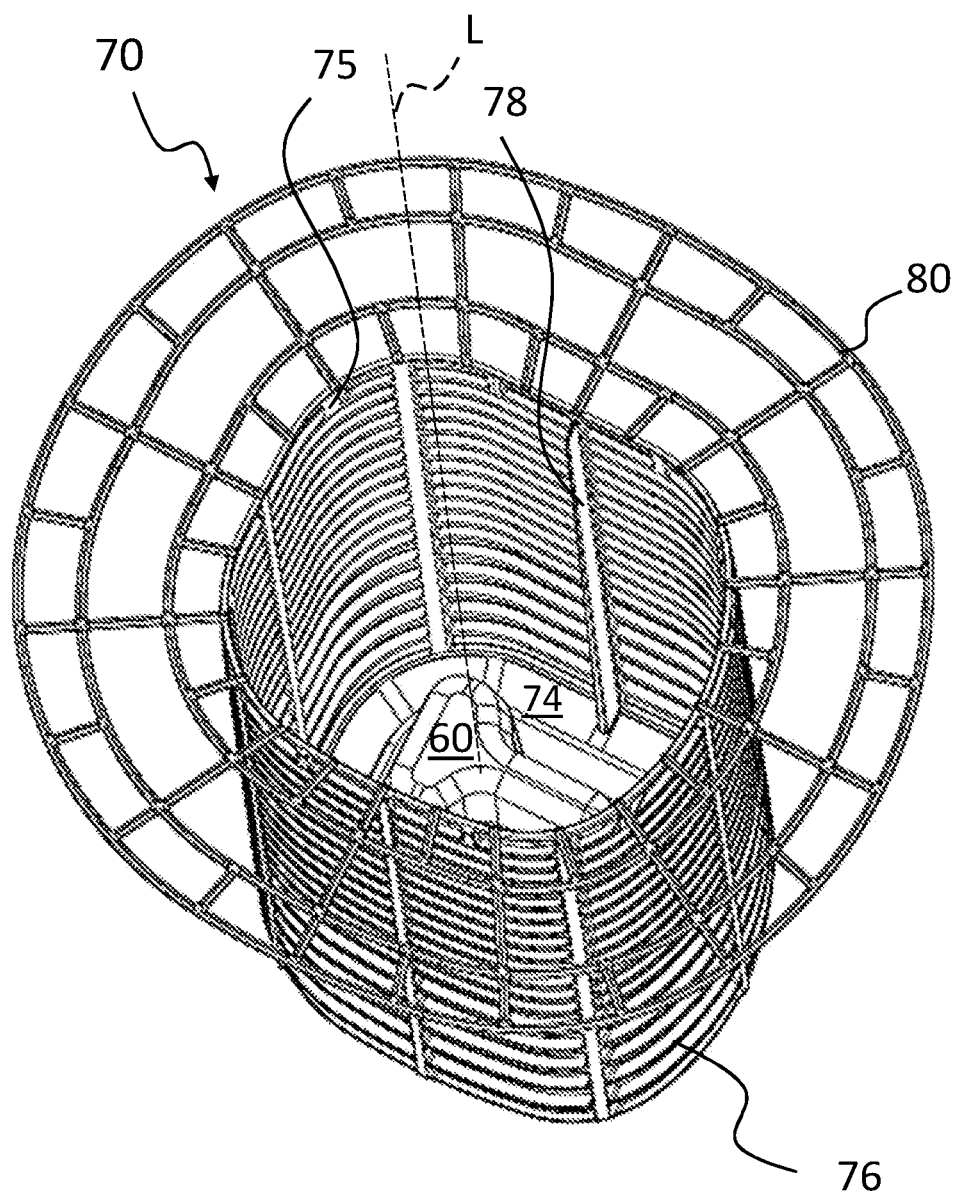
FIG. 34 shows a support tube for a filter element according to FIG. 29.

FIG. 34 shows the support tube 70 for the filter element 10 with the inwardly projecting rib 78 which extends axially along the body 76 of the support tube 70. At one end that is provided later on at the open end disk 22, the support tube 70 comprises a folded-over broad rim 80. The rim 80 serves as a support structure and is embodied here in the region of the first end disk 22 in a grid shape with radial stays and rings extending in circumferential direction between which penetrations are provided, not identified in detail. The material of the end disk 22, for example, polyurethane, can engage through the penetrations and embed the rim 80 completely in the end disk 22 in this way.

The pin 60 can be seen at the center at the end that is provided later on at the closed end disk 32. The pin 60 can be formed of a non-elastomer material like the support tube 70. The support tube 70 is closed off at this end by a disk 74 from which the pin 60 projects axially into the interior.

Figure 36:
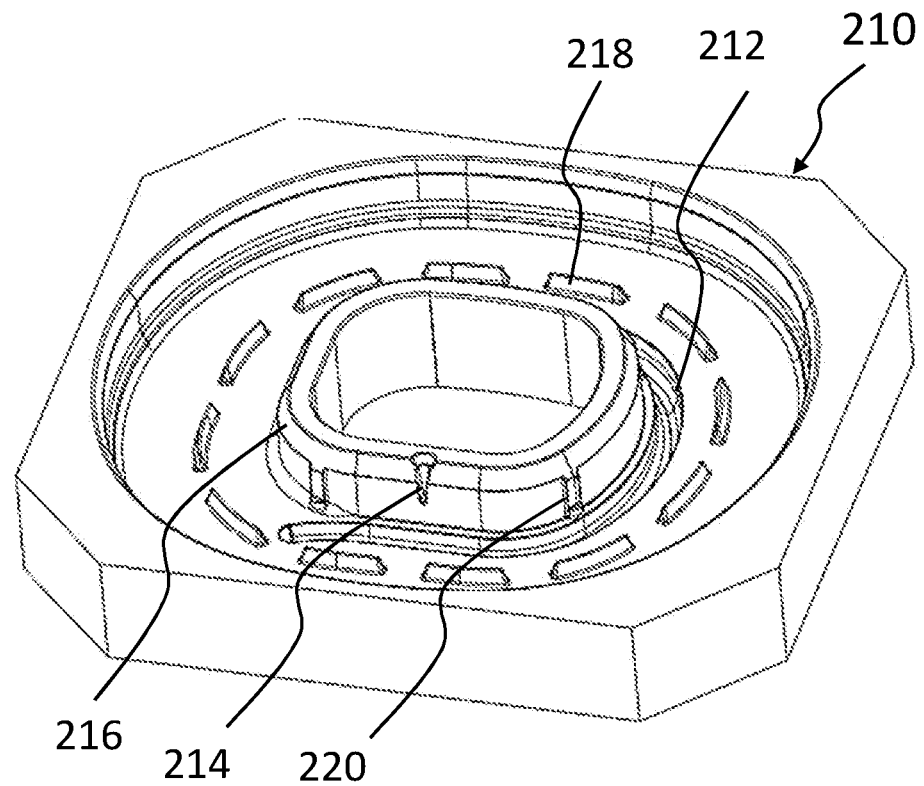
FIG. 36 shows a casting bowl for foaming an open end disk for a filter element according to FIG. 29.
Figure 37:
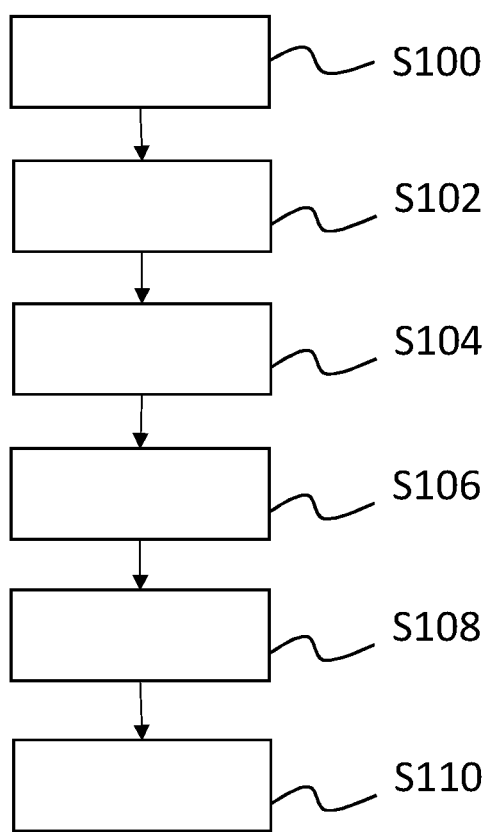
FIG. 37 shows a flow chart of a method for producing a filter element according to an embodiment of the invention.

FIG. 35 shows a casting bowl 200 for foaming a closed end disk 32 for the filter element 10 according to FIG. 29, and FIG. 36 shows a casting bowl for foaming an open end disk 22 for the filter element according to FIG. 29. At the transition of the rim 80 to the body 76 of the support tube 70, cutouts 75 are provided where the material of the end disk 22 can engage.

At the center in the casting bowl 200 for the closed end disk 32, a pin contour 203 can be seen which is complementary to the pin 60 in the support tube 70 and onto which the support tube 70 can be pushed. A notch structure 202 is provided to engage between and spread apart two folds 14 of the filter bellows 12 arranged on the support tube 70.

Two cam contours 204 are provided for producing the cams 36. Depressions 206 are provided as knob contour for the knobs 34. The knob contours 206 are surrounded by a circumferential groove 201 which is interrupted at the notch structure.

The casting bowl 210 for the open end disk 22 comprises a bead contour 212 in which the bead 28 of the end disk 22 is formed as well as a socket 216 which defines the opening 24 of the end disk 24. At the exterior side of the socket 216, a receptacle 214 is formed which accommodates the inwardly projecting rib 78 of the support tube 70. Moreover, elevations 218 are provided which surround the socket 216 at a constant distance. The elements 218 engage the outwardly folded rim 80 of the support tube 70. Moreover, at the socket 216 small projections 220 are distributed which engage the cutouts 75 of the support tube 70 for anchoring.

By means of the support tube 70, both casting bowls 200, 210 can be aligned with each other in a defined position in that the support tube 70 is placed with the pin 60 onto the pin contour 203 of the casting bowl 200 of the closed end disk 22 and the inwardly positioned rib 78 is inserted into the receptacle 214 of the casting bowl 210 for the open end disk 22.

Figure 39:
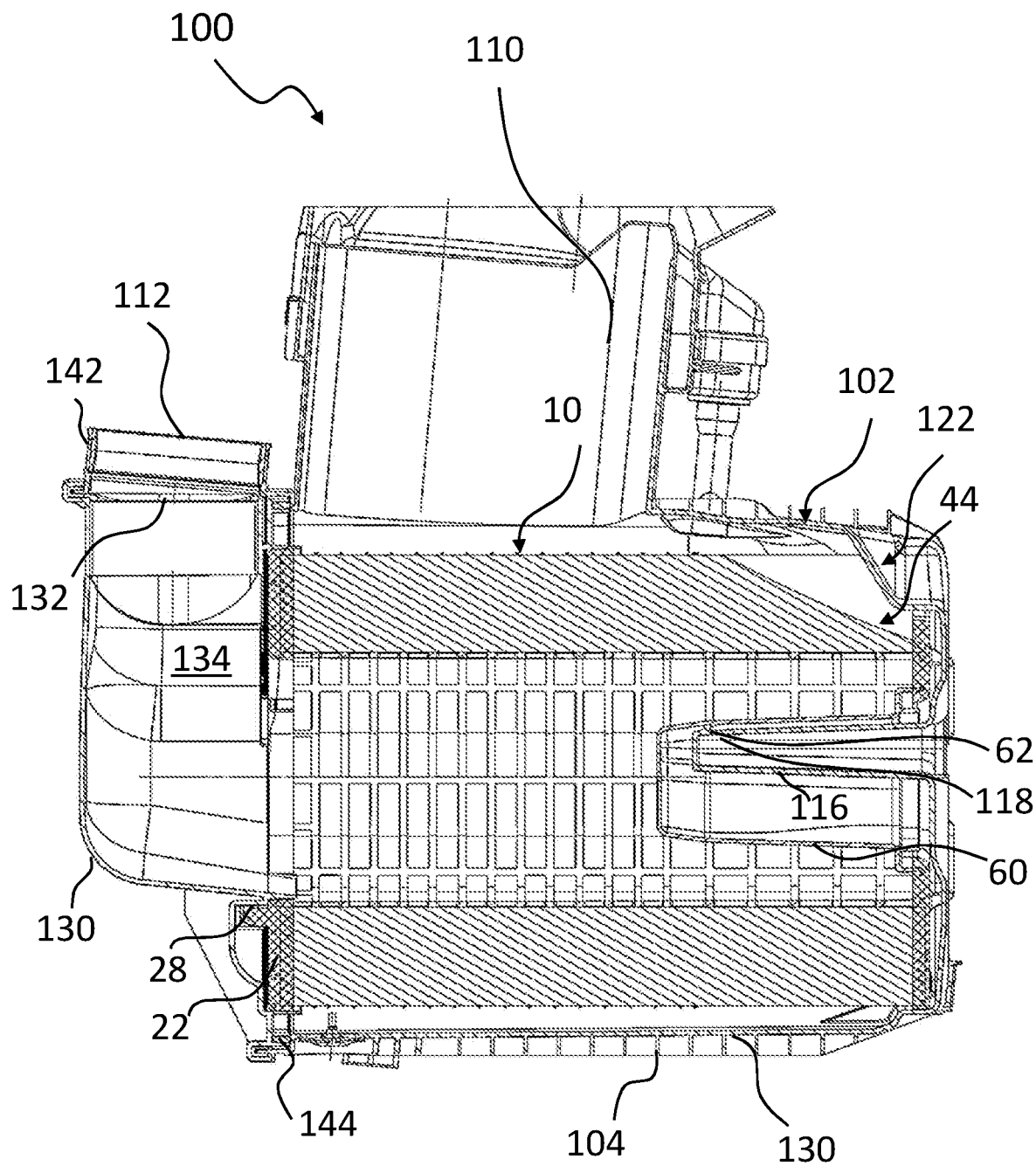
FIG. 39 shows a longitudinal section of the filter system according to FIG. 38.
Figure 40:
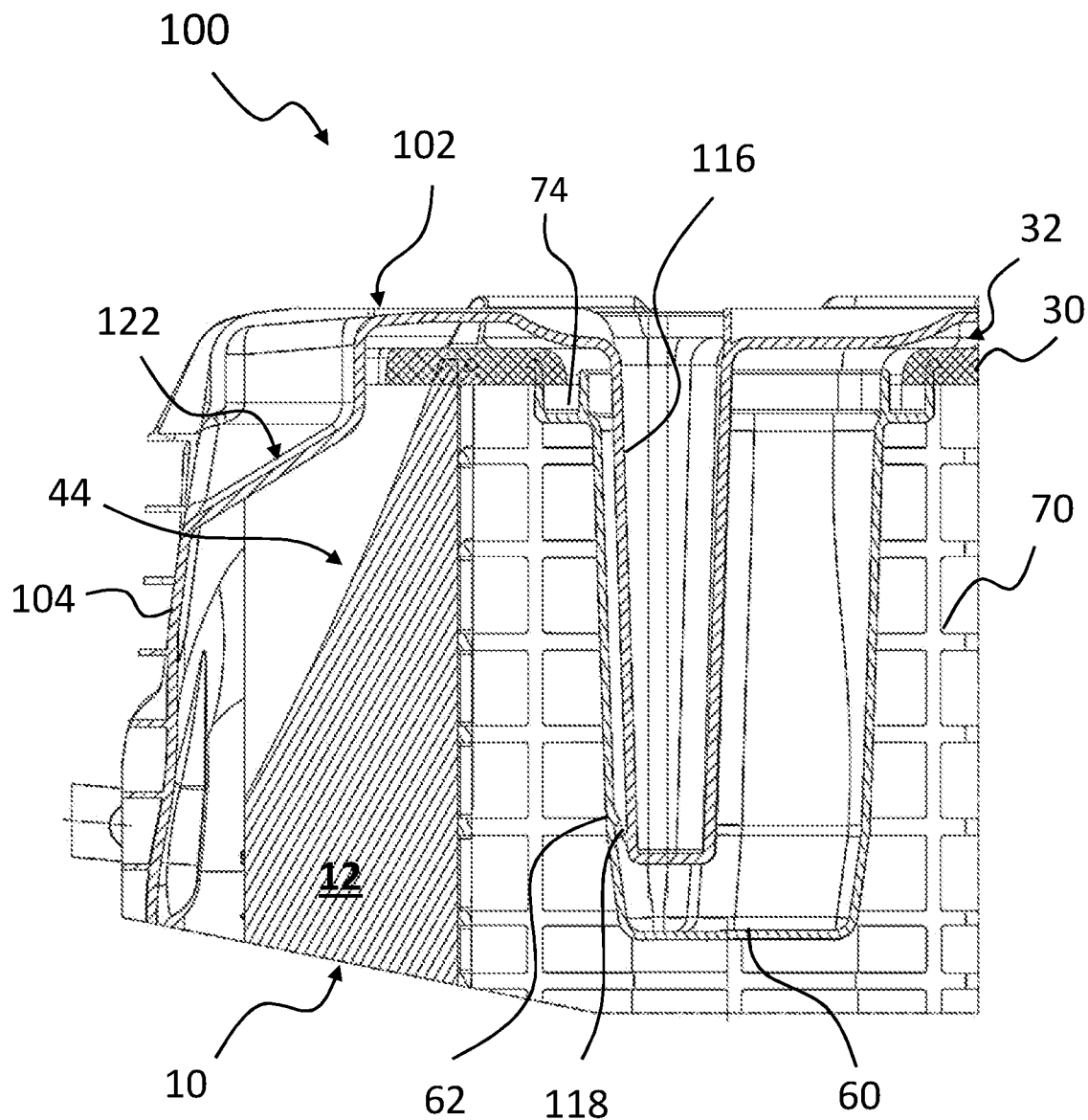
FIG. 40 shows a longitudinal section of a detail of the filter system according to FIG. 38 with mounting aids.

FIG. 39 shows a flowchart of a sequence during the manufacture of the filter element 10 by means of the casting bowls 200, 210.

In step S100, a support tube 70 is provided at which a filter bellows 12 with or without notch 40, 44 is arranged and that has an inwardly projecting axial rib 78. The support tube 70 comprises an open end and an axially oppositely position closed end where a pin 60 projects into the interior of the support tube 70. The end of the support tube 70 is closed with a disk 74.

In step S102, casting bowls 200, 210 for an open end disk 22 and a closed end disk 32 are provided.

In step S104, the starting material of the end disk 22, in particular liquid polyurethane, is poured into the casting bowl 210.

The support tube 70 is placed in step S106 with its folded-over rim 80 into the casting bowl 210 into the still liquid starting material for the open end disk 22 wherein the inwardly projecting rib 78 is inserted into the cutout 214 of the socket 216. The elevations 218 engage penetrations at the rim 80 of the support tube 70. The liquid starting material foams about and encloses the rim 80 of the support tube 70 and the end portion of the filter bellows 12. After termination of the reaction of the material, the support tube 70 with filter bellows 12 and open end disk 22 is removed from the casting bowl 210.

In step S108, the starting material of the end disk 32, in particular liquid polyurethane, is poured into the casting bowl 200.

In step S110, the support tube 70 is placed with the filter bellows 12 into the casting bowl 200 into the still liquid starting material for the closed end disk 32 and, by means of the T-shaped pin 60, is positioned in correct position on the pin contour 203. In this context, the notch structure 202 of the casting bowl 200 engages between two folds of the filter bellows 12 and spreads them apart.

The liquid starting material foams about and covers the closed side of the support tube 70 and encloses the end portion of the filter bellows 12. In this context, the spacer knobs 34 at the closed end disk 32 are formed in the depressions 206. Also, the notch 40 in the filter bellows 12 is fixed. After termination of the reaction of the material, the support tube 70 with filter bellows 12 and closed end disk 32 is removed from the casting bowl 210.

FIGS. 38 to 50 show an embodiment of a filter system 100 according to one embodiment of the invention with a filter bellows 10 as it has been described above in FIGS. 29 to 33.

Figure 38:
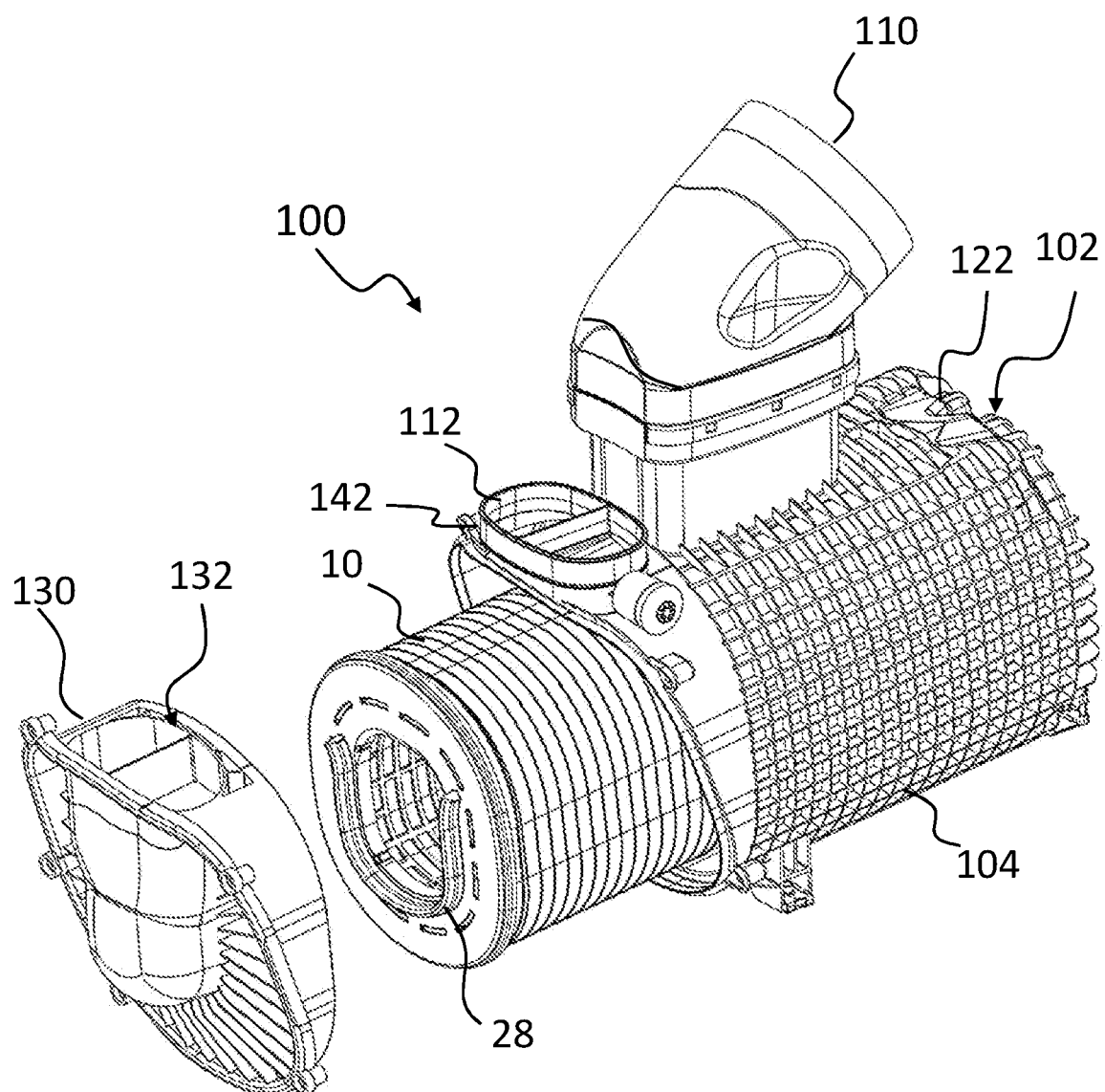
FIG. 38 shows an exploded illustration of a filter system according to an embodiment of the invention with the filter element according to FIG. 29.
Figure 41:
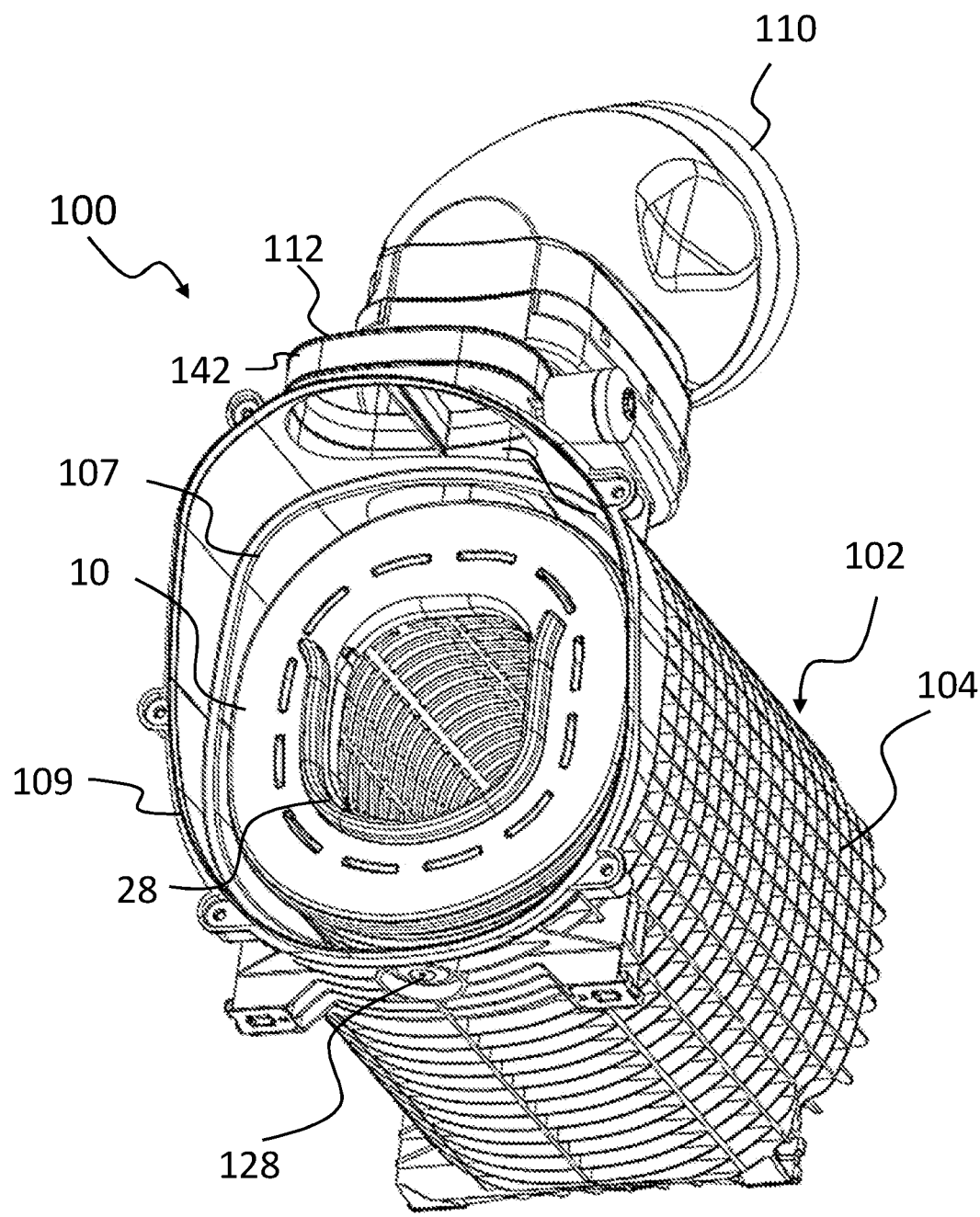
FIG. 41 shows a perspective view of the filter system according to FIG. 38 with an open housing with an inserted filter element according to FIG. 29.
Figure 42:
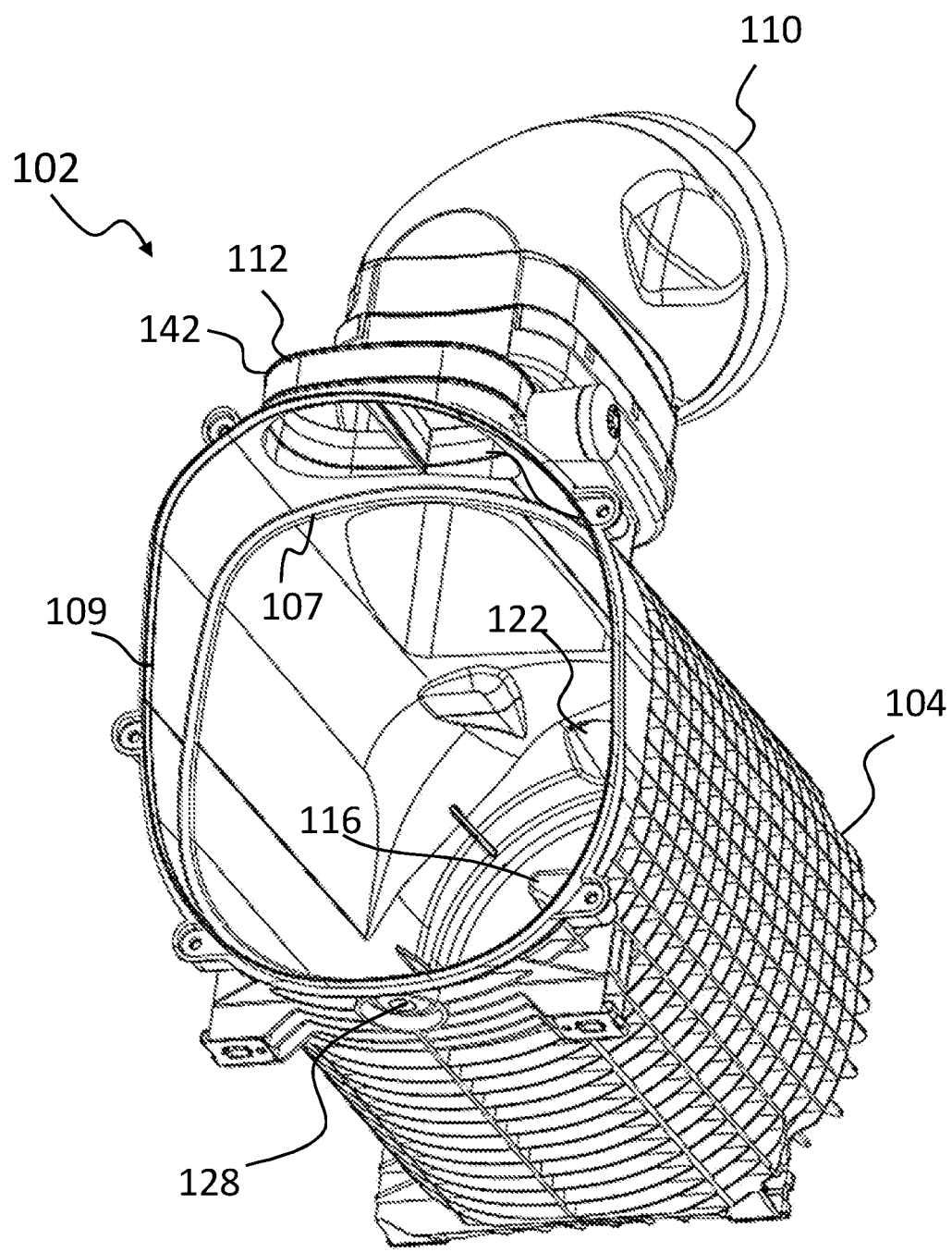
FIG. 42 shows a perspective view of the housing of the filter system according to FIG. 38.
Figure 43:
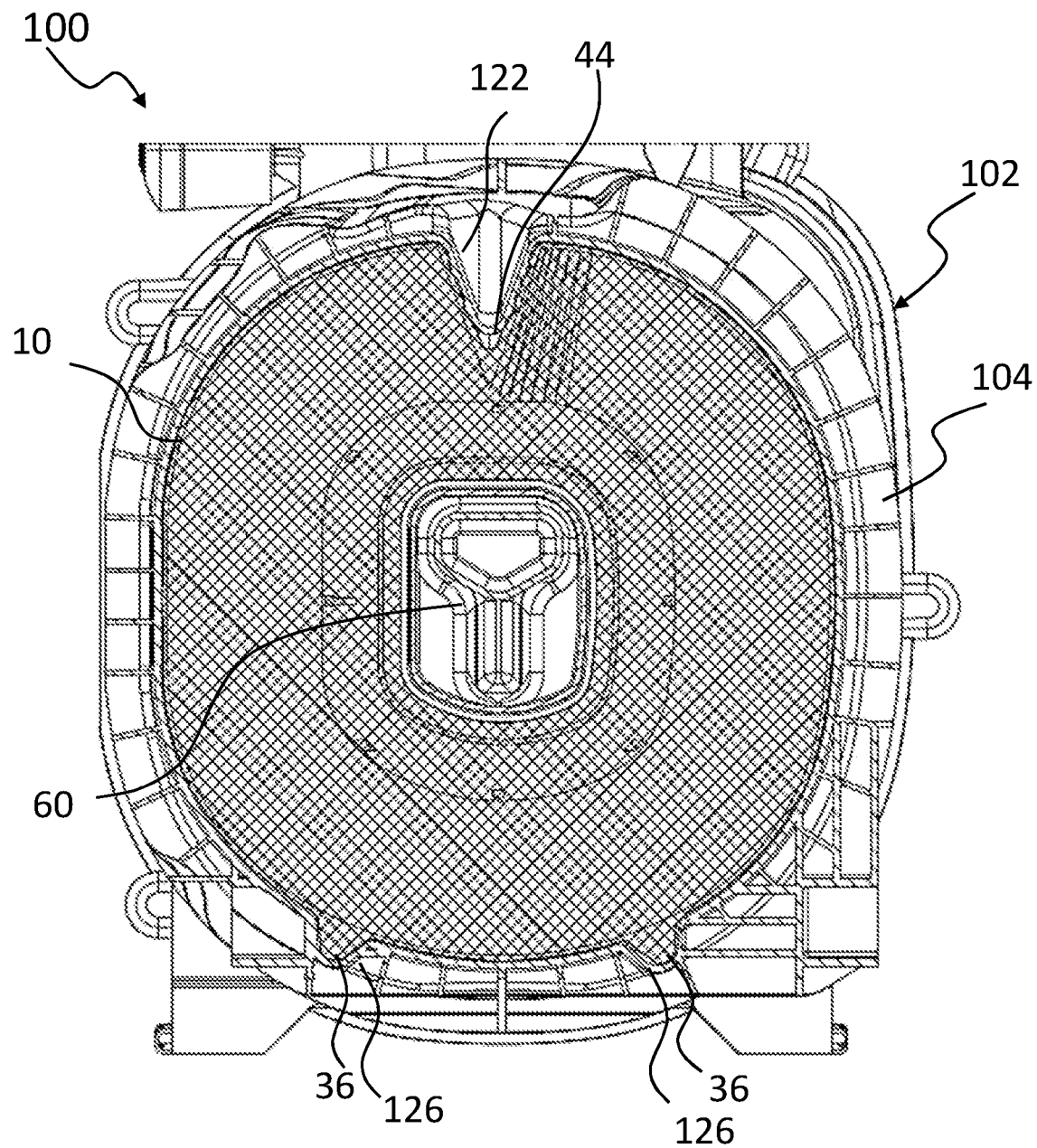
FIG. 43 shows a cross section of the filter system according to FIG. 38 with inserted filter element according to FIG. 29.

FIG. 38 shows an exploded illustration of a filter system 100 according to one embodiment of the invention with the filter element 10 according to FIG. 29 inserted into a housing 102 with a housing part 104 that is closed by a cover 130. FIG. 39 shows a longitudinal section of the filter system 100, and FIG. 40 a longitudinal section of a detail of the filter system 100 with mounting aids in the region of the closed end disk 32 of the filter element 10. FIG. 41 shows a perspective view of the filter system 100 with open housing 102 and inserted filter element 10, while FIG. 42 shows the same view of the housing without filter element 10. FIG. 43 shows a cross section of the filter system 100 with inserted filter element 100 and recognizable mounting aids in plan view.

Figure 44:
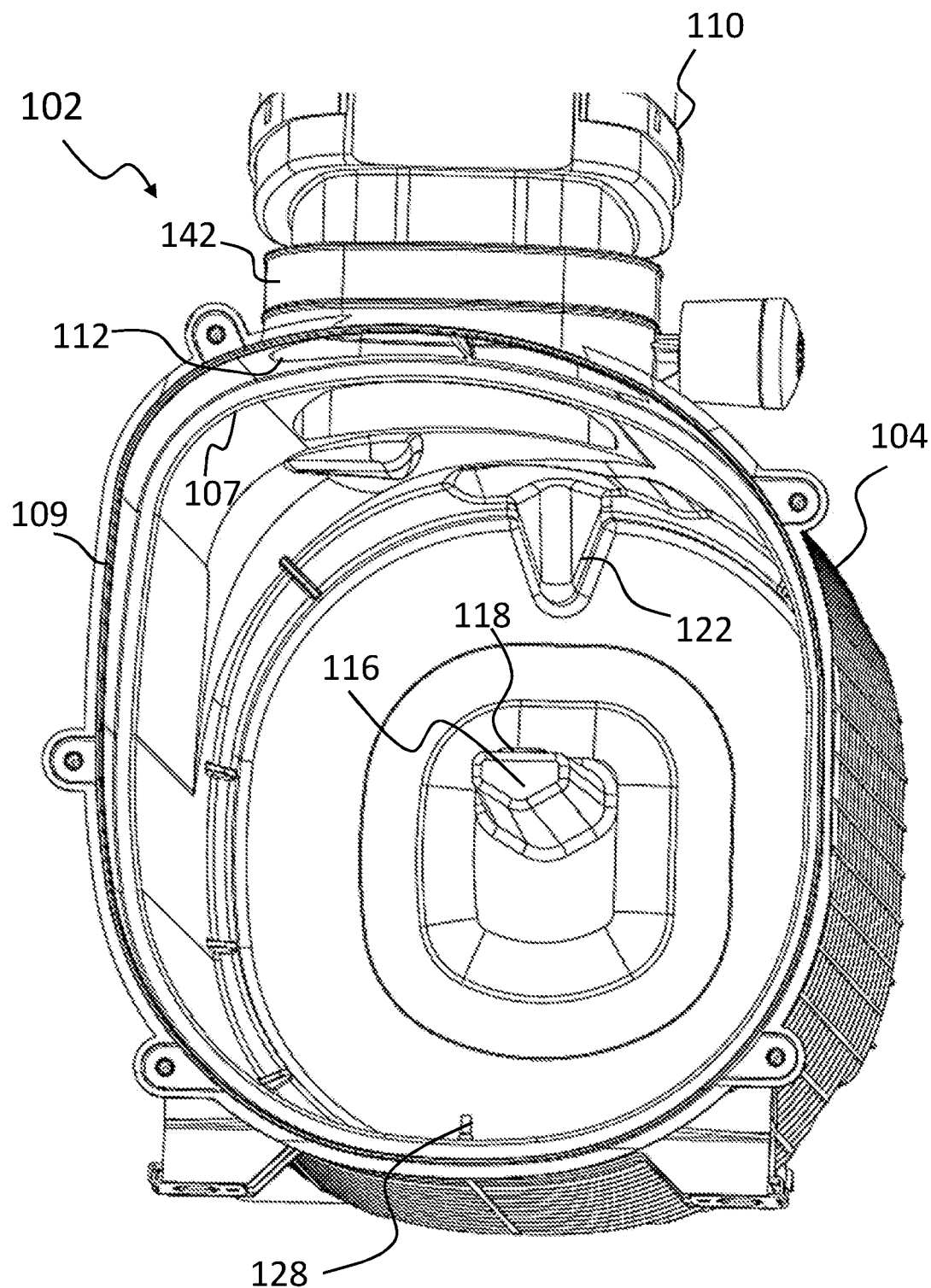
FIG. 44 shows a perspective view at a different viewing angle of the filter system according to FIG. 38 with an open housing with an inserted filter element according to FIG. 29.
Figure 45:
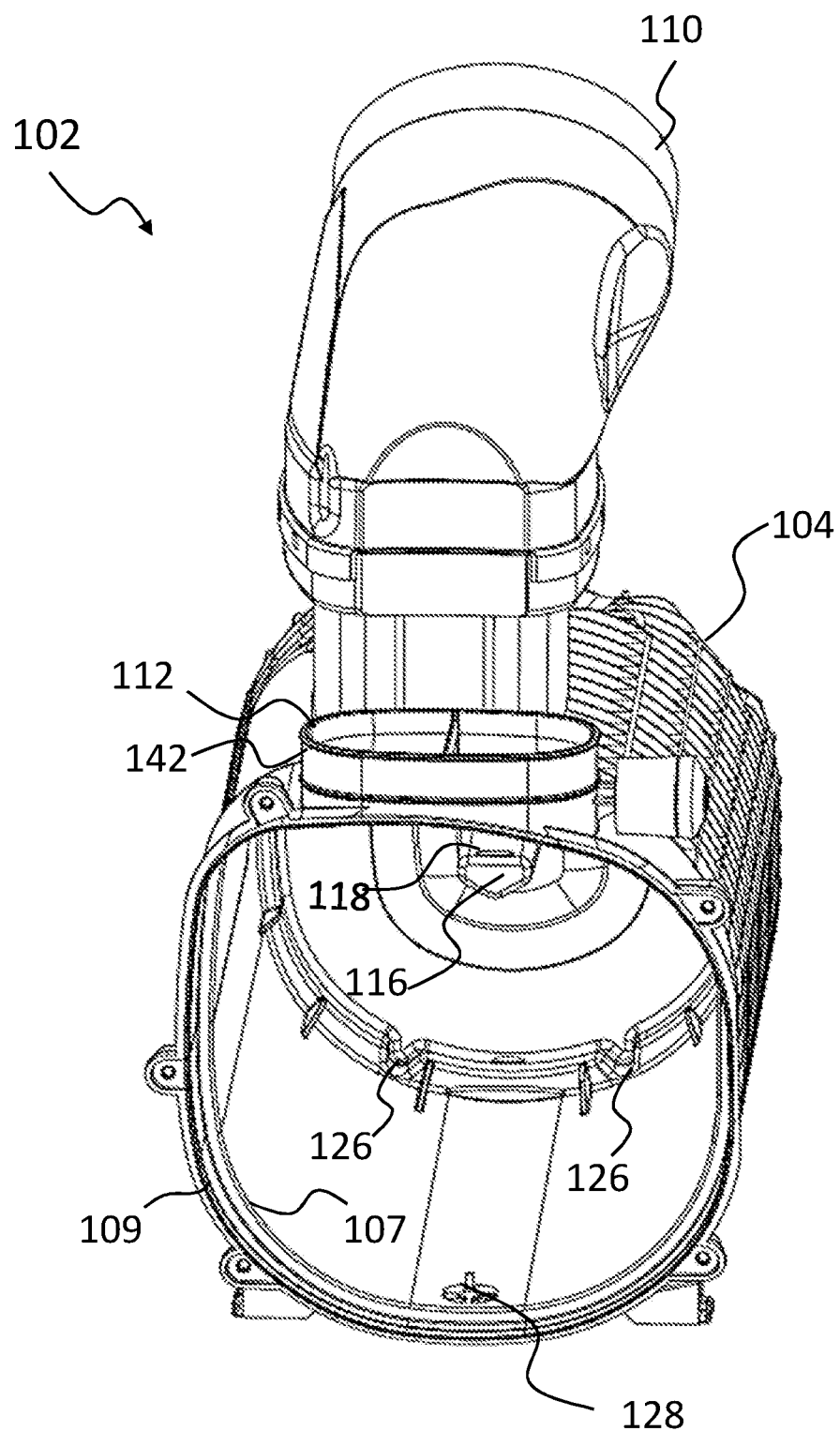
FIG. 45 shows a perspective view of the interior of the housing of the filter system according to FIG. 38 with knob receptacles.
Figure 46:
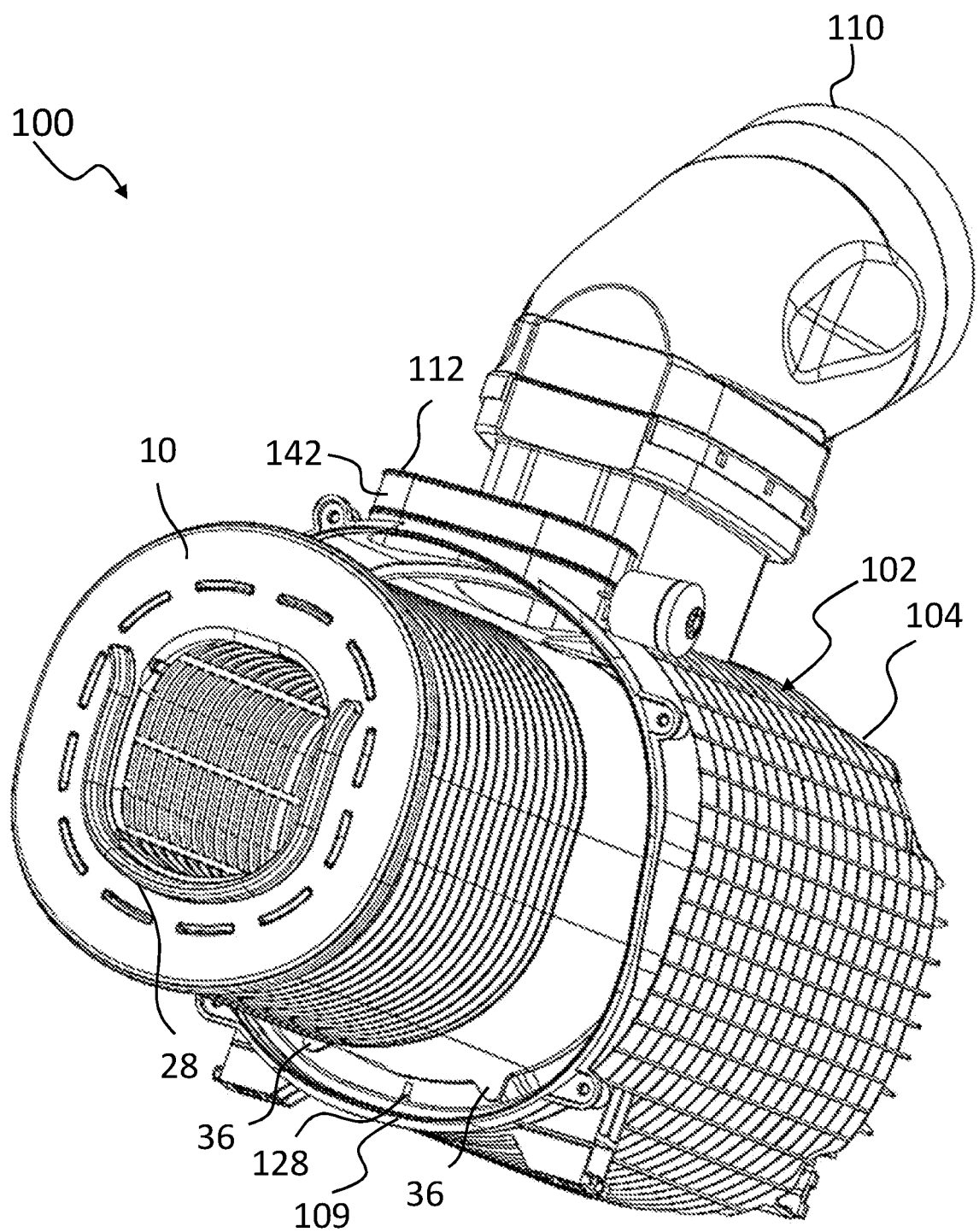
FIG. 46 shows the filter element according to FIG. 29 upon insertion of the housing of the filter system according to FIG. 38.
Figure 47:
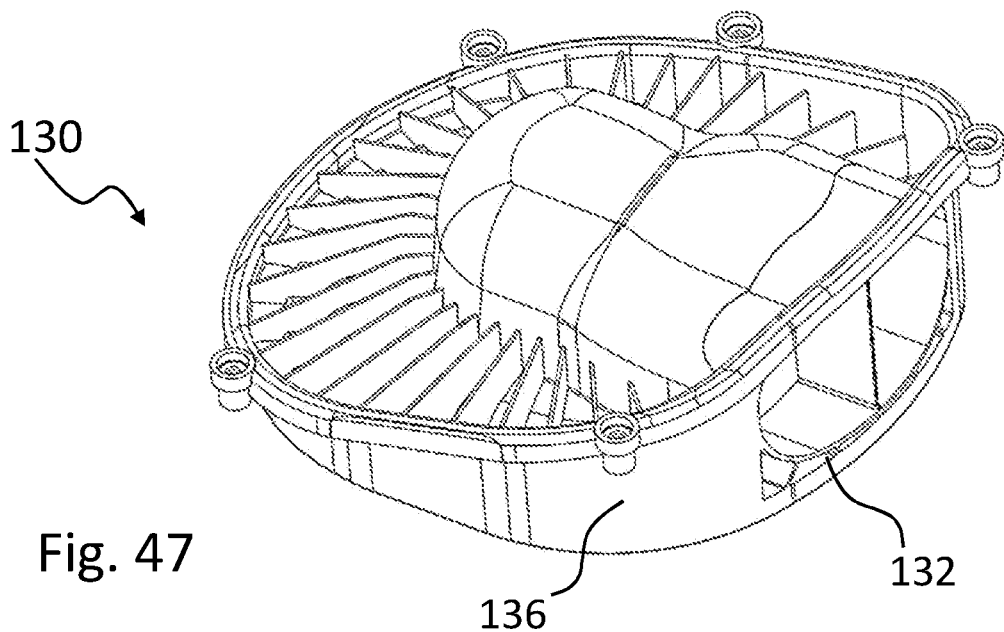
FIG. 47 shows an isometric view of an external side of a cover of the housing of the filter system according to FIG. 38.
Figure 48:
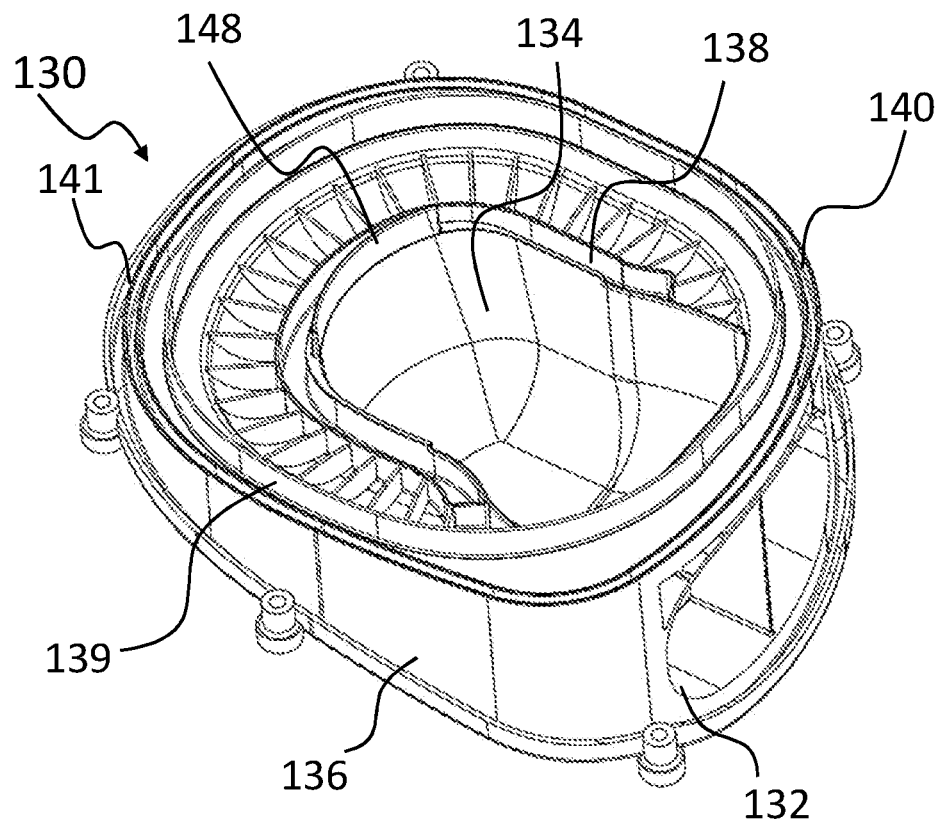
FIG. 48 shows an isometric view of an inner side of a cover of the housing of the filter system according to FIG. 38.
Figure 49:
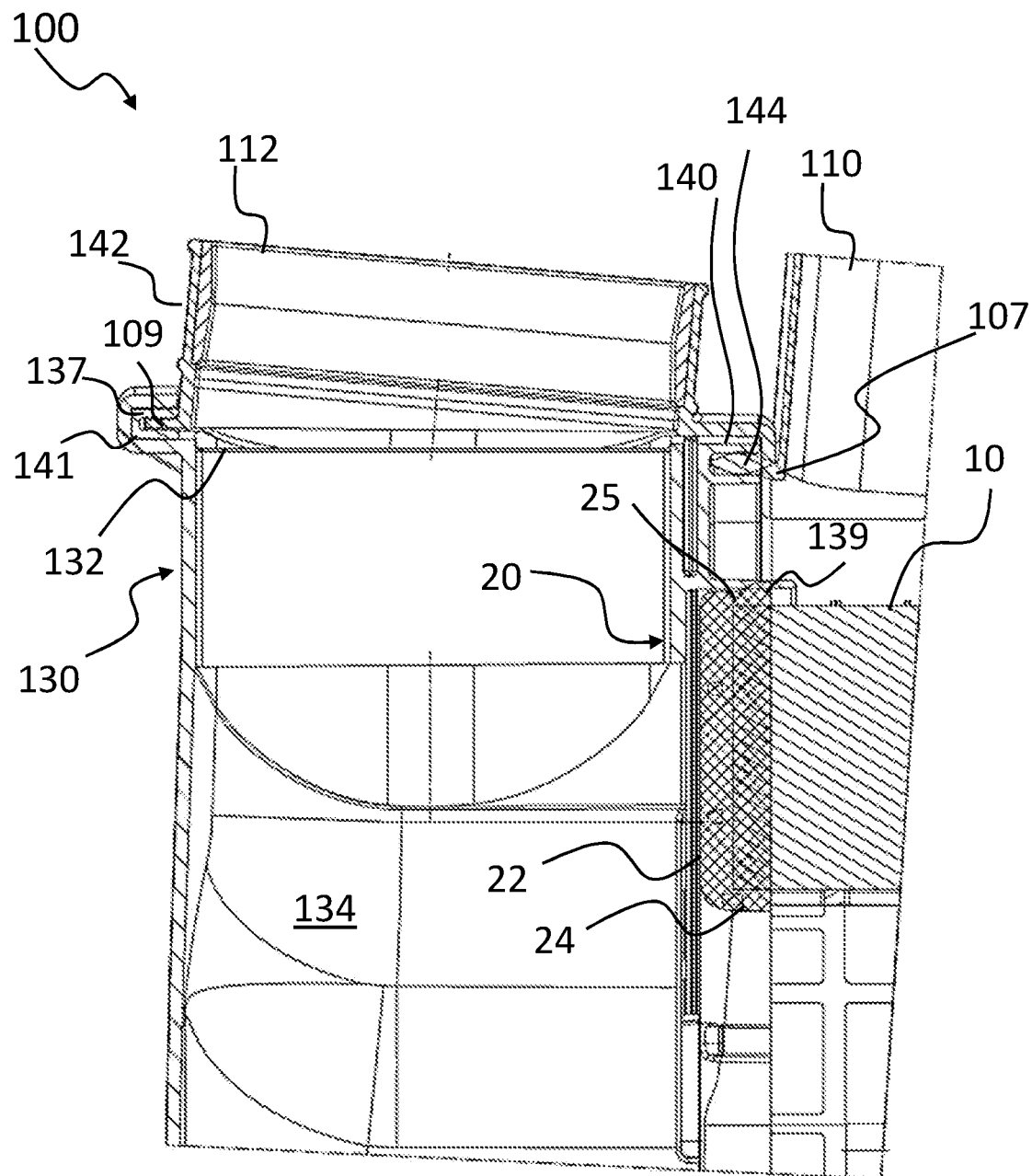
FIG. 49 shows a detail of the longitudinal section of the filter system according to FIG. 38 at its clean side with closed cover.
Figure 50:
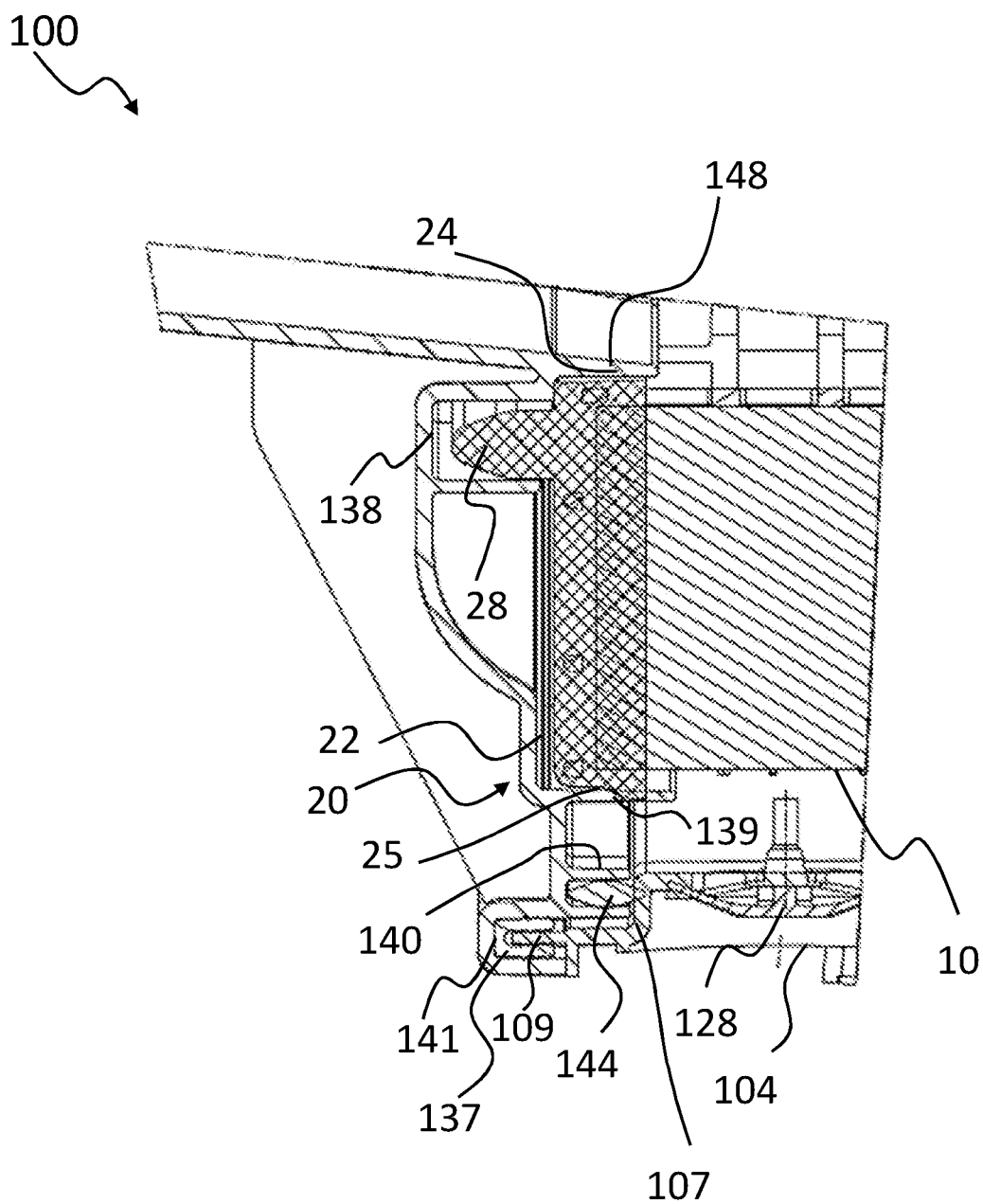
FIG. 50 shows a longitudinal section of a detail of the section according to FIG. 39.

FIGS. 44 and 45 show perspective views of the open housing 102 of the filter system 100. FIG. 46 shows the filter element 10 according to FIG. 29 during insertion into the housing 102 of the filter system 100. FIGS. 47 and 48 show the cover 130 in detail. FIGS. 49 and 50 show in longitudinal section details in the region of the cover 130 at the housing part 104.

The housing 102 comprises the first housing part 104, for example, a housing pot, and a second housing part in form of a cover 130. At the open end of the housing part 104, a circumferential collar 109 is formed which is interacting with a sealing element 137 (FIGS. 49, 50).

The housing 102 comprises an inlet 110 and an outlet 112. The inlet 110 is provided directly adjacent to the outlet 112 at the first housing part 104, for example, is arranged tangentially thereat.

Inlet 110 and outlet 112 of the housing 102 are arranged closely adjacent to each other and in the same housing part 104. The fluid to be filtered experiences between inlet 110 and outlet 112 a directional deflection, in particular a deflection by 180°.

As can be seen in FIGS. 41 and 42, the second housing part 104 of the housing 102 in the installed state of the filter element 10 comprises below the filter element 10 a valve 128 that serves for draining water from the housing 102. The valve 128 projects into the interior of the housing 102. Also, it can be seen that inlet 110 and outlet 112 are arranged directly adjacent to each other at the same housing part 104.

Adjacent to the collar 109, a shoulder 107 is provided at the inner side in the housing part 104 which extends between the housing-associated openings for inlet 110 and outlet 112. The shoulder 107 forms a sealing surface for a seal 144 between cover and housing part 104 (FIGS. 49, 50).

The first housing part 104 comprises in its bottom part a pin 116 which corresponds with the pin 60. The corresponding pin 116 comprises at the contact surface to the pin 60 of the filter element 10 a locking element 118 that is interacting with a locking element 62 at the inner side of the hollow pin 60. Upon insertion of the filter element 10 into the housing part 104, the filter element 10 is protected thereby against tilting. When the cover 130 is connected to the housing part 104, the pin 60 is separated from the corresponding pin 116.

When the filter element 10 is inserted into the first housing part 104, the corresponding pin 116 catches the pin 60 of the filter element 10 so that the filter element 10 can be pushed in correct position into its end position.

Subsequently, the cover 130 at the first housing part 104 is fastened. In the mounted state of the filter element 10, a central longitudinal axis L of the filter element 10 coincides with a central longitudinal axis of the second housing part 104.

When the interior 50 of the filter element 10 is the clean side of the filter element 10, the cover 130 is arranged at the clean side of the housing 102. The cover 130 comprises in the interior a clean fluid channel 134 which guides the filtered fluid, for example, clean air, to the outlet 122. For this purpose, at the first housing part 104 a socket 142 is arranged which provides the outlet 112. The socket 142 projects in axial direction past the end disk 22 of the installed filter element 10.

The cover 130 comprises an opening 132 which is positioned, when the cover 130 is closed, below the socket 142 of the first housing part 104.

The bead 28 of the filter element 10 at the open end disk 22 is contacting a corresponding receptacle of the cover 130 and seals with the seal 25 of the protrusion 23 radially relative to the raw side of the filter element 10. The bead 28 serves for supporting the filter element 10.

Since only a part of the open end disk 22 comprises the bead 28, the bead-free region about the opening 24 is open toward the outlet 112; the filtered fluid can flow through the cover 130 to the outlet 112.

The first housing part 104 comprises moreover a pin 116 corresponding with the pin 60, as can be seen in FIGS. 44 and 45. The corresponding pin 116 comprises at the contact surface to the pin 60 of the filter element 10 a locking element 118 that interacts with a locking element 62 at the inner side of the hollow pin 60. The pin 60 predetermines the position angle of the filter element 10 and prevents tilting of the filter element 10 upon insertion of the filter element 10 into the housing part 104.

When the filter element 10 is pushed into the first housing part 104, as indicated in FIG. 46, the corresponding pin 116 catches the pin 60 of the filter element 10 so that the filter element 10 can be pushed into its end position. At the same time, the cams 36 at the closed end disk 34 ensure that the filter bellows 12 can glide at a safe distance across the valve 128.

FIG. 47 shows an isometric view of an exterior of the cover 130, and FIG. 48 shows an inner side of the cover 130. The cover 130 is wedge-shaped when viewed from the side so that its rim 136 rises from a region with minimal height to an oppositely positioned region with great height. In the region with great height, the opening 132 is arranged which opens the clean fluid channel 134 in the interior of the cover 130.

The opening 132 is positioned, with cover 130 closed, below the socket 142. In the cover 130, an air guide 134 is formed. The clean fluid channel 134 serves for guiding the filtered air out of the interior 50 of the filter element 10 to the outlet 112 of the housing 102. The clean fluid channel 134 comprises here two regions in the opening 132 which in the mounted state communicate with the outlet 112 in the sidewall of the housing part 104.

The cover 130 comprises a circumferentially extending sealing groove 141 that defines a first sealing plane. Radially within the sealing groove 141, a further circumferentially extending sealing groove 140 is arranged which defines a second sealing plane. The opening 132 of the cover 130 is positioned between the two sealing planes. A separate sealing action of the opening 132 is therefore not needed.

As can be seen in the views of FIGS. 49 and 50 in detail, the circumferential seal 144 is accommodated in the sealing groove 140 which is arranged between cover 130 and housing part 104 and serves for sealing between raw side and clean side. In the sealing groove 141, a circumferential seal 137 for sealing the clean side relative to the exterior region of the filter system 100 is accommodated.

The open end disk 22 comprises a radial protrusion 23 (FIGS. 30, 31) which seals as a radial seal 25 against a sealing region of the cover 130.

The sealing grooves 140, 141 surround a circumferential collar 139 whose inner surface forms a sealing surface for the radial seal 25 of the open end disk 22.

When the cover 130 is closed, the bead 28 engages a receptacle 138 of the cover 130 which extends inside the collar 139. This can be seen in the detail views of FIGS. 49 and 50 in which the cover 130 is connected to the housing part 104. The receptacle 138 can effect an axial clamping of the filter element 10 in the housing 102.

The cover 130 projects in the region of the housing 102 near the valve 128 with a rib 148 into the opening 24 of the end disk 22. The valve 128 is arranged below the filter element 10. The rib 148 prevents water from collecting in the clean region and returns the water into the filter element 10 where it can drain through the valve 128.

FIGS. 51 to 57 show a further embodiment of a filter system 100 according to a further embodiment of the invention.

Figure 51:
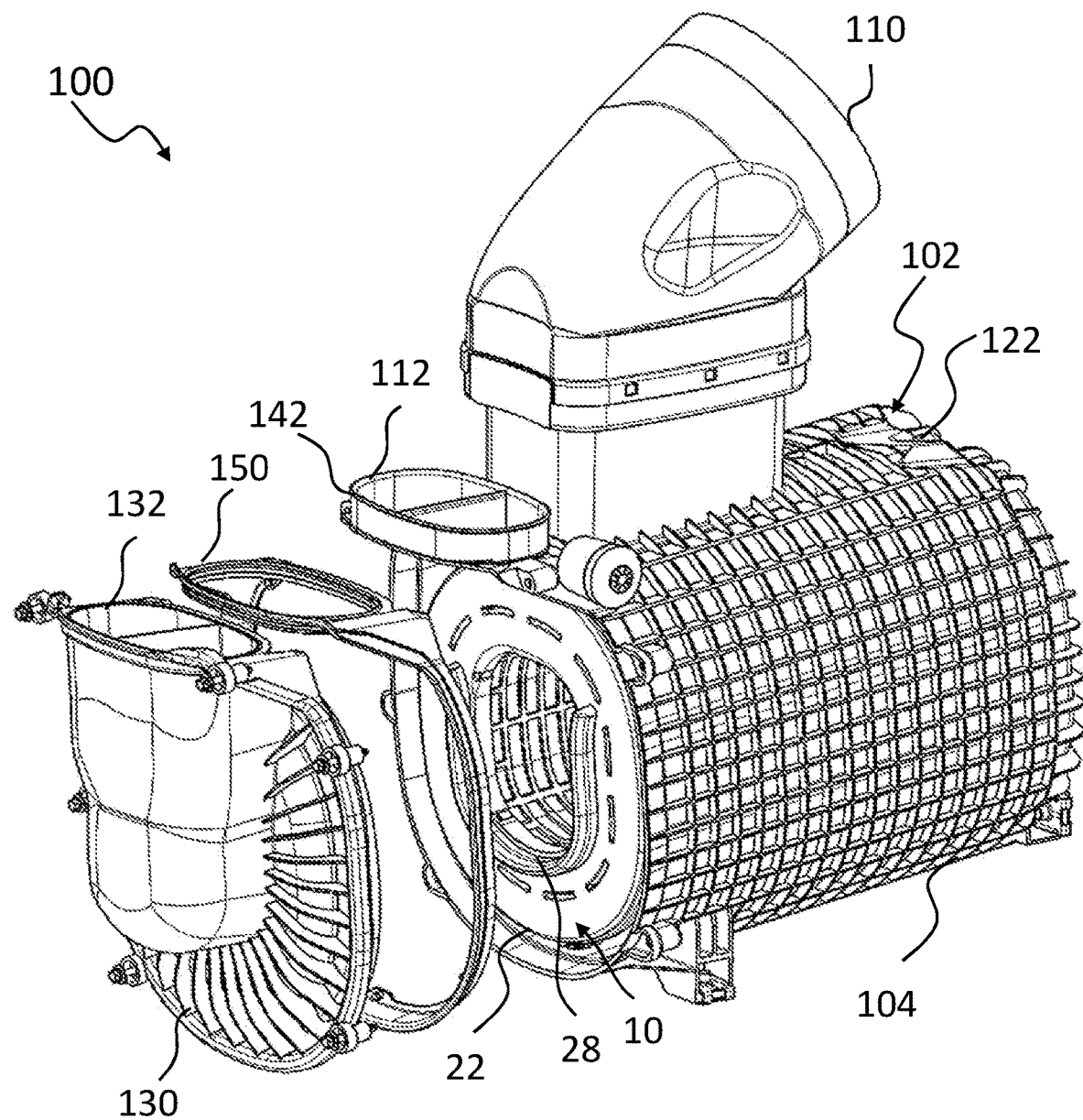
FIG. 51 shows a filter system according to a further embodiment of the invention with cover and seal in expanded view.
Figure 52:
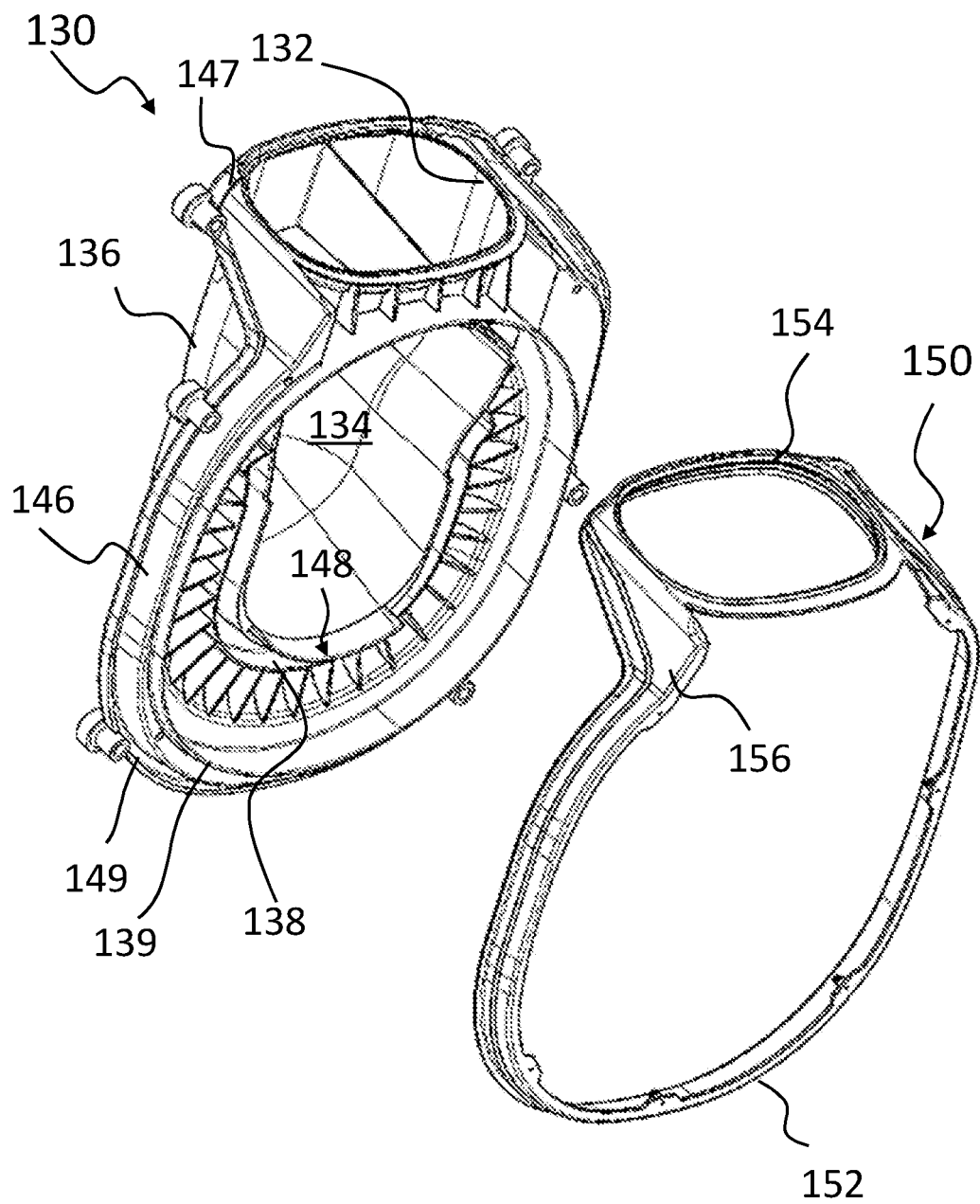
FIG. 52 shows an exploded illustration of seal and cover of the filter system according to FIG. 51.
Figure 53:
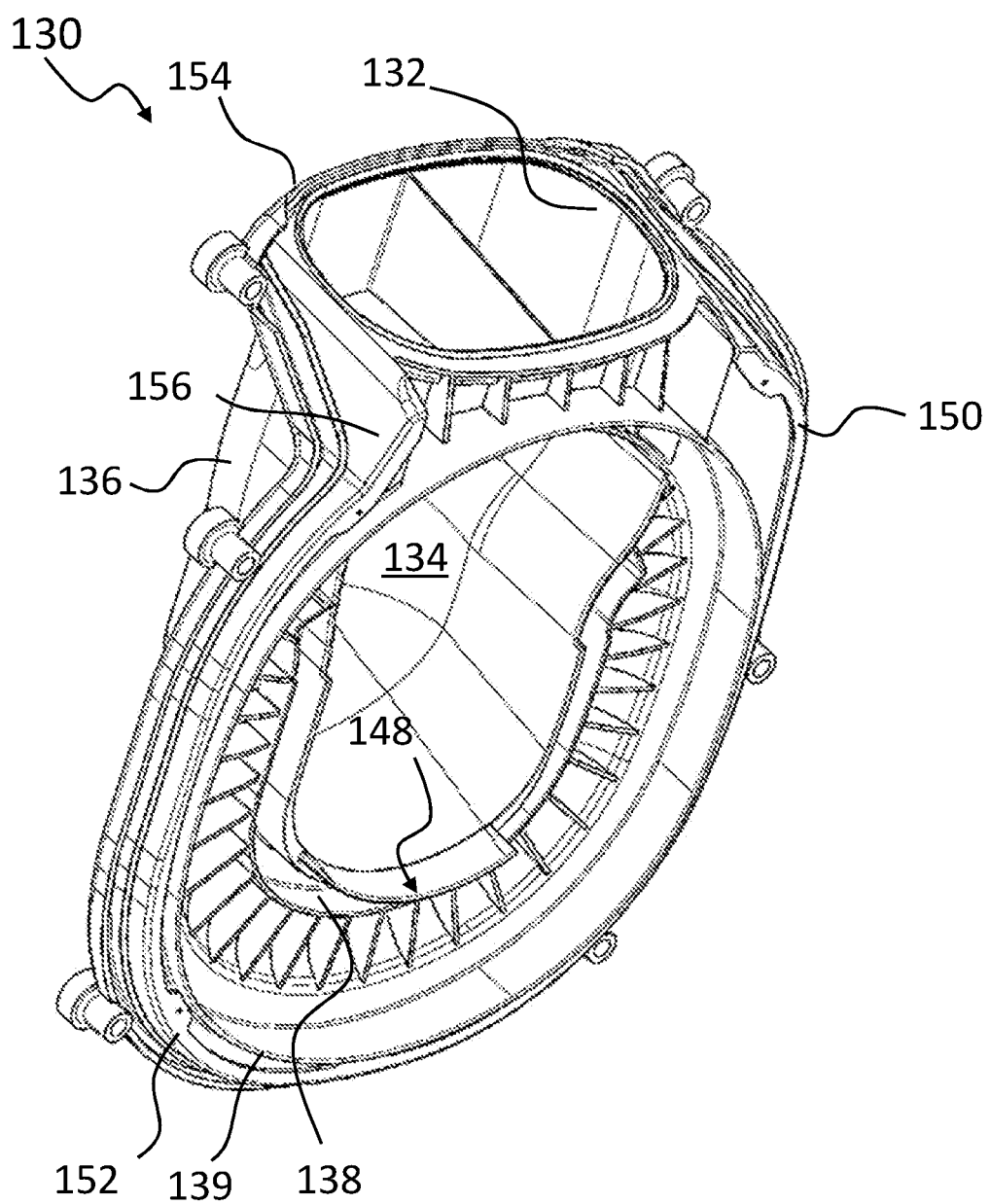
FIG. 53 shows a perspective view of the assembly of cover and seal according to FIG. 52.
Figure 54:
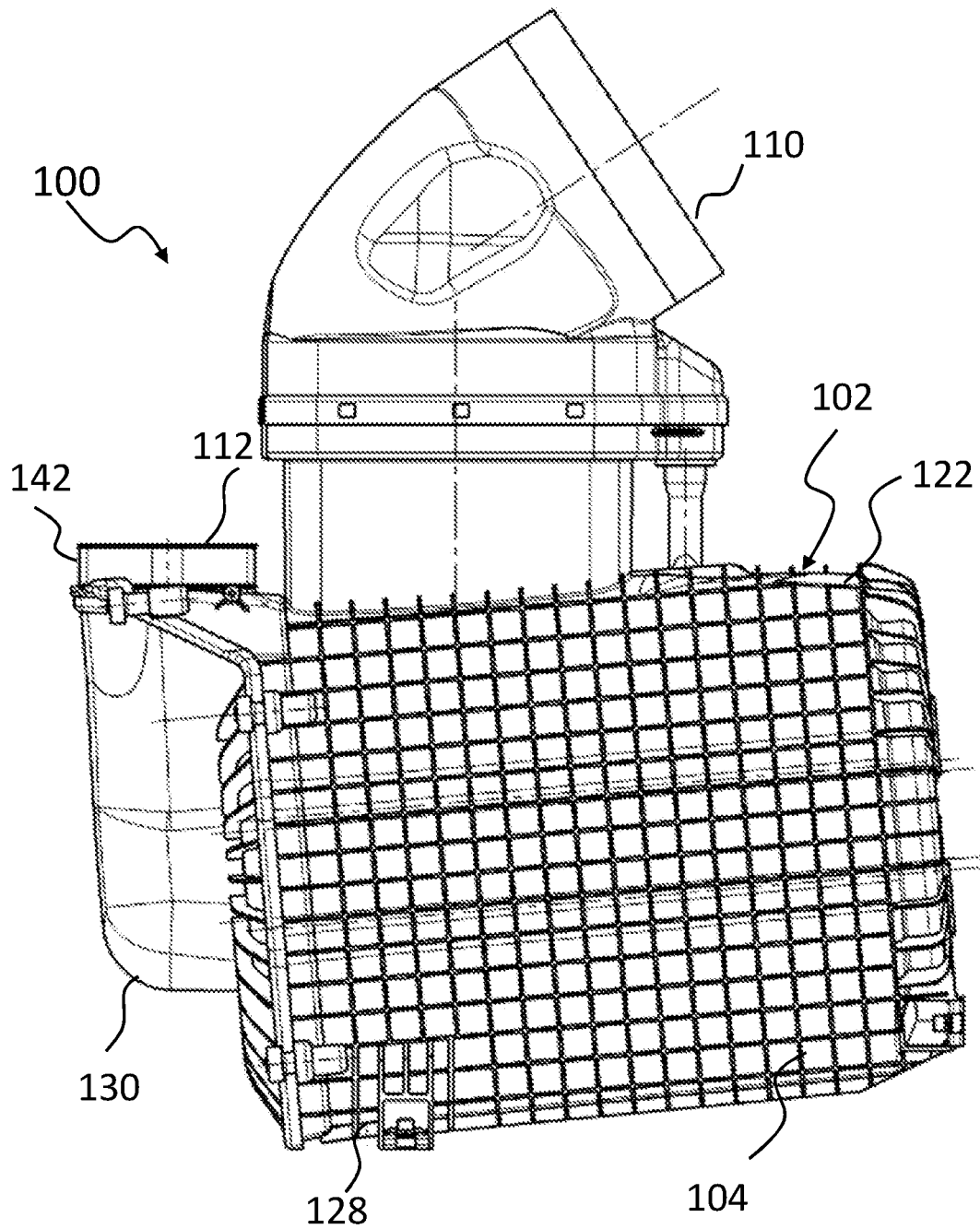
FIG. 54 shows a side view of the filter system according to FIG. 51.

In this context, FIG. 51 shows in exploded illustration a filter system 100 with a housing 102 that comprises a first housing part 104, for example, a housing pot, and a second housing part in the form of a cover 130 and a one-piece seal 150 for sealing clean side relative to raw side and against the exterior region of the filter system 100. FIG. 52 shows an exploded illustration of the one-piece seal 150 and cover 130 of the filter system 100 according to FIG. 51, while FIG. 53 shows a perspective view of the assembly of cover 130 and seal 150. FIG. 54 shows a side view of the filter system 100, and FIG. 55 a longitudinal section of the filter system 100. FIG. 56 shows a section through a detail of the clean fluid connector of the cover 130 of the filter system 100, and FIG. 57 a section through a detail of a raw fluid side of the cover 130 of the filter system 100.

The further components and details of filter system 100 and filter element 10 are described in the previous embodiments, in particular in FIGS. 29 to 46, reference being had to them in order to avoid unnecessary repetitions.

The filter element 10 comprises at least one axially delimited notch 44 in its filter bellows 12, preferably at the side of its closed end disk 32. With the closed end disk 32 leading, the filter element 10 is inserted into the first housing part 104 wherein it can be pushed on cams 36 across a valve 128 in the first housing part 104 below the filter element 10. The closed end disk 32 comprises a central, inwardly extending pin 60 which is pushed onto a pin 116 in the first housing part 104.

The open end disk 22 of the filter element 10 comprises a bead 28 which partially surrounds the opening 24 of the end disk 22. In the bead-free region of the opening 24, fluid can flow from the interior 50 of the filter element 10 through a clean fluid channel 134 of the cover 130 to the outlet 112. Inlet 110 and outlet 112 are arranged directly adjacent to each other in the same housing part 104.

The cover 130 comprises a wedge-shaped rim 136 in whose region with the greatest height an opening 132 is arranged. The latter is positioned, when the cover 130 is closed, below the socket 142 of the first housing part 104. The socket 142 projects in axial direction past the end disk 22 of the installed filter element 10.

The cover 130 comprises a receptacle 138 for the bead 28. Notch 44, pin 60, and bead 28 secure the filter element 10 against tilting in the housing 102, which is advantageous in case of a filter element 10 that is installed in a recumbent position.

The one-piece seal 150 comprises a first sealing ring 152 and a sealing ring 154 which is connected thereto on both sides by flanks 156 and is angled thereto. The first sealing ring 152 is positioned at a sealing surface 146 at the outer rim of the inner side of the cover 130, wherein the sealing surface 146 surrounds largely a collar 139 whose inner side serves as a sealing surface for the radial seal 25 of the end disk 22. An outer groove 149 adjoins the sealing surface 146 and receives a rim of the sealing ring 152.

The second sealing ring 154 is resting on a sealing surface 147 which surrounds the opening 132 in the rim 136 of the cover 130. The seal 150 is resting with the flanks 156 against the two transitions between the two sealing surfaces 146, 147.

Advantageously, the sealing action between raw side and clean side about the socket 142 of the outlet 112 as well as relative to the environment in circumferential direction about the cover 130 is integrated in the one-piece seal 150.

Moreover, the cover 130 comprises, above the receptacle 138 for the bead 28, a rib 148 that projects into the housing 102 and into the opening 24 of the open end disk 22 and that serves to keep away water from the clean channel 134 of the cover 130 and to guide it through the filter element 10 to the valve 128.

Figure 55:
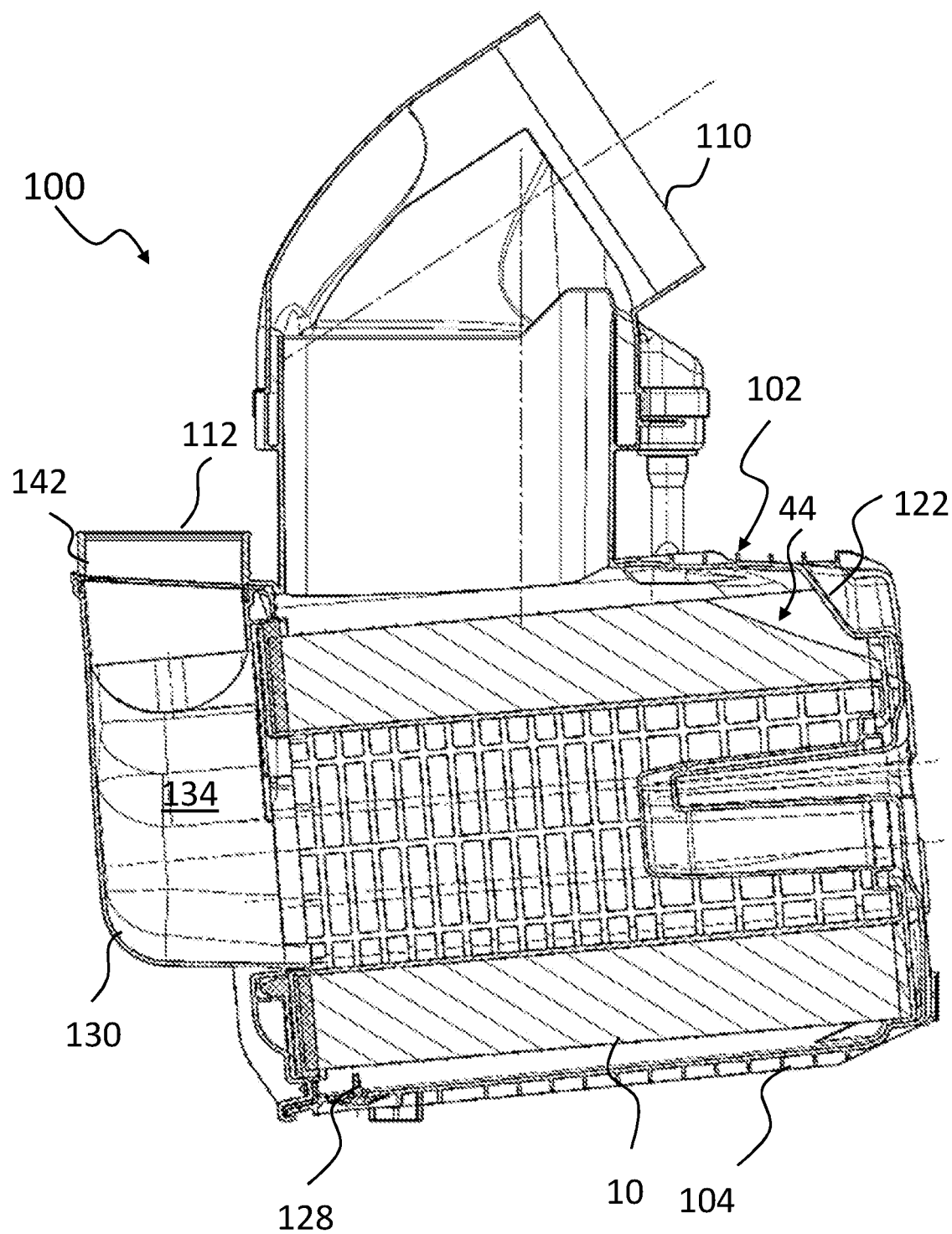
FIG. 55 shows a longitudinal section of the filter system according to FIG. 51.
Figure 56:
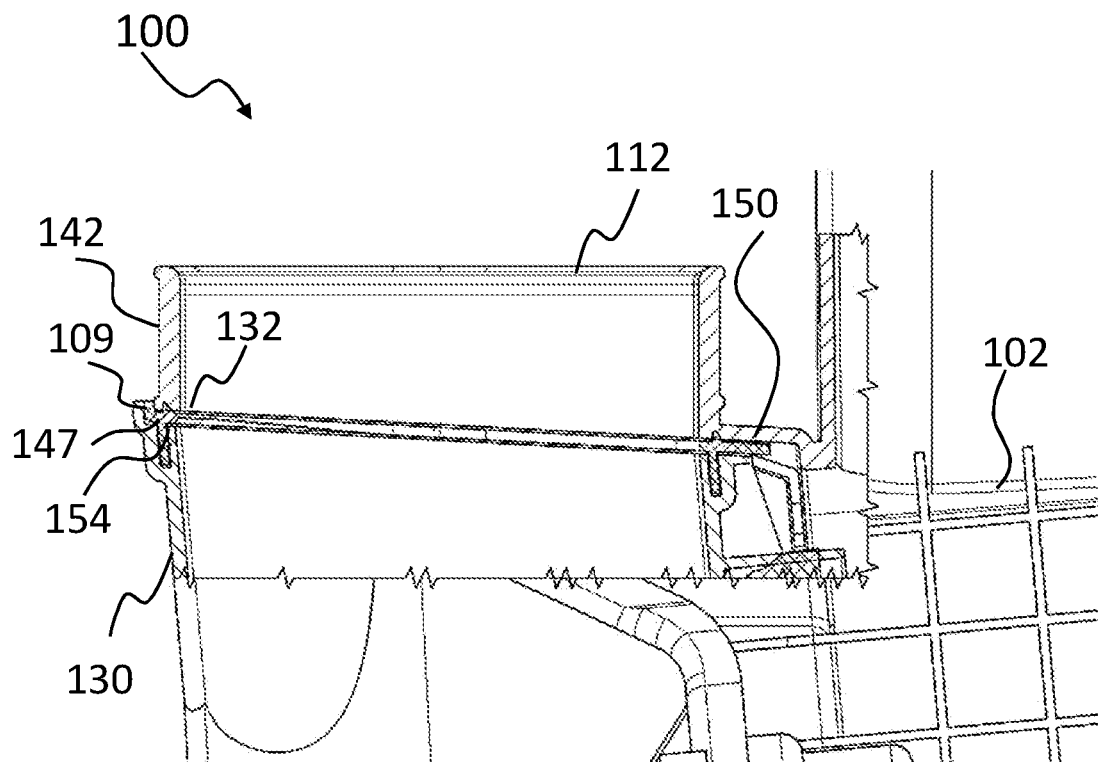
FIG. 56 shows a section of a detail of a clean fluid connector of the cover of the filter system according to FIG. 51.
Figure 57:
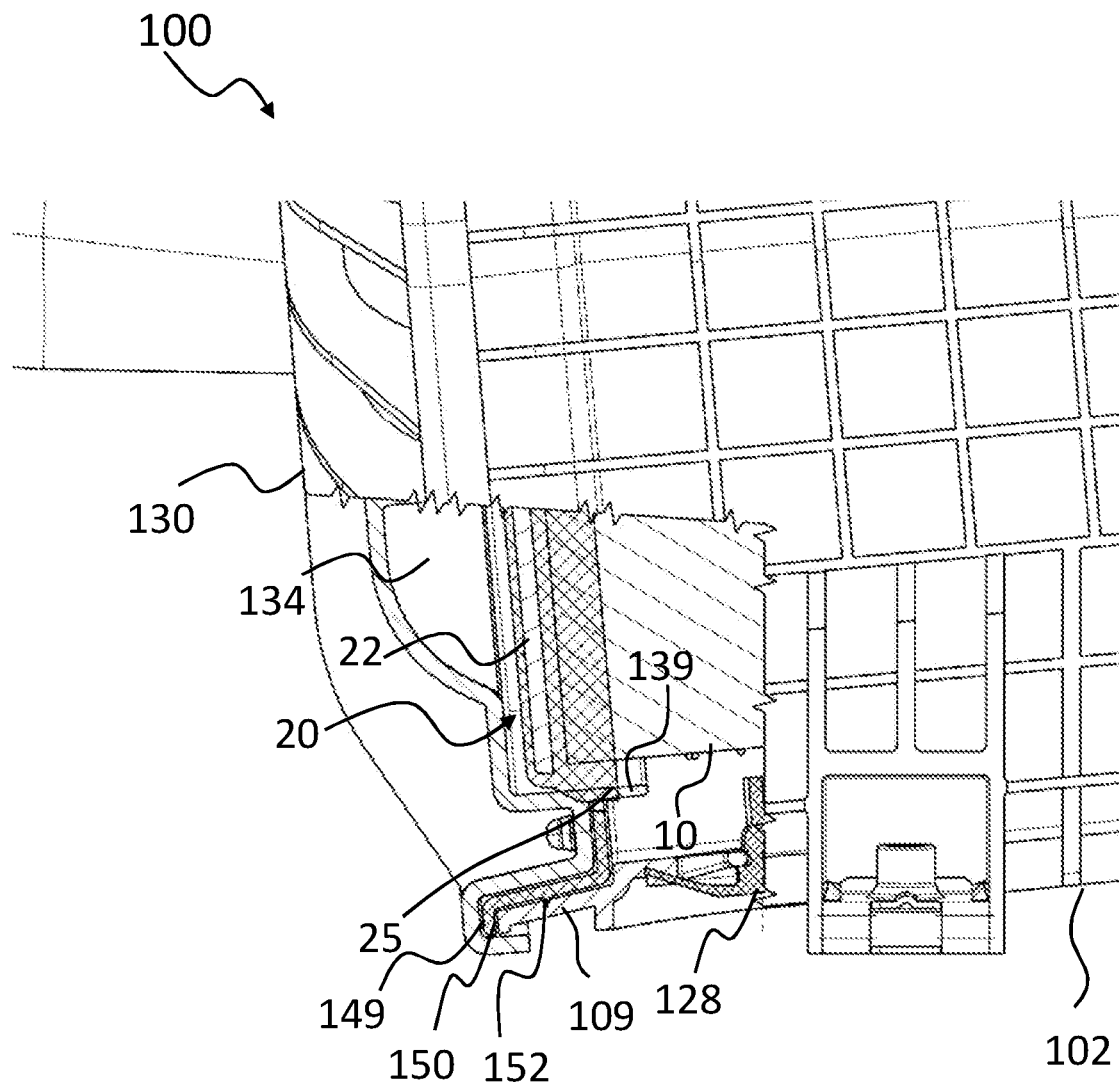
FIG. 57 shows a section of a detail of a raw fluid side of the cover of the filter system according to FIG. 51.

As can be seen in the section illustration of FIG. 55, which shows the housing of FIG. 54, and the detail illustrations in FIG. 56 at the clean fluid side of the filter system 100 and in FIG. 57 at the raw fluid side of the filter system 100, the seal 150 provides the sealing action of the cover 130 relative to the exterior region of the cover 130 as well as against the raw fluid side. The sealing action clean fluid side relative to raw fluid side is effected by the first sealing ring 152. The sealing action relative to the exterior side is realized by means of the second sealing ring 154.

The first sealing ring 152 comprises for this purpose an approximately Z-shaped profile in which from a central leg at each of its ends a leg is projecting in opposite direction. The second sealing ring 154 comprises an approximately T-shaped profile.

The first sealing ring 152 is resting with a projecting leg in the groove 149, with the central leg at the inner side of the circumferential collar 109 of the housing part 104, and with the additionally projecting leg at the end face at the exterior side of the collar 139.

With the filter element 10 and the filter system 100 according to the invention, an in particular recumbently installed filter element 10 can be securely mounted and demounted. By elements one or a plurality of notches 40, 44 at the filter bellows 12 and pin 60 and optionally a bead 28, a positioning in correct position can be achieved and the filter element 10 can be protected against tilting in case of a recumbent installation.

It is understood that the above described configurations in the Figures are not limited to a round cross section of the filter element 10. Instead, the cross section of the filter element 10 can be chosen as needed, for example, round, oval, quadrangular and the like.

What is claimed is:

1. A cover for a filter system for filtering a fluid,
wherein a filter element is arrangeable in a housing of the filter system, comprises a filter bellows arranged about a longitudinal axis of the filter element and enclosing an interior of the filter element, and further comprises an open-end disk;
wherein the cover comprises a fluid channel arranged at an inner side of the cover;
wherein the cover comprises a rim and at least one opening arranged in the rim and configured to allow the fluid to pass through, wherein the at least one opening is connected in fluid communication with the fluid channel;
wherein the inner side of the cover comprises a rim region, wherein a first circumferentially extending sealing groove is arranged at the rim region, wherein the first circumferentially extending sealing groove is configured to receive a first seal; and
wherein the cover comprises a second circumferentially extending sealing groove, wherein the first circumferentially extending sealing groove surrounds the second circumferentially extending sealing groove, wherein the first seal received in the first circumferentially extending sealing groove is configured to seal between the cover and a housing part of the housing between a clean side of the filter system and an exterior, and wherein the second circumferentially extending sealing groove is configured to receive a second seal configured to seal between the cover and the housing part between the clean side and a raw side of the filter system, wherein the at least one opening arranged in the rim is arranged between the first and the second circumferentially extending sealing grooves.

2. The cover according to claim 1, wherein the fluid channel is connected in fluid communication with the interior of the filter element.

3. The cover according to claim 1, further comprising at least one circumferentially extending sealing surface configured to receive at least one seal.

4. The cover according to claim 3, wherein the at least one circumferentially extending sealing surface is arranged at a rim region of the inner side of the cover, wherein the at least one seal is arranged, in a mounted state of the cover on the housing, between the cover and a housing part of the housing and between the at least one opening arranged in the rim and the housing part.

5. The cover according to claim 1, wherein the inner side of the cover comprises a receptacle, wherein the receptacle surrounds the fluid channel at least partially, wherein the receptacle is configured to support a complementary bead of the filter element.

6. The cover according to claim 5, wherein a rib is arranged at an inner rim of the receptacle and the rib is configured to project into the interior of the filter element in a mounted state of the cover on the housing.

7. The cover according to claim 1, wherein the inner side of the cover comprises a circumferentially extending collar comprising a circumferentially extending sealing surface configured to interact with a radial seal of the filter element to seal a clean side of the filter system relative to a raw side of the filter system.

8. A seal for a cover according to claim 1, wherein the seal comprises a first sealing ring and a second sealing ring, wherein the first sealing ring and the second sealing ring are connected by flanks to each other.

9. The seal according to claim 8, wherein the first sealing ring is angled relative to the second sealing ring.

10. A filter system for filtering a fluid, the filter system comprising:
a housing comprising a cover and a housing part closable by the cover, wherein the cover comprises a fluid channel arranged at an inner side of the cover;
a filter element exchangeably arranged in the housing;
wherein the fluid channel of the cover is connected in fluid communication to an interior of the filter element;
wherein the cover comprises a rim and at least one opening arranged in the rim and configured to allow the fluid to pass through, wherein the at least one opening is connected in fluid communication with the fluid channel;
wherein the inner side of the cover comprises a rim region, wherein a first circumferentially extending sealing groove is arranged at the rim region, wherein the first circumferentially extending sealing groove is configured to receive a first seal; and
wherein the cover comprises a second circumferentially extending sealing groove, wherein the first circumferentially extending sealing groove surrounds the second circumferentially extending sealing groove, wherein the first seal received in the first circumferentially extending sealing groove is configured to seal between the cover and a housing part of the housing between a clean side of the filter system and an exterior, and wherein the second circumferentially extending sealing groove is configured to receive a second seal configured to seal between the cover and the housing part between the clean side and a raw side of the filter system, wherein the at least one opening arranged in the rim is arranged between the first and the second circumferentially extending sealing grooves.

11. The filter system according to claim 10, wherein the housing part comprises a socket with an opening, wherein the housing part further comprises a circumferential collar with a first sealing surface for a first sealing ring of a seal and further comprises a second sealing surface at the opening of the socket for a second sealing ring of the seal.

\* \* \* \* \*